(12) United States Patent
Kang et al.

(10) Patent No.: US 12,695,334 B2
(45) Date of Patent: Jul. 28, 2026

(54) WIRELESS POWER TRANSMISSION DEVICE AND CONTROL METHOD THEREOF

(71) Applicant: Samsung Electronics Co., Ltd., Suwon-si (KR)

(72) Inventors: Heejun Kang, Suwon-si (KR); Kanghoon Kim, Suwon-si (KR); Dongoh Kang, Suwon-si (KR); Yongwook Kim, Suwon-si (KR); Hana Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 18/390,674

(22) Filed: Dec. 20, 2023

(65) Prior Publication Data

US 2024/0171016 A1      May 23, 2024

Related U.S. Application Data

(63) Continuation of application No. PCT/KR2023/018866, filed on Nov. 22, 2023.

(30) Foreign Application Priority Data

Nov. 23, 2022      (KR) ........................ 10-2022-0158535

(51) Int. Cl.
*H02J 50/80* (2016.01)
*A47J 27/21* (2006.01)
(Continued)

(52) U.S. Cl.
CPC ......... *H02J 50/80* (2016.02); *A47J 27/21041* (2013.01); *A47J 27/21058* (2013.01);
(Continued)

(58) Field of Classification Search
CPC ...... H02J 50/80; H02J 50/12; A47J 27/21041; A47J 27/21058; A47J 27/21166;
(Continued)

(56) References Cited

U.S. PATENT DOCUMENTS 7,069,090 B2 * 6/2006 Huffington ........... G05B 19/104
                                                        700/79
8,742,299 B2 * 6/2014 Gouardo ................ H05B 6/065
                                                        219/447.1
(Continued)

FOREIGN PATENT DOCUMENTS

EP        3 840 532 B1      8/2022
JP        2002-329571 A2      11/2002
(Continued)

OTHER PUBLICATIONS

International Search Report dated Feb. 21, 2024, issued in International Patent Application No. PCT/KR2023/018866.

*Primary Examiner* — Menatoallah Youssef
*Assistant Examiner* — Michael J Warmflash
(74) *Attorney, Agent, or Firm* — Jefferson IP Law, LLP

(57) ABSTRACT

A wireless power transmission device and a control method thereof are provided. The wireless power transmission device includes a wireless power transmitter, a communication interface, a sensing coil, a light source driver, a light source, and at least one processor. The at least one processor is configured to control the wireless power transmitter to transmit first power supplied by the working coil to the cooking appliance, control the light source driver to measure second power induced in the sensing coil when the first power is transmitted, and control the light source driver to set at least one of a light emission intensity of the light
(Continued)

source, a light emission color of the light source, or a light emission form of the light source, based on the amount of the second power.

21 Claims, 29 Drawing Sheets

(51) Int. Cl.
| | |
|---|---|
| *A47J 36/32* | (2006.01) |
| *H02J 50/12* | (2016.01) |
| *H05B 6/12* | (2006.01) |

(52) U.S. Cl.
CPC ....... *A47J 27/21166* (2013.01); *A47J 36/321* (2018.08); *H02J 50/12* (2016.02); *H05B 6/1218* (2013.01); *H05B 6/1236* (2013.01); *A47J 2202/00* (2013.01); *H05B 2213/06* (2013.01)

(58) Field of Classification Search
CPC ... A47J 36/321; A47J 2202/00; H05B 6/1218; H05B 6/1236; H05B 2213/06; H05B 6/062
See application file for complete search history.

(56) References Cited

U.S. PATENT DOCUMENTS

| | | | | |
|---|---|---|---|---|
| 9,565,721 | B2 * | 2/2017 | Okada | H05B 6/062 |
| 10,856,369 | B2 * | 12/2020 | Kim | H05B 6/1218 |
| 10,887,950 | B2 * | 1/2021 | Yun | H05B 6/1218 |
| 10,887,951 | B2 | 1/2021 | Kim et al. | |
| 11,191,130 | B2 * | 11/2021 | Jung | H05B 6/1236 |
| 11,770,881 | B2 * | 9/2023 | Hwangbo | H05B 1/0266 |
| | | | | 219/621 |
| 12,302,479 | B2 * | 5/2025 | Lee | H02J 50/60 |
| 2012/0160831 | A1 * | 6/2012 | Usui | H05B 6/062 |
| | | | | 219/622 |
| 2015/0245723 | A1 * | 9/2015 | Alexander | A47J 39/025 |
| | | | | 219/387 |
| 2015/0327707 | A1 * | 11/2015 | Son | H05B 6/04 |
| | | | | 219/621 |
| 2015/0351163 | A1 * | 12/2015 | Kim | H05B 6/1218 |
| | | | | 99/342 |
| 2016/0150600 | A1 * | 5/2016 | Lomp | H05B 6/062 |
| | | | | 219/622 |
| 2017/0280514 | A1 * | 9/2017 | Kim | H05B 6/1218 |
| 2018/0079963 | A1 * | 3/2018 | Laoutid | A62D 1/0071 |
| 2018/0192480 | A1 * | 7/2018 | Kim | H05B 6/062 |
| 2019/0166657 | A1 * | 5/2019 | Benz | H05B 6/1245 |
| 2019/0281668 | A1 * | 9/2019 | Kim | H05B 6/1218 |
| 2020/0022228 | A1 | 1/2020 | Heo | |
| 2020/0132219 | A1 * | 4/2020 | Thompson | F15B 15/2876 |
| 2020/0337121 | A1 * | 10/2020 | Lee | H05B 6/1218 |
| 2020/0413498 | A1 * | 12/2020 | Kim | H05B 6/1218 |
| 2021/0298136 | A1 * | 9/2021 | Moon | H05B 6/062 |
| 2021/0341288 | A1 | 11/2021 | Mitani et al. | |
| 2023/0292411 | A1 * | 9/2023 | Kwack | H05B 6/1218 |
| 2023/0328851 | A1 * | 10/2023 | Kang | F24C 7/08 |
| | | | | 219/622 |

FOREIGN PATENT DOCUMENTS

| | | | |
|---|---|---|---|
| JP | 2020-016525 | A | 1/2020 |
| JP | 6882037 | B2 | 6/2021 |
| KR | 10-1553970 | B1 | 9/2015 |
| KR | 10-2018-0079963 | A | 7/2018 |
| KR | 10-2018-0091542 | A | 8/2018 |
| KR | 10-2019-0131388 | A | 11/2019 |
| KR | 10-2019-0133826 | A | 12/2019 |
| KR | 10-2060149 | B1 | 12/2019 |
| KR | 10-2020-0132219 | A | 11/2020 |
| KR | 10-2208568 | B1 | 1/2021 |
| KR | 10-2208812 | B1 | 1/2021 |
| KR | 10-2270491 | B1 | 6/2021 |
| KR | 10-2022-0036653 | A | 3/2022 |
| KR | 10-2022-0099293 | A | 7/2022 |
| WO | 2005/064992 | A1 | 7/2005 |

* cited by examiner

FIG. 12
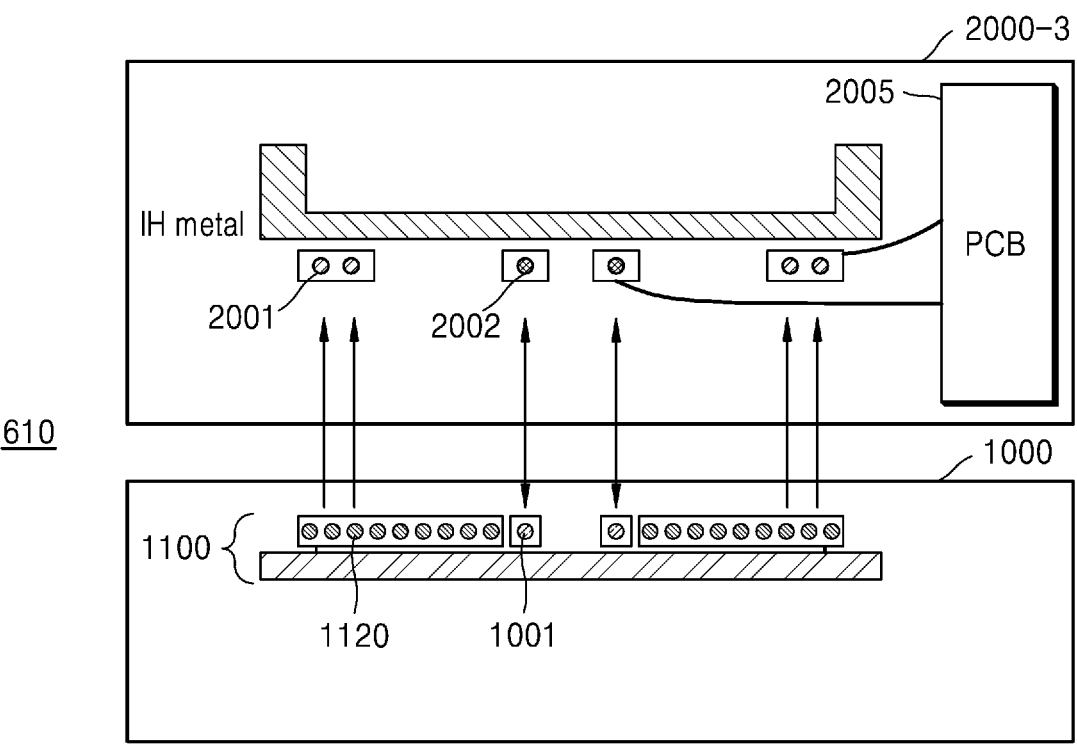
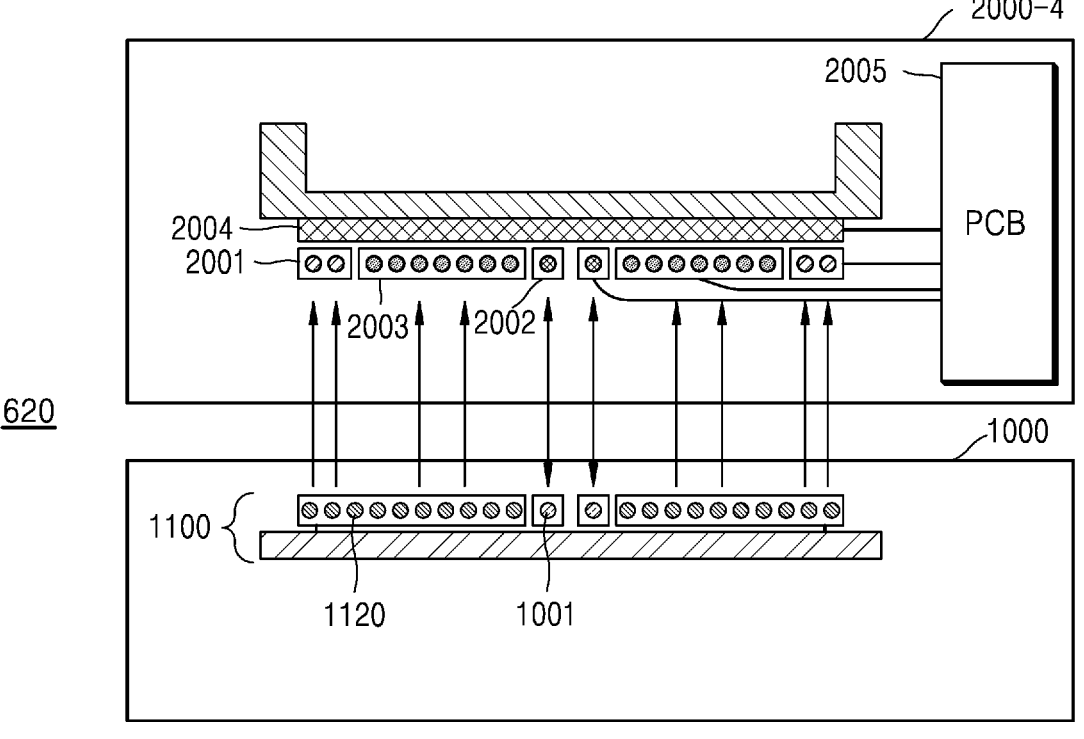

| | COLOR |
|---|---|
| SECOND POWER | |
| FIRST RANGE: FIRST AMOUNT ~ SECOND AMOUNT | RED |
| SECOND RANGE: SECOND AMOUNT ~ THIRD AMOUNT | GREEN |
| THIRD RANGE: EQUAL TO OR GREATER THIRD AMOUNT | BLUE |

FIG. 20

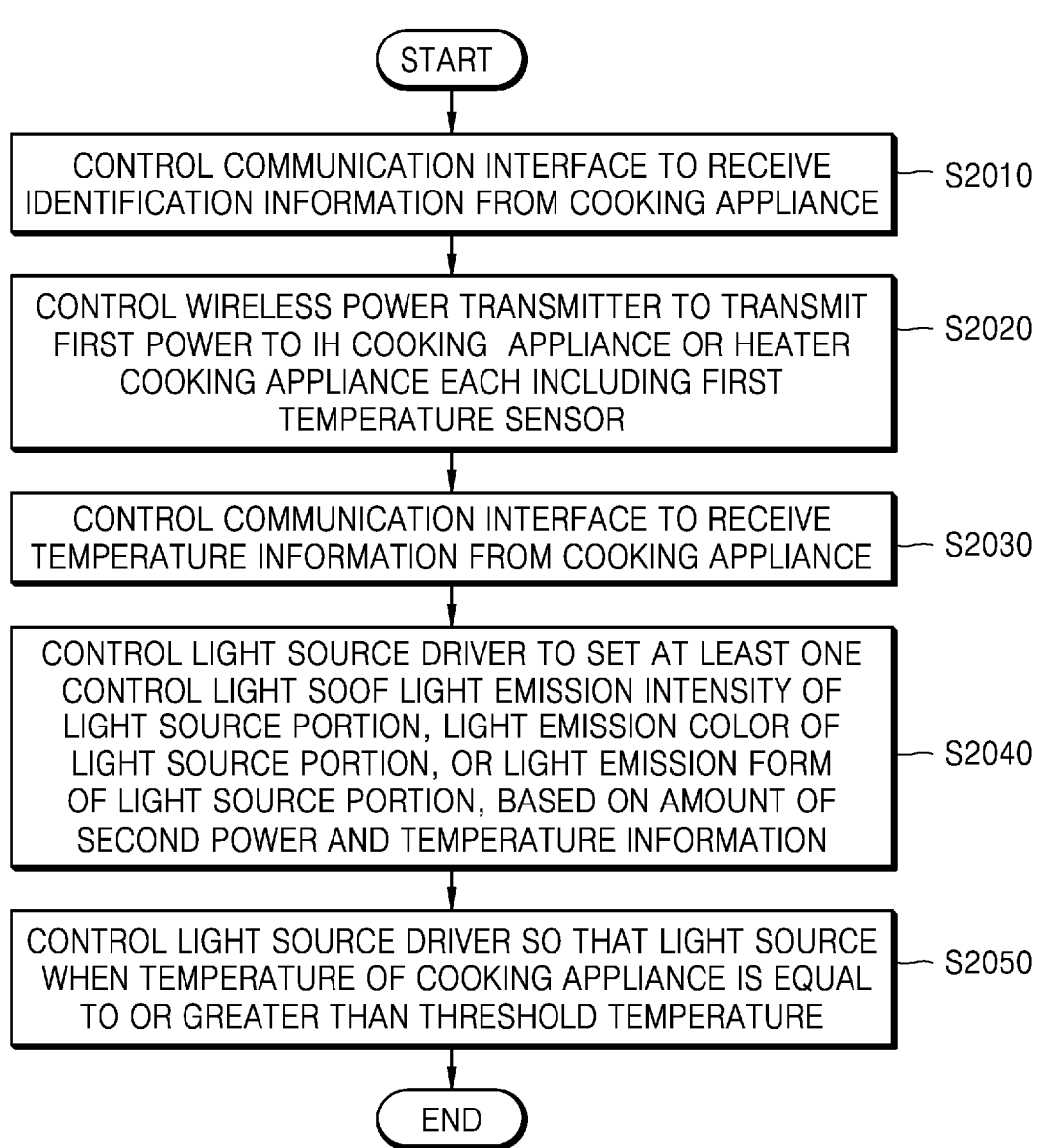

START

CONTROL COMMUNICATION INTERFACE TO RECEIVE IDENTIFICATION INFORMATION FROM COOKING APPLIANCE — S2010

CONTROL WIRELESS POWER TRANSMITTER TO TRANSMIT FIRST POWER TO IH COOKING APPLIANCE OR HEATER COOKING APPLIANCE EACH INCLUDING FIRST TEMPERATURE SENSOR — S2020

CONTROL COMMUNICATION INTERFACE TO RECEIVE TEMPERATURE INFORMATION FROM COOKING APPLIANCE — S2030

CONTROL LIGHT SOURCE DRIVER TO SET AT LEAST ONE CONTROL LIGHT SOOF LIGHT EMISSION INTENSITY OF LIGHT SOURCE PORTION, LIGHT EMISSION COLOR OF LIGHT SOURCE PORTION, OR LIGHT EMISSION FORM OF LIGHT SOURCE PORTION, BASED ON AMOUNT OF SECOND POWER AND TEMPERATURE INFORMATION — S2040

CONTROL LIGHT SOURCE DRIVER SO THAT LIGHT SOURCE WHEN TEMPERATURE OF COOKING APPLIANCE IS EQUAL TO OR GREATER THAN THRESHOLD TEMPERATURE — S2050

END

FIG. 21

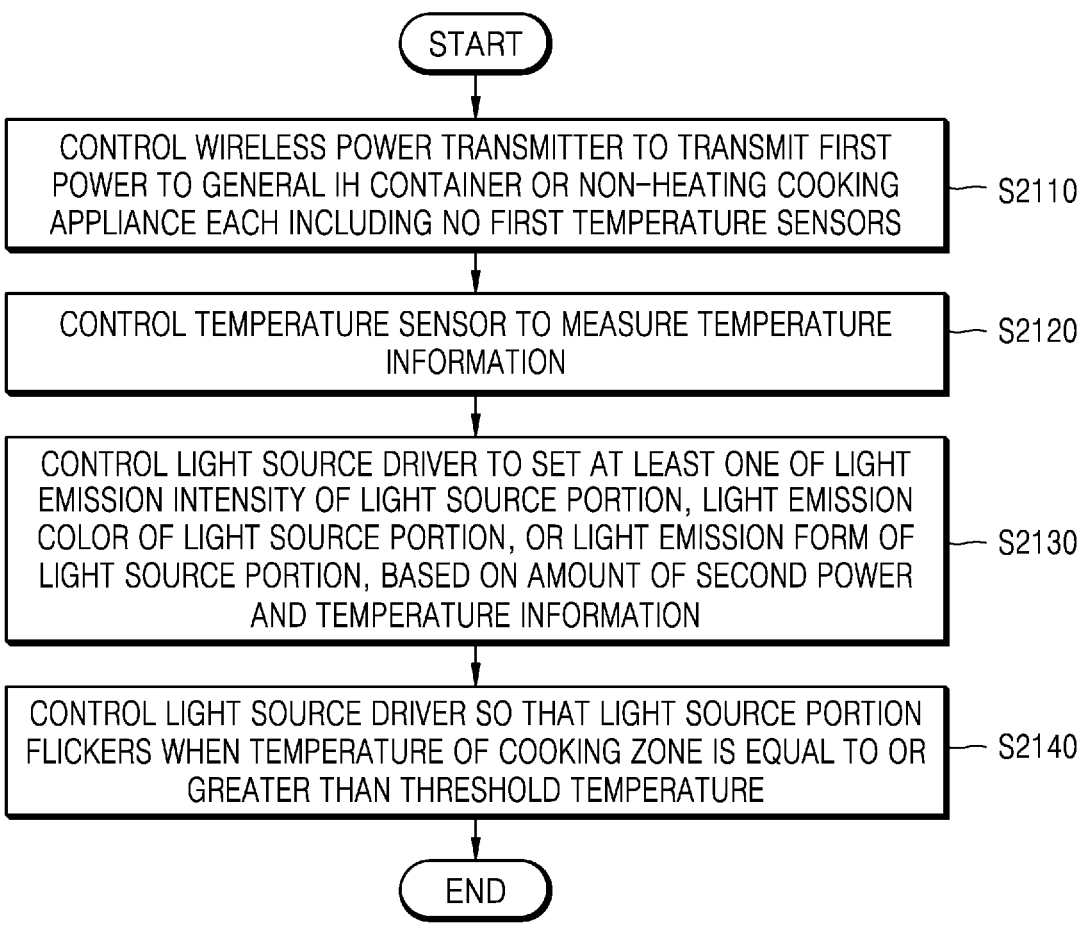

START

CONTROL WIRELESS POWER TRANSMITTER TO TRANSMIT FIRST POWER TO GENERAL IH CONTAINER OR NON-HEATING COOKING APPLIANCE EACH INCLUDING NO FIRST TEMPERATURE SENSORS — S2110

CONTROL TEMPERATURE SENSOR TO MEASURE TEMPERATURE INFORMATION — S2120

CONTROL LIGHT SOURCE DRIVER TO SET AT LEAST ONE OF LIGHT EMISSION INTENSITY OF LIGHT SOURCE PORTION, LIGHT EMISSION COLOR OF LIGHT SOURCE PORTION, OR LIGHT EMISSION FORM OF LIGHT SOURCE PORTION, BASED ON AMOUNT OF SECOND POWER AND TEMPERATURE INFORMATION — S2130

CONTROL LIGHT SOURCE DRIVER SO THAT LIGHT SOURCE PORTION FLICKERS WHEN TEMPERATURE OF COOKING ZONE IS EQUAL TO OR GREATER THAN THRESHOLD TEMPERATURE — S2140

END

FIG. 22

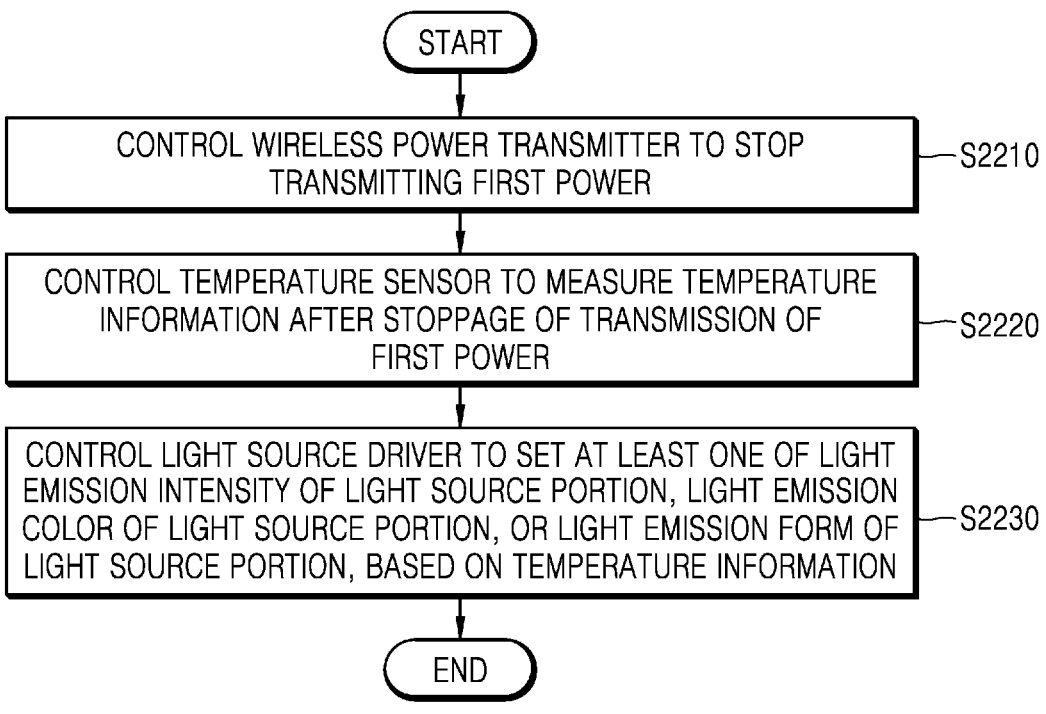

START

CONTROL WIRELESS POWER TRANSMITTER TO STOP TRANSMITTING FIRST POWER —S2210

CONTROL TEMPERATURE SENSOR TO MEASURE TEMPERATURE INFORMATION AFTER STOPPAGE OF TRANSMISSION OF FIRST POWER —S2220

CONTROL LIGHT SOURCE DRIVER TO SET AT LEAST ONE OF LIGHT EMISSION INTENSITY OF LIGHT SOURCE PORTION, LIGHT EMISSION COLOR OF LIGHT SOURCE PORTION, OR LIGHT EMISSION FORM OF LIGHT SOURCE PORTION, BASED ON TEMPERATURE INFORMATION —S2230

END

| SECOND POWER | COLOR |
|---|---|
| FIRST RANGE: 30°C ~ 120°C | RED |
| SECOND RANGE: 120°C ~ 200°C | GREEN |
| THIRD RANGE: EQUAL TO OR GREATER 200°C | BLUE |

WIRELESS POWER TRANSMISSION DEVICE AND CONTROL METHOD THEREOF

CROSS-REFERENCE TO RELATED APPLICATION(S)

This application is a continuation application, claiming priority under § 365(c), of an International application No. PCT/KR2023/018866, filed on Nov. 22, 2023, which is based on and claims the benefit of a Korean patent application number 10-2022-0158535, filed on Nov. 23, 2022, in the Korean Intellectual Property Office, the disclosure of which is incorporated by reference herein in its entirety.

TECHNICAL FIELD

The disclosure relates to a wireless power transmission device and a control method thereof.

BACKGROUND ART

Wireless power transmission devices are heating appliances for cooking using the principle of induction heating and are often called induction ranges or inductions. Wireless power transmission devices induce heat generation by transmitting power to a to-be-heated object, such as a cooking appliance, and thus may have high energy efficiency and stability. Because a contact surface is not heated even though the to-be-heated object generates heat by itself, the risk of burns can be reduced. Compared to gas ranges, wireless power transmission devices do not consume oxygen and do not emit waste gas, and thus, indoor air pollution and indoor temperature rises may be reduced. Accordingly, the demand for wireless power transmission devices has recently been increasing.

By detecting a current or voltage inside a wireless power transmission device, whether the wireless power transmission device is operating and its operating strength may be displayed. However, even when existing technology for displaying an operation or a non-operation and an operation intensity is applied, it may not be easy to display a degree to which a to-be-heated object is actually heated. In addition, when a wireless power transmission device does not perform a heating operation, it may not be easy to inform about whether a to-be-heated object is in a high temperature state.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide a wireless power transmission device and control method thereof.

Additional aspects will be set forth in part in the description which follows and, in part, will be apparent from the description, or may be learned by practice of the presented embodiments.

In accordance with an aspect of the disclosure, a wireless power transmission device is provided. The device includes a wireless power transmitter including a working coil and configured to wirelessly transmit power to a cooking appliance located on a cooking zone, a communication interface configured to establish a wireless communication connection with the cooking appliance, a sensing coil disposed to surround an outer side edge of the working coil, a light source driver electrically connected to the sensing coil, a light source configured to emit light according to driving of the light source driver, and at least one processor. The at least one processor of the wireless power transmission device is configured to control the wireless power transmitter to transmit first power supplied by the working coil to the cooking appliance, control the light source driver to measure second power induced in the sensing coil when the first power is transmitted, and control the light source driver to set at least one of a light emission intensity of the light source, a light emission color of the light source, or a light emission form of the light source, based on the amount of the second power.

In accordance with another aspect of the disclosure, a method of controlling a wireless power transmission device is provided. The method includes controlling a wireless power transmitter of the wireless power transmission device to transmit first power supplied by a working coil included in the wireless power transmitter to the cooking appliance, controlling a light source driver of the wireless power transmission device to measure second power induced in a sensing coil disposed to surround the working coil, when the first power is transmitted, and controlling the light source driver to set at least one of a light emission intensity of a light source of the wireless power transmission device, a light emission color of the light source, or a light emission form of the light source, based on the amount of the second power.

In accordance with another aspect of the disclosure, a cooking appliance is provided. The cooking appliance includes a communication interface configured to establish a wireless communication connection with the wireless power transmission device, a reception coil configured to wirelessly receive power from a wireless power transmission device, a power supply electrically connected to the reception coil, a light source configured to emit light according to driving of the power supply, and at least one processor. The at least one processor is configured to measure first power received by the reception coil, and control the power supply to set at least one of a light emission intensity of the light source, a light emission color of the light source, or a light emission form of the light source, based on the amount of the first power.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 7 is a view of a cooking appliance according to an embodiment of the disclosure;

FIG. 12 is a diagram illustrating a power transmission/ reception structure between a wireless power transmission device and a cooking appliance according to an embodiment of the disclosure;

FIG. 20 is a flowchart of a control method according to temperature information of a wireless power transmission device according to an embodiment of the disclosure;

FIG. 21 is a flowchart of a control method according to temperature information of a wireless power transmission device according to an embodiment of the disclosure;

FIG. 22 is a flowchart of a control method according to temperature information of a wireless power transmission device according to an embodiment of the disclosure;

The same reference numerals are used to represent the same elements throughout the drawings.

MODE FOR INVENTION

Figure 1:
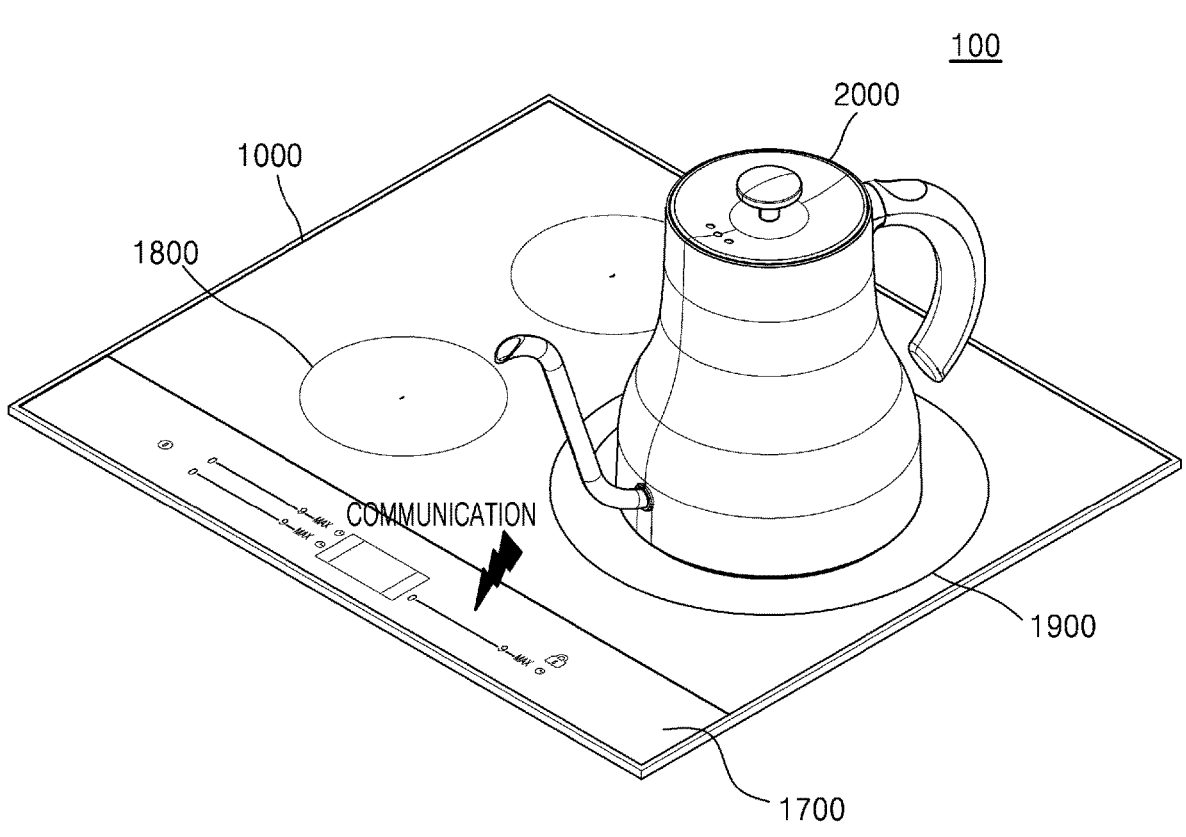
FIG. 1 is a view illustrating a system including a wireless power transmission device and a cooking appliance according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although general terms widely used at present were selected for describing the disclosure based on the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings need to be given in the detailed description of an embodiment of the disclosure. Hence, the terms must be defined based on their meanings and the contents of the entire specification, not by simply stating the terms.

The terms "comprises" and/or "comprising" or "includes" and/or "including" used herein specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

Embodiments of the disclosure are described herein with reference to the accompanying drawings so that this disclosure may be easily performed by one of ordinary skill in the art to which the disclosure pertains. Embodiments of the disclosure may, however, be embodied in many different forms and should not be construed as being limited to the embodiments set forth herein. In the drawings, parts irrelevant to the description are omitted for simplicity of explanation, and like numbers refer to like elements throughout.

FIG. 1 is a view illustrating a system including a wireless power transmission device and a cooking appliance according to an embodiment of the disclosure.

Referring to FIG. 1, a system 100 according to an embodiment of the disclosure may include a wireless power transmission device 1000 and a cooking appliance 2000. However, all of the components illustrated in FIG. 1 are not essential. The system 100 may be implemented by more or less components than those illustrated in FIG. 1. For example, the system 100 may be implemented as the wireless power transmission device 1000, a wireless power reception device 2000, and a server device (not shown). Each of the components of the system 100 will now be described.

The wireless power transmission device 1000 according to an embodiment of the disclosure may be an apparatus that wirelessly transmits power to the cooking appliance 2000 located on a top plate by using electromagnetic induction. The power transmission device 1000 may also be referred to as an induction heating apparatus, an induction range, a cooktop, or an electric range. For example, the wireless power transmission device 1000 may be a heating appliance for cooking using an induction heating principle, which is commonly known as an induction range or an induction. The wireless power transmission device 1000 may include a working coil that generates a magnetic field for inductively heating the cooking appliance 2000. The working coil may be referred to as a transmission coil.

To transmit power wirelessly, the wireless power transmission device 1000 may transmit power by using a magnetic field induced in a reception coil or an IH metal (e.g., an iron component) in a magnetic induction method. For example, the wireless power transmission device 1000 may cause a current to flow in the working coil to form a magnetic field, and thus may generate an eddy current in the cooking appliance 1000 or induce a magnetic field in the reception coil.

According to an embodiment of the disclosure, the wireless power transmission device 1000 may include a plurality of working coils. For example, when the top plate of the wireless power transmission device 1000 includes a plurality of cooking zones 1800 (burners), the wireless power transmission device 1000 may include a plurality of working coils respectively corresponding to the plurality of cooking zones 1800. The wireless power transmission device 1000 may also include a high-power cooking zone 1800 in which a first working coil is provided inside and a second working coil is provided outside. The high-power cooking zone 1800 may include three or more working coils.

According to an embodiment of the disclosure, the top plate of the wireless power transmission device 1000 may include tempered glass, such as ceramic glass, so that the top plate is not easily damaged. A guide mark may be provided on the top plate of the wireless power transmission device 1000 to guide the cooking zone 1800 on which the cooking appliance 2000 needs to be located.

The wireless power transmission device 1000 according to an embodiment of the disclosure may detect that the cooking appliance 2000 (e.g., a general IH container or an IH cooking appliance) including a magnetic material is placed on the top plate. For example, based on a change in a current value (inductance) of the working coil due to approach of the cooking appliance 2000, the wireless power transmission device 1000 may detect that the cooking appliance 2000 is located on the top plate of the wireless power transmission device 1000. A mode in which the wireless power transmission device 1000 detects the cooking appliance 2000 including the magnetic material (IH metal) is defined as an "IH container detection mode (pan detection mode)".

According to an embodiment of the disclosure, the wireless power transmission device 1000 may include a communication interface for performing communication with an external apparatus. For example, the wireless power transmission device 1000 may communicate with the cooking appliance 2000 or the server device through the communication interface. The communication interface may include a short-range wireless communication interface (e.g., a near-field communication (NFC) communication interface, a Bluetooth communication interface, or a Bluetooth low energy (BLE) communication interface) and a long-distance communication interface. The wireless power transmission device 1000 may be connected to the cooking appliance 2000, a mobile terminal, or the server device through a network. The network may include a wide area network (WAN), such as the Internet, a local area network (LAN) formed around an access point (AP), and a wireless personal area network (WPAN) not going through an AP. The WPAN may include, but is not limited to, Bluetooth™ (IEEE 802.15.1), Zigbee (IEEE 802.15.4), wi-fi direct, near field communication (NFC), and Z-Wave.

According to an embodiment of the disclosure, the wireless power transmission device 1000 may detect the cooking appliance 2000 located on the top plate through the communication interface. For example, the wireless power transmission device 1000 may detect the cooking appliance 2000 by receiving a packet transmitted from the cooking appliance 2000 located on the top plate by using short-range wireless communication (e.g., BLE or Bluetooth). Because the cooking appliance 2000 including the communication interface may be defined as a small appliance (a small object), a mode in which the wireless power transmission device 1000 detects the cooking appliance 2000 through the communication interface will now be defined as a "small appliance detection mode". The wireless power transmission device 1000 may transmit power for activating a communication interface of the cooking appliance 2000 through a plurality of cooking zones 1800, in the small appliance detection mode.

According to an embodiment of the disclosure, the wireless power transmission device 1000 may receive, from the cooking appliance 2000, the unique identification information (e.g., a media access control (MAC) address) and the variable identification information regarding the cooking appliance 1000 by using short-range wireless communication (e.g., BLE communication or Bluetooth communication). At this time, when the variable identification information of the cooking appliance 2000 includes information indicating that a current location is unknown, the wireless power transmission device 1000 outputs power according to different power transmission patterns for each cooking zone 1800 so that the cooking appliance 2000 may recognize the current location. A mode in which the wireless power transmission device 1000 outputs power according to different power transmission patterns for each cooking zone 1800 may be hereinafter defined as a 'cooking zone determination mode'. When the wireless power transmission device 1000 operates in the cooking zone determination mode, the wireless power transmission device 1000 may receive variable identification information including information about a first cooking zone 1800 corresponding to a first power transmission pattern detected by the cooking appliance 2000 and type information (e.g., a product type image and product type text) of the cooking appliance 2000. The first cooking zone 1800 may be a cooking zone 1800 in which the cooking appliance 2000 is located, among the plurality of cooking zones 1800 included in the wireless power transmission device 1000. The type information of the cooking appliance 2000 is information indicating the product type of the cooking appliance 2000. Examples of the product type may include, but are not limited to, a smart pot, a smart kettle, a coffee machine, a toaster, and a blender.

In response to variable identification information including location information of the cooking appliance 2000 and the product type of the cooking appliance 2000, the wireless power transmission device 1000 may display, on a display unit included in a user manipulator 1700, the location information regarding the cooking appliance 2000 and the type information regarding the cooking appliance 2000. For example, the wireless power transmission device 1000 may display an icon indicating the cooking appliance 2000 on the display unit at a location corresponding to the cooking zone 1800, and thus may provide, to the user, the type information (e.g., a kettle) regarding the cooking appliance 2000 and the location information (e.g., being located in a cooking zone 1800 on the right side) regarding the cooking appliance 2000. The user may check the type and location of the cooking appliance 2000 through the display unit, and may input an operation to be performed by the wireless power transmission device 1000 through the user manipulator 1700. For example, the user may input a heating request to cause the wireless power transmission device 1000 to heat the contents inside the cooking appliance 2000 through the user manipulator 1700. At this time, the wireless power transmission device 1000 may heat the contents in the cooking appliance 2000 by wirelessly supplying power corresponding to a heating operation to the cooking appliance 2000.

A light emitter 1900 may be formed on the top plate of the wireless power transmission device 1000 according to an embodiment of the disclosure. For example, a light source for forming the light emitter 1900 may be provided below the top plate of the wireless power transmission device 1000. The light emitter 1900 may be formed to surround the cooking zone 1800. For example, the light emitter 1900 may be in the shape of a circle that surrounds the cooking zone 1800.

The light emitter 1900 according to an embodiment of the disclosure may visually indicate the amount of power delivered to the cooking appliance 2000. At least one of the light emission intensity, light emission color, or light emission form of the light emitter 1900 may change based on the amount of power delivered to the cooking appliance 2000. For example, as the amount of power delivered to the cooking appliance 2000 increases, the light emission intensity of the light emitter 1900 may increase. For example, as the amount of power delivered to the cooking appliance 2000 increases, the light emission color of the light emitter 1900 may change in the order of red, green, and blue. For example, as the amount of power delivered to the cooking appliance 2000 increases, the light emission form of the light emitter 1900 may change into a thin circle, a thick circle, and a curved wave shape.

The light emitter 1900 according to an embodiment of the disclosure may visually indicate the temperature of the cooking appliance 2000 or the cooking zone 1800. At least one of the light emission intensity, light emission color, or light emission form of the light emitter 1900 may change based on the temperature of the cooking appliance 2000 or the cooking zone 1800. For example, as the temperature of the cooking appliance 2000 or the cooking zone 1800 increases, the light emission intensity of the light emitter 1900 may increase. For example, as the temperature of the cooking appliance 2000 or the cooking zone 1800 increases, the light emission color of the light emitter 1900 may change in the order of red, green, and blue. For example, as the temperature of the cooking appliance 2000 or the cooking zone 1800 increases, the light emission form of the light emitter 1900 may change into a thin circle, a thick circle, and a curved wave shape. For example, as the temperature of the cooking appliance 2000 or the cooking zone 1800 is equal to or greater than a threshold temperature, the light emitter 1900 may flicker. For example, even after the wireless power transmission device 1000 stops transmitting power, the wireless power transmission device 1000 may detect the temperature of the cooking zone 1800, and, when the temperature of the cooking zone 1800 is equal to or greater than a designated temperature, may visually represent that the cooking zone 1800 is at a high temperature, through the light emitter 1900.

The cooking appliance 2000 may be an apparatus for heating up contents inside the cooking appliance 2000. The contents inside the cooking appliance 2000 may include liquids, such as water, tea, coffee, soup, juice, wine, and oil, or may include solids, such as butter, meat, vegetables, bread, and rice, but embodiments of the disclosure are not limited thereto.

According to an embodiment of the disclosure, the cooking appliance 2000 may wirelessly receive power from the wireless power transmission device 1000 by using electromagnetic induction. Therefore, according to an embodiment of the disclosure, the cooking appliance 2000 may not include a power line connected to a power outlet.

According to an embodiment of the disclosure, there may be various types of cooking appliances 2000 that wirelessly receive power from the wireless power transmission device 1000. The cooking appliance 2000 may include a general induction-heating (IH) container including a magnetic material, or may include a cooking appliance 2000 including a communication interface. Hereinafter, the cooking appliance 2000 including the communication interface may be defined as a small appliance. According to an embodiment of the disclosure, the cooking appliance 2000 may include an IH cooking appliance including a magnetic material (IH metal) (e.g., an iron component), and a heater cooking appliance including a reception coil. In the IH cooking appliance, a magnetic field may be induced in a container (IH metal) itself. In the heater cooking appliance, a magnetic field may be induced in the reception coil.

The cooking appliance 2000 may include a general IH container, such as a pot, a frying pan, and a steamer, or may include a small appliance, such as an electric kettle, a teapot, a coffee machine (or a coffee dripper), a toaster, a blender, an electric rice cooker, an oven, and an air fryer, but embodiments of the disclosure are not limited thereto. The cooking appliance 2000 may include a cooker apparatus. The cooker apparatus may be an apparatus into or from which a general IH container may be inserted or detached. According to an embodiment of the disclosure, the cooker apparatus may be an apparatus capable of automatically cooking contents according to a recipe. The cooker apparatus may also be referred to as a pot, a rice cooker, or a steamer depending on an intended use thereof. For example, when an inner pot capable of cooking rice is inserted into the cooker apparatus, the cooker apparatus may be referred to as a rice cooker. Hereinafter, the cooker apparatus may be defined as a smart pot.

A type of the cooking appliance 2000 will be described with reference to FIGS. 7 and 8.

According to an embodiment of the disclosure, the cooking appliance 2000 may communicate with the wireless power transmission device 1000 through a communication interface. The communication interface may include a short-range wireless communication unit, a mobile communication unit, etc. The cooking appliance 2000 may be connected to the wireless power transmission device 1000, a mobile terminal, or the server device through a network.

The AP may connect a LAN to which the wireless power transmission device 1000, the cooking apparatus 1000, or the mobile terminal is connected to a WAN to which the server device is connected. The wireless power transmission device 1000, the cooking apparatus 1000, or the mobile terminal may be connected to the server device through the WAN. The AP may communicate with wireless power transmission device 1000, the cooking apparatus 1000, or the mobile terminal by using wireless communication, such as Wi-Fi™ (IEEE 802.11), and may access the WAN via wired communication.

According to an embodiment of the disclosure, the cooking appliance 1000 may transmit unique identification information and variable identification information regarding the cooking appliance 2000 to the wireless power transmission device 1000 through the communication interface. The unique identification information regarding the cooking appliance 2000 is unique information for identifying the cooking appliance 2000, and may include, but is not limited to, at least one of a medium access control (MAC) address, a model name, device type information (e.g., an IH type ID, a heater type ID, a motor type ID, or a small appliance type ID), manufacturer information (e.g., a manufacturer ID), a serial number, or manufacture date information (e.g., date of manufacture). According to an embodiment of the disclosure, the unique identification information regarding the cooking appliance 2000 may be expressed as a series of identification numbers or a combination of numbers and alphabets. The variable identification information of the cooking appliance 2000 is information that changes depending on the state of the cooking appliance 2000. For example, the variable identification information of the cooking appliance 2000 may include, but is not limited to, information indicating the registration status of the cooking appliance 2000, the location information of the cooking appliance 2000, and the type information of the cooking appliance 2000. The location information of the cooking appliance 2000 may include information about the cooking zone 1800 where the cooking appliance 2000 is located. According to an embodiment of the disclosure, the variable identification information regarding the cooking appliance 2000 may be expressed as a series of identification numbers or a combination of numbers and alphabets. The variable identification information of the cooking appliance 2000 may be included in an advertising packet in the form of a universally unique identifier (UUID).

According to an embodiment of the disclosure, the cooking apparatus 2000 may store recipe information for cooking the contents. The recipe information may vary depending on the type of cooking appliance 2000 and may include a plurality of recipe lists. For example, when the cooking appliance 2000 is a coffee machine, the recipe information may include a list of coffee bean recipes, when the cooking appliance 2000 is a smart pot, the recipe information may include a list of food recipes, and, when the cooking appliance 2000 is a blender, the recipe information may include a list of beverage recipes.

The components constituting the wireless power transmission device 1000 will now be described with reference to FIG. 2.

Figure 2:
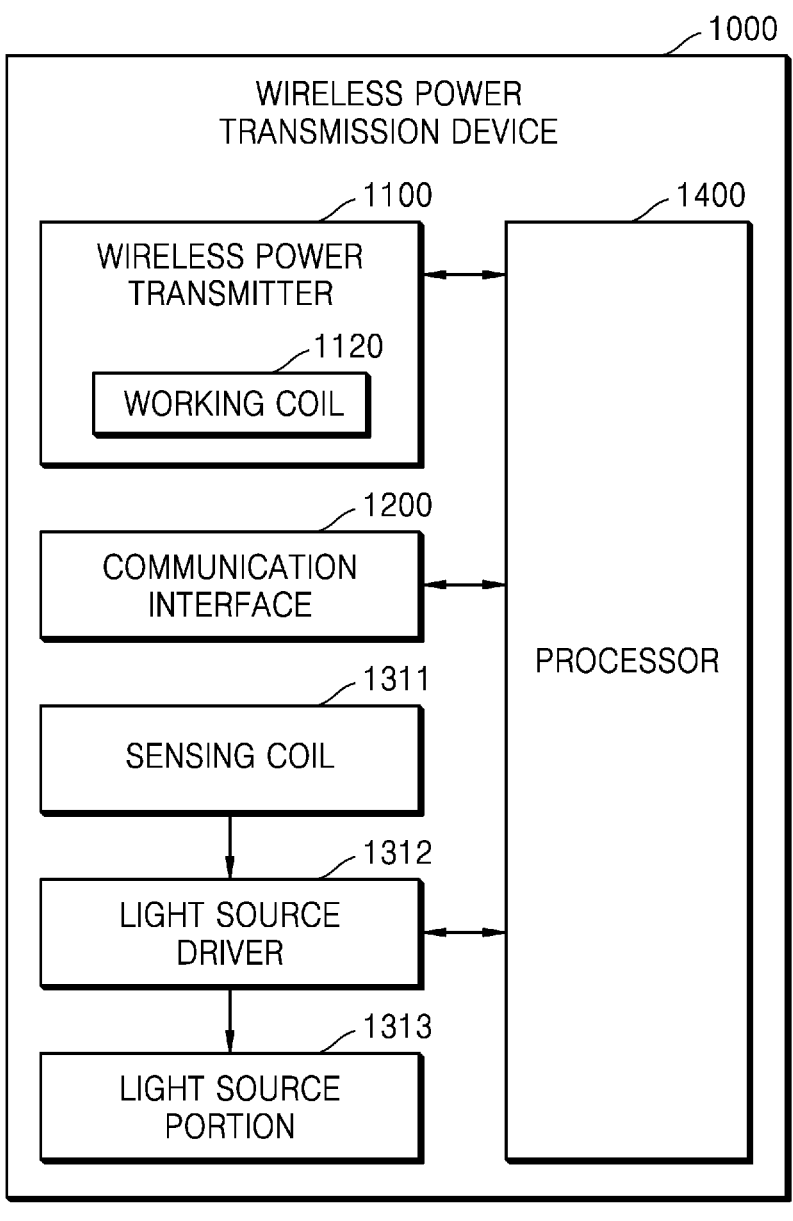
FIG. 2 is a block diagram of a wireless power transmission device according to an embodiment of the disclosure.

FIG. 2 is a block diagram of the wireless power transmission device according to an embodiment of the disclosure.

Referring to FIG. 2, the wireless power transmission device 1000 according to an embodiment of the disclosure may include a wireless power transmitter 1100, a communication interface 1200, a sensing coil 1311, a light source driver 1312, a light source 1313, and a processor 1400. However, the wireless power transmission device 1000 may be implemented by more components than those illustrated in FIG. 2. Hereinafter, the components shown in FIG. 2 are described in order, and then the other remaining components will be described later with reference to FIG. 3.

The wireless power transmitter 1100 according to an embodiment of the disclosure may include a working coil 1120. However, embodiments of the disclosure are not limited thereto, and the wireless power transmitter 1100 may include a circuit or means capable of transmitting power wirelessly. The wireless power transmitter 1100 may receive power from an external source, and may supply a current to the working coil 1120 according to a driving control signal of the processor 1400.

The wireless power transmitter 1100 according to an embodiment of the disclosure may wirelessly supply power to the cooking appliance 2000 located on the cooking zone 1800 by using the working coil 1120. The working coil 1120 may generate a magnetic field for heating the cooking appliance 2000. For example, when a driving current is supplied to the working coil 1120, a magnetic field may be induced around the working coil 1120. When a current whose magnitude and direction change with time, that is, an alternating current (AC) current, is supplied to the working coil 1120, a magnetic field whose magnitude and direction change with time may be induced around the working coil 1120. The magnetic field around the working coil 2120 may pass through a top plate including tempered glass. The magnetic field around the working coil 1120 may reach the cooking appliance 2000 placed on the top plate of the wireless power transmission device 1000. Due to the magnetic field whose magnitude and direction change with time, an eddy current rotating about the magnetic field may be generated in the cooking appliance 2000. Electrical resistance heat may be generated in the cooking appliance 2000 due to the eddy current generated in the cooking appliance 2000. The electrical resistance heat is heat generated in a resistor when a current flows in the resistor, and is also called Joule heat. While the cooking appliance 2000 is being heated by the electric resistance heat, contents inside the cooking appliance 2000 may be heated. When the cooking appliance 1000 is a heater cooking appliance including a reception coil, the magnetic field around the working coil 1120 may be induced in the reception coil of the cooking appliance 2000.

The communication interface 1200 according to an embodiment of the disclosure may establish wireless communication connection with the cooking appliance 2000. The communication interface 1200 may include one or more components for establishing wireless communication connection with the cooking appliance 2000.

The sensing coil 1311 according to an embodiment of the disclosure may be arranged adjacent to the working coil 1120. For example, the sensing coil 1311 may be arranged to surround an outer side edge of the working coil 1120. The sensing coil 1311 may be affected by the power transmitted by the wireless power transmitter 1100. For example, a current induced by the magnetic field generated around the working coil 1120 may flow in the sensing coil 1311.

The sensing coil 1311 according to an embodiment of the disclosure may be electrically connected to the light source driver 1312. The sensing coil 1311 may transmit, to the light source driver 1312, the current induced by the magnetic field generated around the working coil 1120.

The light source driver 1312 according to an embodiment of the disclosure may be electrically connected to the sensing coil 1311. The light source driver 1312 may detect the amount of power transmitted by the wireless power transmitter 1100 by using the sensing coil 1311. The light source driver 1312 may detect the magnetic field generated around the working coil 1120 by using the sensing coil 1311. The light source driver 1312 may detect the magnetic field generated around the working coil 1120 by detecting an induced current flowing in the sensing coil 1311. The processor 1400 may control the light source driver 1312 to calculate the magnitude of the magnetic field generated around the working coil 1120 by detecting the induced current flowing in the sensing coil 1311. The processor 1400 may control the light source driver 1312 to calculate the amount of power transmitted by the wireless power transmitter 1100.

The light source 1313 according to an embodiment of the disclosure may emit light according to an operation of the light source driver 1312. For example, the light source 1313 may include a plurality of light-emitting diodes (LEDs). However, embodiments of the disclosure are not limited thereto, and the light source 1313 may include one or more light-emitting units.

The light source 1313 according to an embodiment of the disclosure may emit light due to the power received from the light source driver 1312. When the light source driver 1312 detects the induced current flowing in the sensing coil 1311, the light source driver 1312 may transmit the induced current to the light source 1313. The light source 1313 may emit light due to the induced current flowing in the sensing coil 1311. The processor 1400 may control the light source driver 1312 to change the light emission intensity, light emission color, and light emission form of the light source 1313 according to the amount of power transmitted by the wireless power transmitter 1100.

The light source driver 1312 according to an embodiment of the disclosure may change the light emission intensity, light emission color, and light emission form of the light source 1313. For example, the light source driver 1312 may change the light emission intensity of the light source 1313 by controlling the number of LEDs emitting light among the LEDs included in the light source 1313. For example, the LEDs included in the light source 1313 may include a red diode, a green diode, and a blue diode. The light source driver 1312 may change the light emission color of the light source 1313 by controlling the type of LED that transmits a current among the red diode, the green diode, and the blue diode. For example, the LEDs included in the light source 1313 may be arranged in a circular shape with a constant thickness. In order to transmit a current to an LED at a desired position, the light source driver 1312 may set whether to transmit the current according to the arrangement position of the LED, thereby changing the light emission form of the light source 1313.

The processor 1400 may control overall operations of the wireless power transmission device 1000. The processor 1400 may control the wireless power transmitter 1100, the communication interface 1200, and the light source driver 1312 by executing programs stored in a memory.

The processor 1400 according to an embodiment of the disclosure may control the wireless power transmitter 1100 to transmit the first power supplied by the working coil 1120 to the cooking appliance 2000. For example, the processor 1400 may transmit a heating operation signal to the wireless power transmitter 1100. In response to the heating operation signal, the wireless power transmitter 1100 may transmit first power for heating the contents in the cooking appliance 2000 by using the working coil 1120. For example, the processor 1400 may transmit a power supply signal to the wireless power transmitter 1100. In response to the power supply signal, the wireless power transmitter 1100 may transmit first power for operating the cooking appliance 2000 by using the working coil 1120.

The processor 1400 according to an embodiment of the disclosure may control the light source driver 1312 to measure second power induced in the sensing coil 1311 while the first power is being transmitted. As the working coil 1120 transmits the first power, the second power may be induced in the sensing coil 1311. The processor 1400 may transmit a power measurement signal to the light source driver 1312. The light source driver 1312 may measure the second power induced in the sensing coil 1311, in response to the power measurement signal.

The processor 1400 according to an embodiment of the disclosure may control the light source driver 1312 to set at least one of the light emission intensity of the light source 1313, the light emission color of the light source 1313, or the light emission form of the light source 1313, based on the amount of the second power. The processor 1400 may transmit a light source driving signal to the light source driver 1312. The processor 1400 may include, in the light source driving signal, information related to at least one of the light emission intensity of the light source 1313, the light emission color of the light source 1313, or the light emission form of the light source 1313, based on the amount of the second power. The light source driver 1312 may drive the light source 1313 to emit light, in response to the light source driving signal. The light source driver 1312 may drive the light source 1313 to emit light, based on the information related to at least one of the light emission intensity of the light source 1313, the light emission color of the light source 1313, or the light emission form of the light source 1313 included in the light source driving signal.

Figure 3:
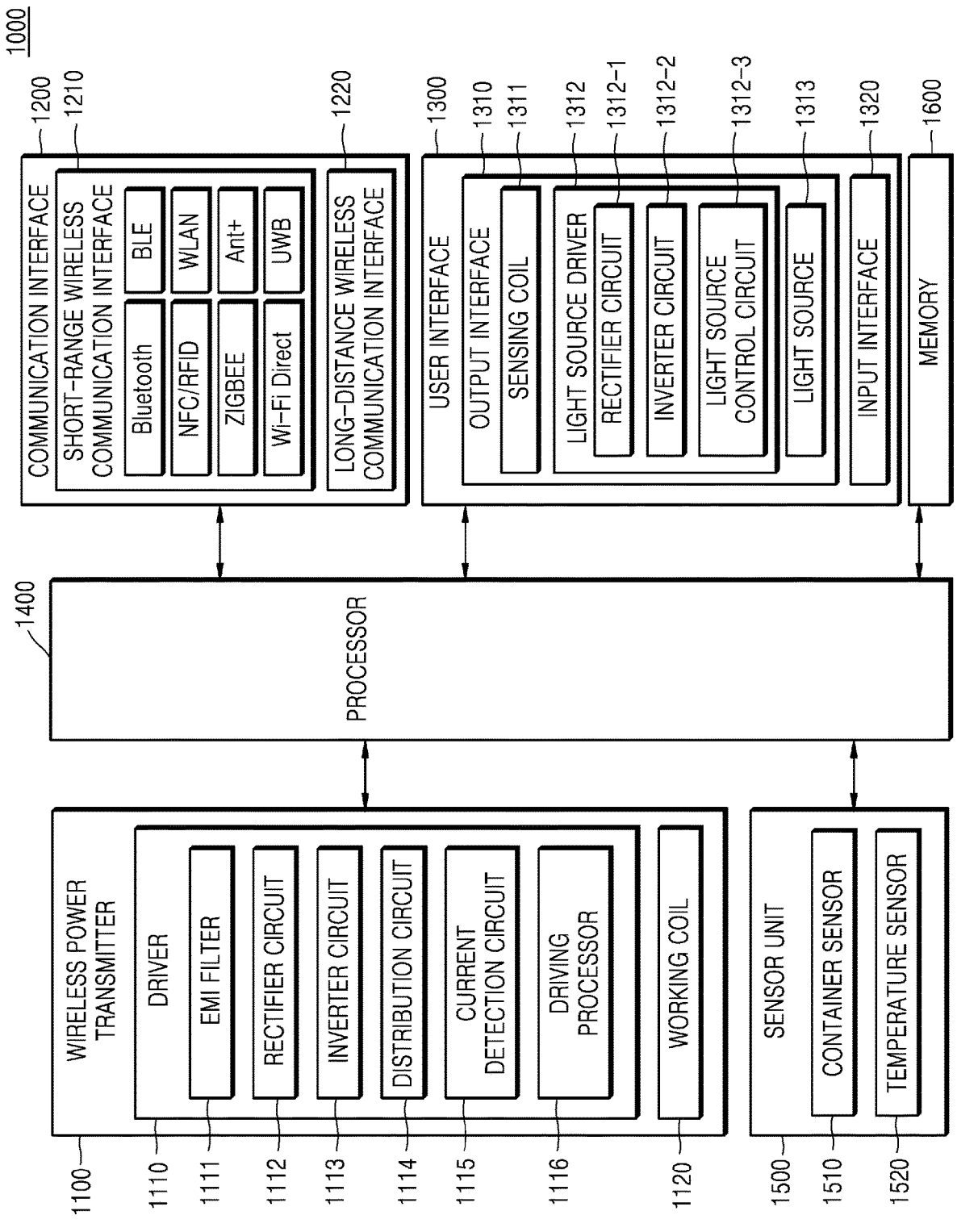
FIG. 3 is a block diagram of a wireless power transmission device according to an embodiment of the disclosure.

FIG. 3 is a block diagram of the wireless power transmission device according to an embodiment of the disclosure.

Referring to FIG. 3, the wireless power transmission device 1000 according to an embodiment of the disclosure may include a wireless power transmitter 1100, a communication interface 1200, a user interface 1300, a sensor unit 1500, and a memory 1600.

The wireless power transmitter 1100 may include a driver 1110 and a working coil 1120. The driver 1110 may receive power from an external source, and may supply a current to the working coil 1120 according to a driving control signal of the processor 1400. The working coil 1120 may wirelessly transmit power to the cooking appliance 2000. The driver 1110 may include an electromagnetic interference (EMI) filter 1111, a rectifier circuit 1112, an inverter circuit 1113, a distribution circuit 1114, a current detection circuit 1115, and a driving processor 1116.

The EMI filter 2111 may block high-frequency noise included in AC power supplied from an external source. The EMI filter 2111 may transmit an AC voltage and an AC current of a predetermined frequency (e.g., 50 Hz or 60 Hz). A fuse and a relay may be provided between the EMI filter 1111 and the external source in order to block overcurrent. AC power of which high-frequency noise has been blocked by the EMI filter 1111 may be supplied to the rectifier circuit 1112.

The rectifier circuit 1112 may convert the AC power to direct current (DC) power. For example, the rectifier circuit 1112 may convert an AC voltage whose a magnitude and a polarity (positive voltage or negative voltage) change over time into a DC voltage whose a magnitude and a polarity are constant, and may convert an AC current whose a magnitude and a polarity (positive current or negative current) change over time to a DC current having a constant magnitude. The rectifier circuit 1112 may include a bridge diode. For example, the rectifier circuit 1112 may include a bridge diode including four diodes. The bridge diode may convert an AC voltage whose polarity changes over time to a positive voltage whose polarity is constant, and may convert an AC current whose direction changes over time to a positive current whose direction is constant. The rectifier circuit 1112 may include a DC link capacitor. The DC link capacitor may convert a positive voltage whose magnitude changes with time to a DC voltage having a constant magnitude.

The inverter circuit 1113 may include a switching circuit that supplies or blocks a driving current to or from the working coil 1120, and a resonance circuit that causes resonance together with the working coil 1120. The switching circuit may include a first switch and a second switch. The first switch and the second switch may be connected in series between a plus line and a minus line output by the rectifier circuit 1112. The first switch and the second switch may be turned on or off according to a driving control signal of the driving processor 1116.

The inverter circuit 1113 may control a current that is supplied to the working coil 1120. For example, the magnitude and direction of the current flowing in the working coil 1120 may change according to turning on/off of the first switch and the second switch included in the inverter circuit 1113. In this case, an AC current may be supplied to the working coil 1120. An AC current in the form of a sine wave is supplied to the working coil 1120 according to switching operations of the first switch and the second switch. The longer respective switching periods of the first switch and the second switch (e.g., the smaller respective switching frequencies of the first switch and the second switch are), the larger the current supplied to the working coil 1120 may be, and the larger the intensity of a magnetic field output by the working coil 1120 (output of the wireless power transmission device 1000) may be.

When the wireless power transmission device 1000 according to an embodiment of the disclosure includes a plurality of working coils 1120, the driver 1110 may include the distribution circuit 1114. The distribution circuit 1114 may include a plurality of switches that pass or block a current supplied to the plurality of working coils 2120. The plurality of switches included in the distribution circuit 1114 may be turned on or off in response to a distribution control signal of the driving processor 1116.

The current sensing circuit 1115 may include a current sensor that measures the current output by the inverter circuit 1113. The current sensor may transmit an electrical signal corresponding to the value of the measured current to the driving processor 1116.

The driving processor 1116 may determine a switching frequency (turn-on/turn-off frequency) of the switching circuit included in the inverter circuit 1113, based on the output intensity (power level) of the wireless power transmission device 1000. The driving processor 1116 may generate a driving control signal for turning on/off the switching circuit according to the determined switching frequency.

The communication interface 1200 according to an embodiment of the disclosure may establish wireless communication connection with the cooking appliance 2000. The communication interface 1200 may include one or more components for establishing wireless communication connection with the cooking appliance 2000. The communication interface 1200 may include one or more components that enable communication between the wireless power transmission device 1000 and the cooking appliance 2000 or between the wireless power transmission device 1000 and a server device. For example, the communication interface 1200 may include a short-range wireless communication interface 1210 and a long-distance wireless communication interface 1220. Examples of the short-range wireless communication interface 1220 may include, but are not limited to, a Bluetooth communication interface, a Bluetooth Low Energy (BLE) communication interface, a near field communication (NFC) interface, a wireless local area network (WLAN) (e.g., Wi-Fi) communication interface, a ZigBee communication interface, an infrared data association (IrDA) communication interface, a Wi-Fi direct (WFD) communication interface, an ultra wideband (UWB) communication interface, and an Ant+ communication interface. When the cooking appliance 2000 is remotely controlled by a server device (not shown) in an Internet of things (IoT) environment, the long-distance wireless communication interface 1220 may be used to communicate with the server device. The long-distance wireless communication interface 1220 may include the Internet, a computer network (e.g., a LAN or a WAN), and a mobile communication interface. The mobile communication interface transmits or receives a wireless signal to or from at least one of a base station, an external terminal, or a server on a mobile communication network. Here, examples of the wireless signal may include a voice call signal, a video call signal, and various types of data according to text/multimedia message exchange. The mobile communication interface may include, but is not limited to, a third-generation (3G) module, a fourth-generation (4G) module, an LTE module, a fifth-generation (5G) module, a sixth-generation (6G) module, an NB-IoT module, and an LTE-M module.

The user interface 1300 may include an output interface 1310 and an input interface 1320. The output interface 1310 according to an embodiment of the disclosure may include a sensing coil 1311, the light source driver 1312, and a light source 1313. The input interface 1320 according to an embodiment of the disclosure may be a component corresponding to a user manipulator 1700.

The sensing coil 1311 according to an embodiment of the disclosure may be arranged adjacent to the working coil 1120. For example, the sensing coil 1311 may be arranged to surround an outer side edge of the working coil 1120. The sensing coil 1311 may be affected by the power transmitted by the wireless power transmitter 1100. For example, a current induced by the magnetic field generated around the working coil 1120 may flow in the sensing coil 1311.

The sensing coil 1311 according to an embodiment of the disclosure may be electrically connected to the light source driver 1312. The sensing coil 1311 may transmit, to the light source driver 1312, the current induced by the magnetic field generated around the working coil 1120.

The light source driver 1312 according to an embodiment of the disclosure may be electrically connected to the sensing coil 1311. The light source driver 1312 may detect the amount of power transmitted by the wireless power transmitter 1100 by using the sensing coil 1311. The light source driver 1312 may detect the magnetic field generated around the working coil 1120 by using the sensing coil 1311. The light source driver 1312 may detect the magnetic field generated around the working coil 1120 by detecting an induced current flowing in the sensing coil 1311. The light source driver 1312 may include a rectifier circuit 1312-1, an inverter circuit 1312-2, and a light source control circuit 1312-3. The functions and roles of the rectifier circuit 1312-1, the inverter circuit 1312-2, and the light source control circuit 1312-3 will be described with reference to FIG. 6. The processor 1400 may control the light source driver 1312 to calculate the magnitude of the magnetic field generated around the working coil 1120 by detecting the induced current flowing in the sensing coil 1311. The processor 1400 may control the light source driver 1312 to calculate the amount of power transmitted by the wireless power transmitter 1100.

The amount of the second power may vary depending on the transmission amount of the first power and the characteristics of the cooking appliance 2000. For example, the amount of the second power for the cooking appliance 2000 may be proportional to the amount of the first power for the cooking appliance 2000. For example, when the characteristics of the cooking appliance 2000 change, even when the amount of the first power for the cooking appliance 2000 is the same, the amount of the second power for the cooking appliance 2000 may change. The characteristics of the cooking appliance 2000 may include at least one of the material of the cooking appliance 2000, the size of the cooking appliance 2000, the placement position of the reception coil of the cooking appliance 2000, the size of the reception coil, or the inductance of the reception coil. The processor 1400 may use the sensing coil 1311 to sense the transmission amount of the first power and the amount of the second power that changes according to the characteristics of the cooking appliance 2000. The processor 1400 may control the light source driver 1312 to set the light emission intensity, light emission color, and light emission form of the light source 1313 by reflecting an actual heating degree or actual wireless power transmission degree of the working coil 1120. In addition, the processor 1400 may set the light emission intensity, light emission color, and light emission form of the light source 1313 by using the intensity of the second power induced in the sensing coil 1313 by an electromagnetic field not transmitted by the working coil 1120 to the cooking appliance 2000 while the first power is being transmitted, without affecting the first power transmitted by the operating coil 1120 to the cooking appliance 2000. Accordingly, the processor 1400 may easily inform the user of the actual heating degree or the actual wireless power transmission degree without affecting the power transmission efficiency of the wireless power transmission device 1000.

The light source 1313 according to an embodiment of the disclosure may emit light according to an operation of the light source driver 1312. For example, the light source 1313 may include a plurality of LEDs. However, embodiments of the disclosure are not limited thereto, and the light source 1313 may include one or more light-emitting units. The light source 1313 according to an embodiment of the disclosure may include at least one selected from a liquid crystal display (LCD), a thin film transistor-liquid crystal display (TFT-LCD), a light-emitting diode (LED), an organic light-emitting diode (OLED), a flexible display, a three-dimensional (3D) display, and an electrophoretic display. The wireless power transmission device 1000 according to an embodiment of the disclosure may include a plurality of light sources 1313. For example, the wireless power transmission device 1000 may include light sources 1313 arranged to surround the plurality of cooking zones 1800, respectively.

The light source 1313 according to an embodiment of the disclosure may emit light due to the power received from the light source driver 1312. When the light source driver 1312 detects the induced current flowing in the sensing coil 1311, the light source driver 1312 may transmit the induced current to the light source 1313. The light source 1313 may emit light due to the induced current flowing in the sensing coil 1311. The processor 1400 may control the light source driver 1312 to change the light emission intensity, light emission color, and light emission form of the light source 1313 according to the amount of power transmitted by the wireless power transmitter 1100.

The light source driver 1312 according to an embodiment of the disclosure may change the light emission intensity, light emission color, and light emission form of the light source 1313. For example, the light source driver 1312 may change the light emission intensity of the light source 1313 by controlling the number of LEDs emitting light among the LEDs included in the light source 1313. For example, the LEDs included in the light source 1313 may include a red diode, a green diode, and a blue diode. The light source driver 1312 may change the light emission color of the light source 1313 by controlling the type of LED that transmits a current among the red diode, the green diode, and the blue diode. For example, the LEDs included in the light source 1313 may be arranged in a circular shape with a constant thickness. In order to transmit a current to an LED at a desired position, the light source driver 1312 may set whether to transmit the current according to the arrangement position of the LED, thereby changing the light emission form of the light source 1313.

The output interface 1310 according to an embodiment of the disclosure may further include a display unit and an audio output interface. The display unit according to an embodiment of the disclosure may display information about the cooking appliance 2000. For example, the display unit may output a graphical user interface (GUI) corresponding to identification information or product type information of the cooking appliance 2000. For example, the display unit may output information about the current location of the cooking appliance 2000. The audio output interface according to an embodiment of the disclosure may output audio data received from the communication interface 1200 or stored in the memory 1600. For example, the sound output interface may output sound signals related to functions performed by the wireless power transmission device 1000. For example, the audio output interface may include a speaker, a buzzer, etc.

According to an embodiment of the disclosure, the processor 1400 may control the inverter circuit 1113 so that the plurality of working coils 1120 generate magnetic fields according to a plurality of different power transmission patterns, and then, when the output interface 1310 does not receive information about the cooking zone 1800 in which the cooking appliance 2000 is located within a predetermined time period, the output interface 1310 may output a notification instructing to confirm the location of the cooking appliance 2000. In addition, according to an embodiment of the disclosure, the output interface 1310 may output a notification instructing to confirm the location of the cooking appliance 2000, as the communication connection with the cooking appliance 2000 is terminated.

The input interface 1320 is for receiving an input from a user. The input interface 1320 may include, but is not limited to, at least one of a key pad, a dome switch, a touch pad (e.g., a capacitive overlay type, a resistive overlay type, an infrared beam type, an integral strain gauge type, a surface acoustic wave type, a piezoelectric type, or the like), a jog wheel, or a jog switch.

The input interface 1320 may include a voice recognition module. For example, the wireless power transmission device 1000 may receive a speech signal, which is an analog signal, through a microphone, and convert the speech signal to computer-readable text by using an automatic speech recognition (ASR) model. The wireless power transmission device 1000 may also obtain a user's utterance intention by interpreting the converted text using a natural language understanding (NLU) model. The ASR model or the NLU model may be an artificial Intelligence (AI) model. The AI model may be processed by an AI-only processor designed with a hardware structure specialized for processing the AI model. The AI model may be created through learning. Here, being created through learning means that a basic AI model is trained using a plurality of training data by a learning algorithm, so that a predefined operation rule or AI model set to perform desired characteristics (or a desired purpose) is created. The AI model may include a plurality of neural network layers. Each of the plurality of neural network layers has a plurality of weight values, and performs a neural network operation through an operation between an operation result of a previous layer and the plurality of weight values.

Linguistic understanding is a technology that recognizes and applies/processes human language/character, and thus includes natural language processing, machine translation, a dialog system, question answering, and speech recognition/speech recognition/synthesis, etc.

According to an embodiment of the disclosure, the processor 1400 may be an artificial intelligence (AI) processor. The AI processor may be manufactured in the form of an exclusive hardware chip for AI, or may be manufactured as a part of an existing general-purpose processor (for example, a CPU or an AP) or a graphic-exclusive processor (for example, a graphic processing unit (GPU)) and may be mounted on the wireless power transmission device 1000.

The processor 1400 according to an embodiment of the disclosure may control the wireless power transmitter 1100 to supply power of a preset level to the cooking appliance 2000 in order to drive the communication interface of the cooking appliance 2000. The processor 1400 may receive a first wireless communication signal transmitted by the communication interface of the cooking appliance 2000, when the communication interface of the cooking appliance 2000 is driven. The first wireless communication signal may include, but is not limited to, identification information (e.g., a MAC address) of the cooking appliance 2000 or information indicating that the current location of the cooking appliance 2000 is unknown.

When the processor 1400 according to an embodiment of the disclosure detects the first wireless communication signal transmitted by the cooking appliance 2000, the processor 1400 may control the wireless power transmitter 1100 so that the plurality of working coils 1120 generate a magnetic field according to a plurality of different power transmission patterns. The plurality of power transmission patterns may be set differently based on at least one of the maintenance time of a power transmission section, the maintenance time of a power cutoff section, a power level, or an operating frequency. For example, the processor 1400 may control the wireless power transmitter 1100 to transmit power by differently combining the maintenance time of the power transmission section, the maintenance time of the power cutoff section, or the power level (operating frequency) for each cooking zone 1800.

The processor 1400 according to an embodiment of the disclosure may receive, from the cooking appliance 200 via the communication interface 1200, a second wireless communication signal including information about a first cooking zone 1800 corresponding to a first power transmission pattern detected at the location of the cooking appliance 2000 among the plurality of power transmission patterns and identification information (or product type information) of the cooking appliance 2000. Based on the second wireless communication signal, the processor 1400 may output, through the output interface 1310, the information about the first cooking zone 1800 where the cooking appliance 2000 is located among the plurality of cooking zones 1800 and the identification information (or product type information) of the cooking appliance 2000.

According to an embodiment of the disclosure, when the processor 1400 does not receive a first wireless communication signal from the cooking appliance 2000 within a predetermined time after detecting that the cooking appliance 2000 is located on the top plate of the wireless power transmission device 1000, the processor 1400 may recognize the cooking appliance 2000 as a general induction heating container. As the processor 1400 detects the first wireless communication signal transmitted from the cooking appliance 2000 through the communication interface 1200, the processor 1400 may recognize the cooking appliance 2000 as a communication-capable heater cooking appliance or a non-heating cooking appliance. An operation, performed by the wireless power transmission device 1000, of identifying the type of the cooking appliance 2000 will be described with reference to FIG. 19.

According to an embodiment of the disclosure, the processor 1400 may perform a communication connection with the cooking appliance 2000, based on communication connection information included in the second wireless communication signal, and may control the wireless power transmitter 1100 to transmit a first level of power (small power) to a pickup coil of the cooking appliance 2000 in order to maintain a communication connection with the cooking appliance 2000. In addition, as a heating command for the cooking appliance 2000 is received from the user, the processor 1400 may control the wireless power transmitter 1100 to transmit a second level of power (large power) to the cooking appliance 2000 in order to heat the cooking appliance 2000. The first level of power is less than the second level of power. The processor 1400 may also control power transmission to the cooking appliance 2000, based on power control information (e.g., a power level value or maintenance time information) received from the cooking appliance 2000. In this case, the power control information may be determined based on recipe information currently being applied to the cooking appliance 2000.

The sensor unit 1500 may include a container detection sensor 1510 and a temperature sensor 1520, but embodiments of the disclosure are not limited thereto.

The container detection sensor 1510 may be a sensor that detects that the cooking appliance 1000 is placed on the top plate of the wireless power transmission device 1000. For example, the container detection sensor 1510 may be implemented as a current sensor, but embodiments of the disclosure are not limited thereto. The container detection sensor 1510 may be implemented as at least one of a proximity sensor, a touch sensor, a weight sensor, a temperature sensor, an illuminance sensor, or a magnetic sensor.

The temperature sensor 1520 may detect the temperature of the cooking appliance 2000 placed on the top plate of the wireless power transmission device 1000 or the temperature of the top plate of the wireless power transmission device 1000. The cooking appliance 2000 may be inductively heated by the working coil 1120 of the wireless power transmission device 1000. The inductively-heated cooking appliance 2000 may be overheated according to materials of the cooking appliance 2000. Accordingly, the wireless power transmission device 1000 may detect the temperature of the cooking appliance 2000 placed on the top plate of the wireless power transmission device 1000 or the temperature of the top plate by using the temperature sensor 1520, and may block an operation of the working coil 1120 when the cooking appliance 2000 or the top plate is overheated. The temperature sensor 1520 may be installed near the working coil 1120. For example, the temperature sensor 1520 may be located at the center of the working coil 1120.

According to an embodiment of the disclosure, the temperature sensor 1520 may include a thermistor whose electrical resistance value changes according to temperature. For example, the temperature sensor 1520 may be, but is not limited to, a negative temperature coefficient (NTC) temperature sensor. The temperature sensor 1520 may be a positive temperature coefficient (PTC) temperature sensor.

The memory 1600 may store a program for processing and control of the processor 1400, and may store input/output data (for example, a plurality of power transmission patterns and cooking progress information of the cooking appliance 2000). The memory 1600 may store an AI model.

The memory 1600 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk. The programs stored in the memory 1600 may be classified into a plurality of modules according to their functions. The memory 1600 may store at least one AI model. The wireless power transmission device 1000 may operate a web storage or cloud server which performs a storage function on the Internet, separate from the memory 1600.

Structures of the working coil 1120, the sensing coil 1311, and the light source 1313 of the wireless power transmission device 1000 will now be described with reference to FIG. 4.

Figure 4:
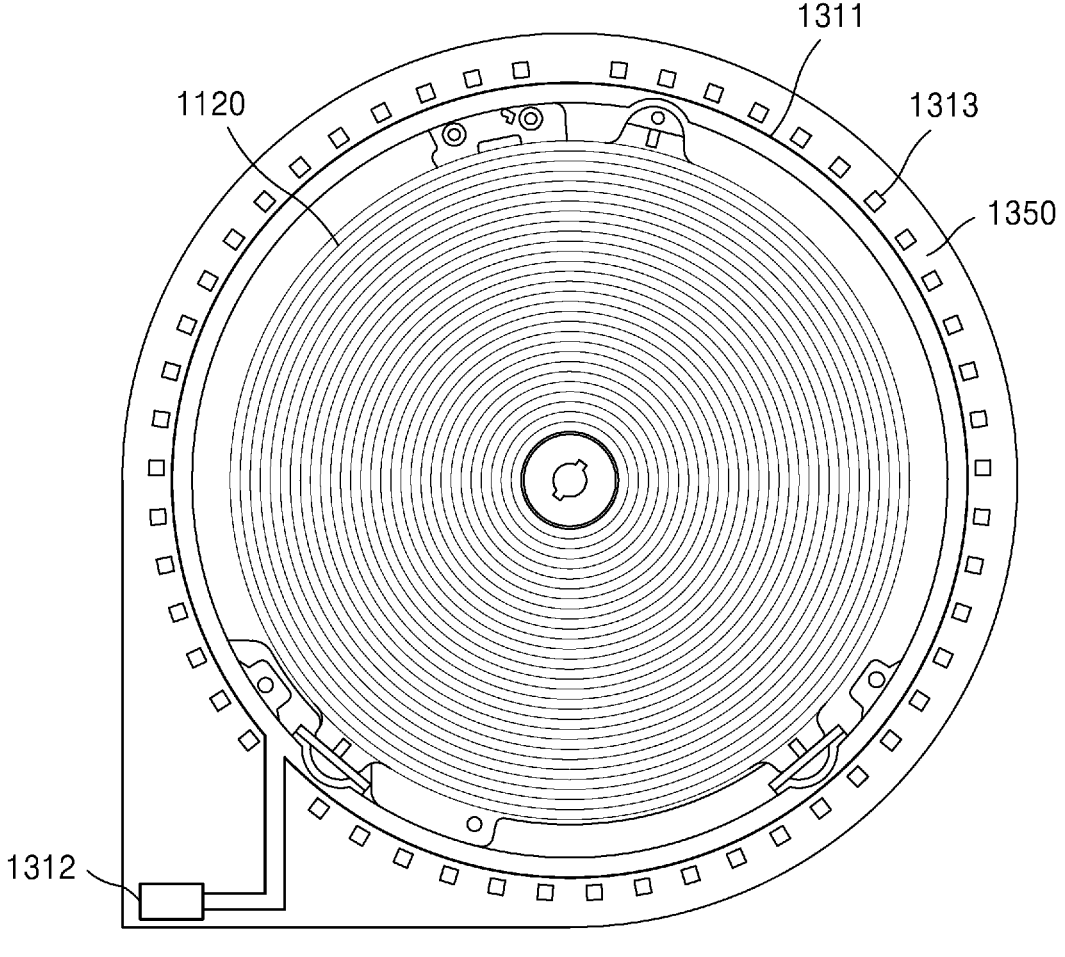
FIG. 4 is a view of a wireless power transmission device according to an embodiment of the disclosure.

FIG. 4 is a block diagram of the wireless power transmission device according to an embodiment of the disclosure.

Referring to FIG. 4, the wireless power transmission device 1000 may include a working coil 1120, the sensing coil 1311, a light source controller 1312, a light source 1313, and a heat-resistant substrate 1350.

The working coil 1120 may be disposed at the center of the cooking zone 1800 of the wireless power transmission device 1000. The working coil 1120 may generate an electromagnetic field toward the top of the cooking zone 1800 of the wireless power transmission device 1000. The working coil 1120 may wirelessly transmit first power to the cooking appliance 2000 disposed on the cooking zone 1800 of the wireless power transmission device 1000. The first power may be power delivered to the cooking appliance 2000 to heat the contents of the cooking appliance 2000 or to operate the cooking appliance 2000.

The sensing coil 1311 may be arranged to surround the working coil 1120. For example, the sensing coil 1311 may be arranged to surround an outer side edge of the working coil 1120. For example, the sensing coil 1311 may be arranged to surround the working coil 1120 in a circle. Second power induced by the first power transmitted from the working coil 1120 may be generated in the sensing coil 1311. The sensing coil 1311 may be electrically connected to the light source driver 1312. The sensing coil 1311 may transmit the second power to the light source driver 1312.

The light source driver 1312 may be arranged apart from the working coil 1120. The light source driver 1312 may receive the second power from the sensing coil 1311. The light source driver 1312 may set at least one of the light emission intensity, light emission color, or light emission form of the light source 1313, based on the amount of the second power.

The light source 1313 may be arranged to surround the working coil 1120. The light source 1313 may be arranged to surround at least a portion of an outer side edge of the sensing coil 1311. For example, as shown in FIG. 4, a plurality of light-emitting units constituting the light source 1313 may be arranged in a circle along the outer side edge of the sensing coil 1311. However, embodiments of the disclosure are not limited thereto. For example, a plurality of light-emitting units constituting the light source 1313 may be partially arranged along the outer side edge of the sensing coil 1311. For example, each of the plurality of light-emitting units may be an LED. Accordingly, the sensing coil 1311 may be disposed between the working coil 1120 and the light source 1313. The light source 1313 may emit light under the control by the light source driver 1312. The processor 1400 may control the light source driver 1312 to set at least one of the light emission intensity, light emission color, or light emission form of the light source 1313, based on the amount of the second power.

The heat-resistant substrate 1350 may be arranged to surround the working coil 1120. The heat-resistant substrate 1350 may be formed of a material that may be used in a high temperature state. For example, the heat-resistant substrate 1350 may be made of a thermoplastic polymer with excellent heat-resistant properties, such as polybutylene terephthalate (PBT).

The sensing coil 1311 may be arranged on the heat-resistant substrate 1350. For example, the sensing coil 1311 may be disposed on the heat-resistant substrate 1350 using a printed electronics method. The sensing coil 1311 may be disposed on an upper surface of the heat-resistant substrate 1350, or may be disposed inside the heat-resistant substrate 1350, such as to be adjacent to the upper surface of the heat-resistant substrate 1350. For example, the heat-resistant substrate 1350 may be manufactured using an injection method. The heat-resistant substrate 1350 may have a shape capable of accommodating the sensing coil 1311. For example, the heat-resistant substrate 1350 may be provided with a groove or recess capable of accommodating the sensing coil 1311.

The light source 1313 may be arranged on the heat-resistant substrate 1350. The light source 1313 may be disposed on the upper surface of the heat-resistant substrate 1350, or may be disposed inside the heat-resistant substrate 1350, such as to be adjacent to the upper surface of the heat-resistant substrate 1350. For example, the heat-resistant substrate 1350 may be provided with a groove or recess capable of accommodating the light source 1313.

Structures of the working coil 1120, the sensing coil 1311, and the light source 1313 of the wireless power transmission device 1000 will now be described with reference to FIG. 5.

Figure 5:
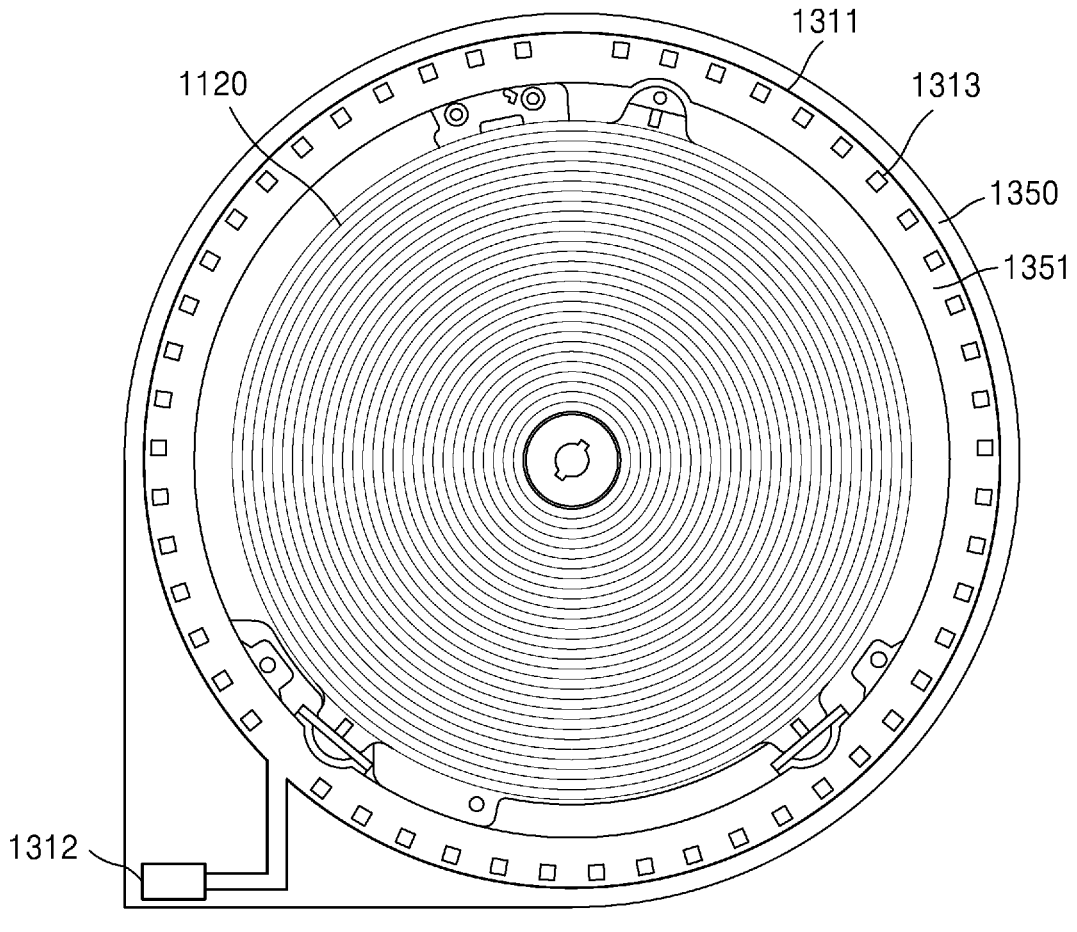
FIG. 5 is a view of a wireless power transmission device according to an embodiment of the disclosure.

FIG. 5 is a block diagram of the wireless power transmission device according to an embodiment of the disclosure.

Referring to FIG. 5, the wireless power transmission device 1000 may include the working coil 1120, the sensing coil 1311, a light source controller 1312, a light source 1313, and a heat-resistant substrate 1350. The working coil 1120, the light source controller 1312, and the heat-resistant substrate 1350 of FIG. 5 have substantially the same structures and functions as the working coil 1120, the light source controller 1312, and the heat-resistant substrate 1350 of FIG. 4. A description of FIG. 5 will focus on changes compared to FIG. 4.

The sensing coil 1311 may be arranged to surround the light source 1313. For example, the sensing coil 1311 may be arranged to surround an outer side edge of the light source 1313. For example, the sensing coil 1311 may be arranged to surround the light source 1313 in a circle. For example, as shown in FIG. 5, the sensing coil 1311 may be arranged along outer side edges of the plurality of light-emitting units constituting the light source 1313, in a circle. However, embodiments of the disclosure are not limited thereto. For example, the plurality of light-emitting units constituting the light source 1313 may be partially arranged along an inner side edge of the sensing coil 1311. For example, each of the plurality of light-emitting units may be an LED. Second power induced by the first power transmitted from the working coil 1120 may be generated in the sensing coil 1311. The sensing coil 1311 may be electrically connected to the light source driver 1312. The sensing coil 1311 may transmit the second power to the light source driver 1312.

The light source 1313 may be disposed between the working coil 1120 and the sensing coil 1311. The light source 1313 may be arranged on a gap region 1351. The gap region 1351 may be a space between the working coil 1120 and the sensing coil 1311 on the heat-resistant substrate 1350. The gap region 1351 may be a buffer region formed between the working coil 1120 and the sensing coil 1311. The second power may be induced in the sensing coil 1311 by an electromagnetic field generated when the working coil 1120 transmits the first power. The light source 1313 may be disposed in the gap region 1351 to visually express the amount of the second power.

When the wireless power transmission device 1000 wirelessly transmits the first power to heat the cooking appliance 2000, an electromagnetic field may be generated in the working coil 1120. The sensing coil 1311 may be arranged adjacent to the working coil 1120. Second power may be induced in the sensing coil 1311 by the electromagnetic field generated in the working coil 1120. The sensing coil 1311 may wirelessly receive the first power from the working coil 1120. The second power may flow in the sensing coil 1311 having received the first power.

A circuit structure for detecting the amount of second power induced in a sensing coil will now be described with reference to FIG. 6.

Figure 6:
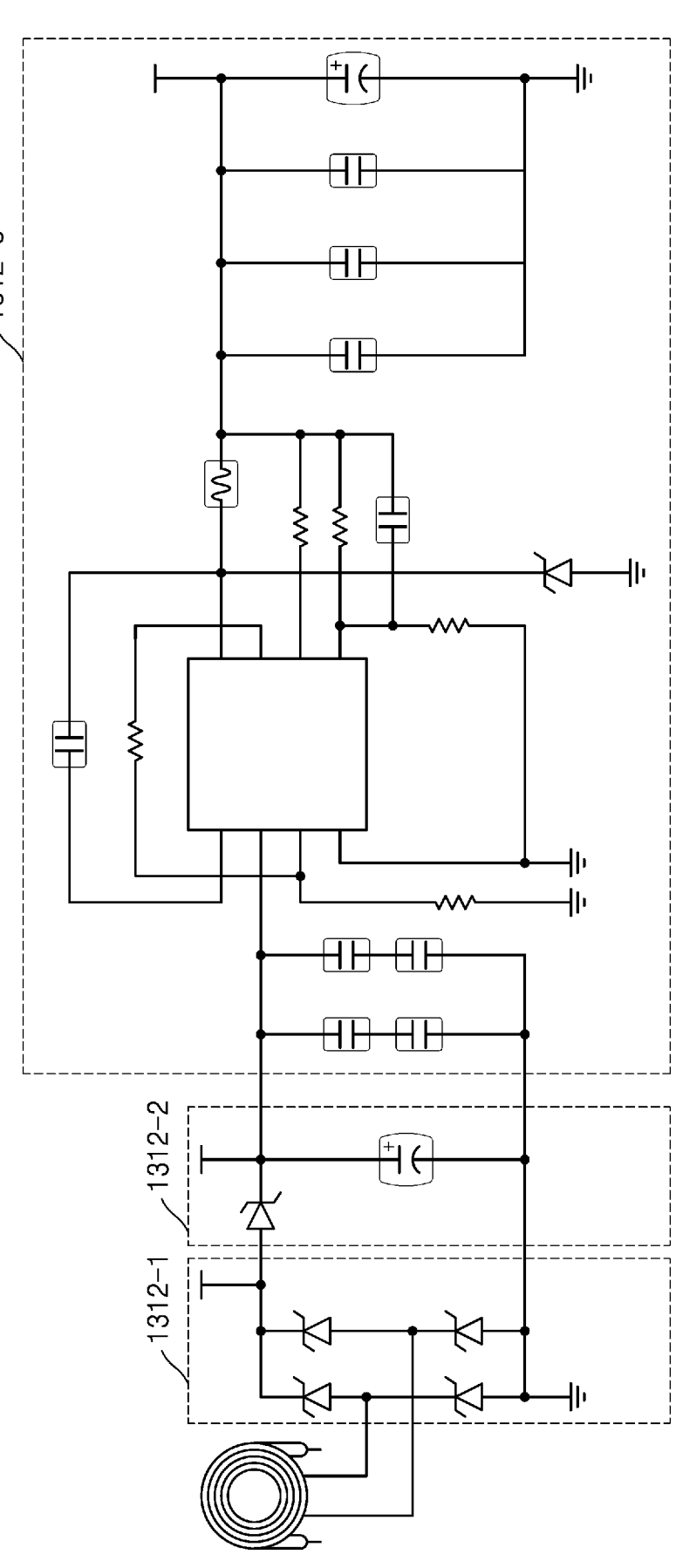
FIG. 6 is a circuit diagram of a wireless power transmission device according to an embodiment of the disclosure.

FIG. 6 is a circuit diagram of the wireless power transmission device according to an embodiment of the disclosure.

Referring to FIG. 6, the wireless power transmission device 1000 according to an embodiment of the disclosure may include the sensing coil 1311, a rectifier circuit 1312-1, the inverter circuit 1312-2, and a light source control circuit 1312-3.

The rectifier circuit 1312-1 may be a full-wave rectifier circuit. For example, the rectifier circuit 1312-1 may include a bridge circuit. For example, the bridge circuit may include four diodes. The rectifier circuit 1312-1 may be connected to the sensing coil 1311. The rectifier circuit 1312-1 may receive AC-type second power having a sine waveform from the sensing coil 1311. The rectifier circuit 1312-1 may rectify the second power received from the sensing coil 1311. The rectifier circuit 1312-1 may convert a portion with a negative amount in the second power received from the sensing coil 1311 into a portion with a positive amount. The rectifier circuit 1312-1 may transmit, to the inverter circuit 1312-2, the second power of a DC type having a pulsating current after the conversion.

The inverter circuit 1312-2 may include a diode and a capacitor. The inverter circuit 1312-2 may receive DC-type second power having a pulsating current from the rectifier circuit 1312-1. The inverter circuit 1312-2 may smooth the second power having a pulsating current and convert the second power to a DC voltage having a constant magnitude. The magnitude of the DC voltage may be set according to the strength of the electromagnetic field generated by the working coil, the actual degree of heating of the working coil, and the magnitude at which the first power is actually transmitted to the cooking appliance 2000. The inverter circuit 1312-2 may transmit the DC voltage to the light source control circuit 1312-3.

The light source control circuit 1312-3 may include a plurality of switches and a plurality of passive elements. The light source control circuit 1312-3 may receive a DC voltage from the inverter circuit 1312-2. The light source control circuit 1312-3 may supply a voltage to the light source 1313. The light source control circuit 1312-3 may control the brightness and color of the light source 1313. For example, the light source control circuit 1312-3 may selectively supply a voltage to light source units wanting to be driven among a plurality of light source units included in the light source 1313. The light source control circuit 1312-3 may control the brightness and color of the light source 1313 according to the magnitude of the received DC voltage. For example, the light source control circuit 1312-3 may set the number of light source units that are driven among the plurality of light source units included in the light source 1313, according to the magnitude of the received DC voltage. For example, the light source control circuit 1312-3 may determine whether to supply a voltage to one of a red light source unit, a green light source unit, and a blue light source unit included in the light source 1313, according to the magnitude of the received DC voltage. Accordingly, according to the magnitude of the second power received from the sensing coil 1311, the light source control circuit 1312-3 may control the light source 1313 so that the brightness and color of the light source are displayed differently.

Structures of a general IH container, an IH cooking appliance, and a load cooking appliance will now be described with reference to FIG. 7.

Figure 7:
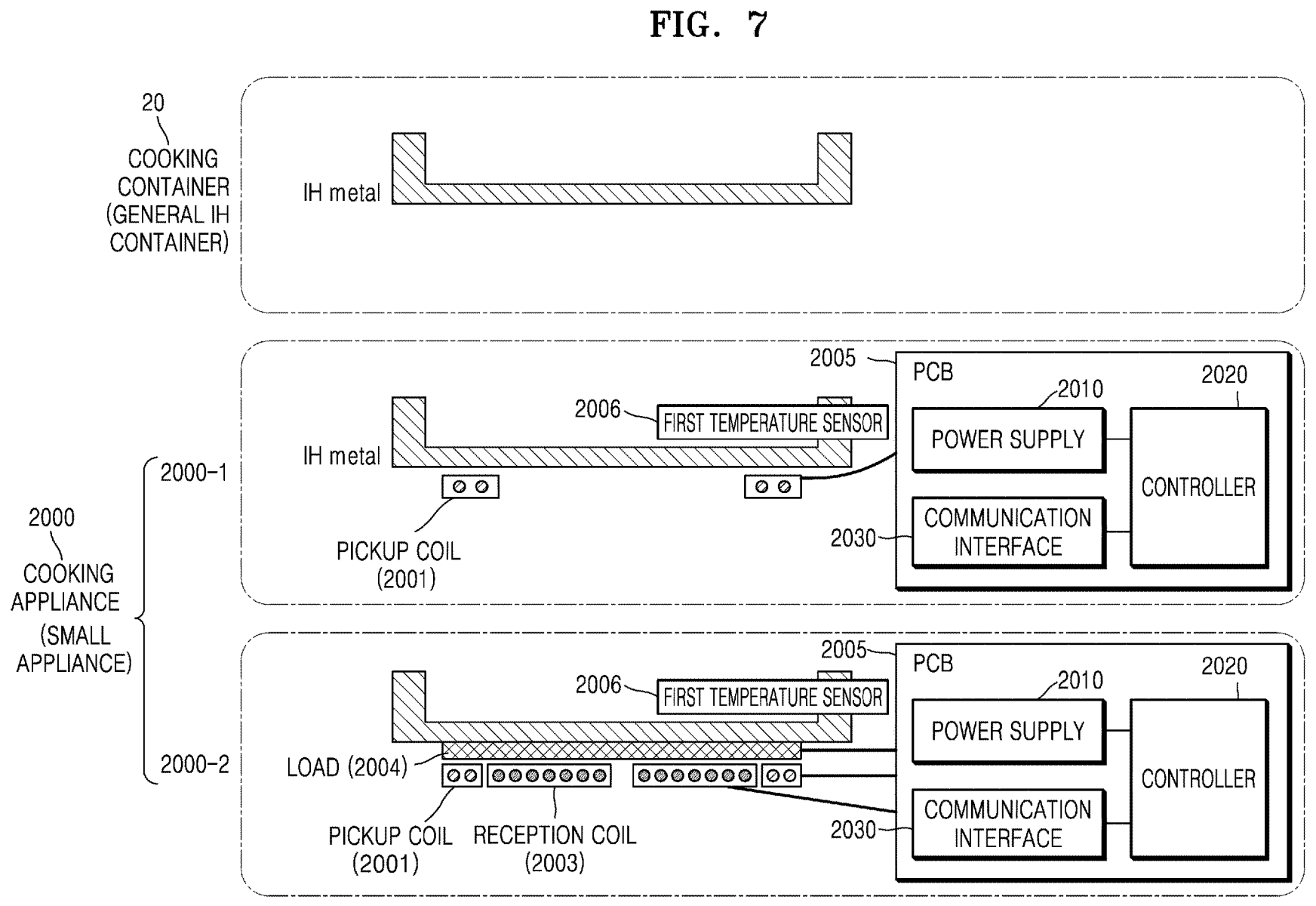

FIG. 7 illustrates a structure of a cooking appliance according to an embodiment of the disclosure.

Referring to FIG. 7, the cooking appliance 2000 according to an embodiment of the disclosure may include a cooking container (general IH container) 20 including a magnetic material (e.g., IH metal) and the cooking appliance 2000 capable of communicating with the wireless power transmission device 1000. The cooking appliance 2000 capable of communicating with the wireless power transmission device 1000 may be defined as a small appliance. According to an embodiment of the disclosure, the cooking appliance 2000 may be classified into an IH cooking appliance 2000-1 including an IH metal (e.g., an iron component), and a load cooking appliance 2000-2 including a reception coil 2003.

The general IH container 20 according to an embodiment of the disclosure may be any of various types of containers including a magnetic material. The general IH container 20 may be inductively heated by the wireless power transmission device 1000. The general IH container 20 may be heated using an inductively heating method of heating an IH metal by using electromagnetic induction. For example, when an AC current is supplied to a working coil of the wireless power transmission device 1000, a temporally changing magnetic field may be induced inside the working coil. The magnetic field generated by the working coil may pass through the bottom surface of the general IH container 20. When the temporarily changing magnetic field passes through the IH metal (e.g., iron, steel, nickel, or various types of alloys) included in the bottom surface of the general IH container 20, a current rotating around the magnetic field may be generated in the IH metal. A current generated in the bottom surface of the general IH container 20 may be referred to as an eddy current. A phenomenon in which a current is induced by a temporally changing magnetic field in the IH metal of the general IH container 20 may be referred to as electromagnetic induction. Heat may be generated in the bottom surface of the general IH container 20 due to the eddy current and resistance of the IH metal (e.g., iron). Contents inside the general IH container 20 may be heated by the heat generated in the bottom surface of the general IH container 20.

According to an embodiment of the disclosure, because the cooking container 20 includes an IH metal, the cooking container 20 may be detected in an IH container detection mode (pan detection mode) of the wireless power transmission device 1000. Because the cooking container 20 is unable to communicate with the wireless power transmission device 1000, the cooking container 20 may not be detected in the small appliance detection mode of the wireless power transmission device 1000.

The cooking appliance 2000 may include a pickup coil 2001, a first temperature sensor 2006, a power supply 2010, a controller 2020, and a communication interface 2030. In this case, the power supply 2010, the controller 2020, and the communication interface 2030 may be mounted on a printed circuit board (PCB) 2005. The pickup coil 2001 may be a low-power coil that generates power for operating the PCB 2005. When power is supplied to the PCB 2005 through the pickup coil 2001, component parts mounted on the PCB 2005 may be activated. For example, when power is supplied to the PCB 2005 through the pickup coil 2001, the controller 2020 and the communication interface 2030 may be activated. The power supply 2010, the controller 2020, and the communication interface 2030 may be mounted on one PCB or may be mounted separately on a plurality of PCBs. For example, the power supply 2010 may be mounted on a first PCB, and the controller 2020 and the communication interface 2030 may be mounted on a second PCB.

In the case of the IH cooking appliance 2000-1, as in the cooking container 20, an eddy current is generated in the IH metal, and accordingly, contents inside the IH cooking appliance 2000-1 may be heated. Examples of the IH cooking appliance 2000-1 may include, but is not limited to, a smart kettle and an electric rice cooker (a smart pot).

Because the IH cooking appliance 2000-1 includes an IH metal, the IH cooking appliance 2000-1 may be detected in the IH container detection mode of the wireless power transmission device 1000. Because the IH cooking appliance 2000-1 is able to communicate with the wireless power transmission device 1000, the IH cooking appliance 2000-1 may be detected in the small appliance detection mode of the wireless power transmission device 1000.

The load cooking appliance 2000-2 may further include the reception coil 2003 and a load 2004, than the IH cooking appliance 2000-1. The reception coil 2003 may be a coil that receives wireless power transmitted from the wireless power transmission device 1000 to drive the load 2004. For example, a magnetic field generated from a current flowing in a working coil of the wireless power transmission device 1000 may pass through the reception coil 2003. As the magnetic field passes through the reception coil 2003, an induced current may flow in the reception coil 2003. Energy (power) may be supplied to the load 2004 due to the induced current flowing in the reception coil 2003. The induced current flowing in the reception coil 2003 by the magnetic field generated in the working coil may be expressed as the reception coil 2003 receiving wireless power from the working coil. According to an embodiment of the disclosure, the reception coil 2003 may have a concentric circle shape or an elliptical shape, but embodiments of the disclosure are not limited thereto. According to an embodiment of the disclosure, a plurality of reception coils 2003 may also be provided. For example, the load cooking appliance 2000-2 may include a reception coil for a warming heater and a reception coil for a heating heater. In this case, the reception coil for the heating heater may drive the heating heater, and the reception coil for the warming heater may drive the warming heater.

The load 2004 may include, but is not limited to, a heater, a motor, or a battery to be recharged. The load cooking appliance 2000-2 including a heater may be referred to as a heater cooking appliance. The load cooking appliance 2000-2 including a motor, etc. may be referred to as a non-heating cooking appliance. The heater is to heat the contents inside the load cooking appliance 2000-2. A shape of the heater included in the heater cooking appliance may vary, and a material (e.g., iron, stainless steel, copper, aluminum, Incoloy, and Incotel) of an external cover of the heater cooking appliance may also vary. According to an embodiment of the disclosure, the heater cooking appliance may also include a plurality of heaters. For example, the load cooking appliance 2000-2 may include a warming heater and a heating heater. The warming heater and the heating heater may produce different levels of heating output. For example, a heating level of the warming heater may be lower than a heating level of the heating heater.

According to an embodiment of the disclosure, the load cooking appliance 2000-2 may further include a resonance capacitor (not shown) between the reception coil 2003 and the load 2004. In this case, a resonance value may be set differently according to the amount of power required by the load 2004. According to an embodiment of the disclosure, the load cooking appliance 2000-2 may further include a switch unit (not shown) (e.g., a relay switch or a semiconductor switch) for turning on/off an operation of the load 2004.

According to an embodiment of the disclosure, the heater cooking appliance among the load cooking appliance 2000-2 may include a coffee dripper and a toaster, for example. According to an embodiment of the disclosure, a non-heating cooking appliance including a motor among the load cooking appliances 2000-2 may include a blender.

Because the load cooking appliance 2000-2 does not include an IH metal, the load cooking appliance 2000-2 may not be detected in the IH container detection mode of the wireless power transmission device 1000. Because the load cooking appliance 2000-2 is able to communicate with the wireless power transmission device 1000, the load cooking appliance 2000-2 may be detected in the small appliance detection mode of the wireless power transmission device 1000.

Structures of a general IH container, an IH cooking appliance including a communication coil, and a load cooking appliance including a communication coil will now be described with reference to FIG. 8.

Figure 8:
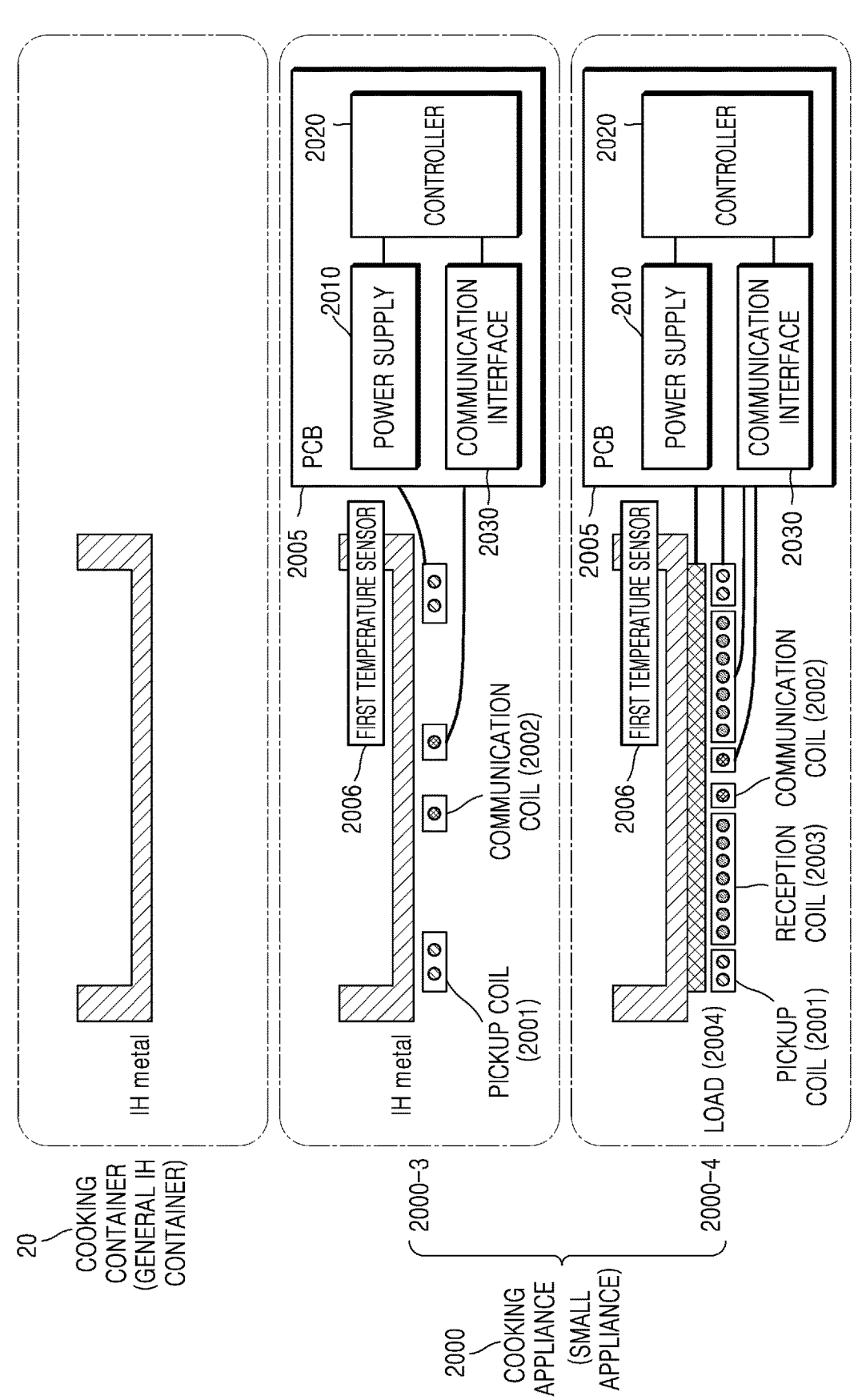
FIG. 8 is a view of a cooking appliance according to an embodiment of the disclosure.

FIG. 8 illustrates a structure of a cooking appliance according to an embodiment of the disclosure.

Referring to FIG. 8, the cooking appliance 2000 may further include a communication coil 2002. The communication coil 2002 may be a coil for performing short-range wireless communication with the wireless power transmission device 1000. For example, the communication coil 2002 may be an NFC antenna coil for NFC communication. In FIG. 8, the number of windings of the communication coil 2002 is expressed as one, but embodiments of the disclosure are not limited thereto. The communication coil 2002 may be provided with a plurality of windings. For example, the communication coil 2002 may be wound in 5 to 6 turns. When the communication coil 2002 is an NFC antenna coil, the communication coil 2002 may be connected to an NFC circuit. The NFC circuit may receive power through the pickup coil 2001.

According to an embodiment of the disclosure, the pickup coil 2001, the communication coil 2002, and the reception coil 2003 in the heater cooking appliance 2000-2 may be disposed on the same layer. For example, referring to FIG. 8, the communication coil 2002 may be disposed on the innermost side, the receiving coil 2003 may be disposed in the middle, and the pickup coil 2001 may be disposed on the outermost side. However, the arrangement order of the pickup coil 2001, the communication coil 2002, and the reception coil 2003 may vary. For example, the reception coil 2003 may be arranged on the innermost side, the pickup coil 2001 may be arranged in the middle, and the communication coil 2002 may be arranged on the outermost side. Alternatively, the reception coil 2003 may be arranged on the innermost side, the communication coil 2002 may be arranged in the middle, and the pickup coil 2001 may be arranged on the outermost side. The pickup coil 2001, the communication coil 2002, and the reception coil 2003 may be arranged in the following order from the innermost side.

1) Pickup coil 2001-reception coil 2003-communication coil 2002;

2) Pickup coil 2001-communication coil 2002-reception coil 2003; and 3) Communication coil 2002-pickup coil 2001-reception coil 2003.

According to an embodiment of the disclosure, the pickup coil 2001, the communication coil 2002, and the reception coil 2003 in the heater cooking appliance 2000-2 may be disposed in a stack structure. For example, the pickup coil 2001 and the communication coil 2002, which do not have many windings, form one layer, and the reception coil 2003 forms another layer, such that two layers may be stacked.

The structure of a cooking appliance will now be described with reference to FIG. 9.

Figure 9:
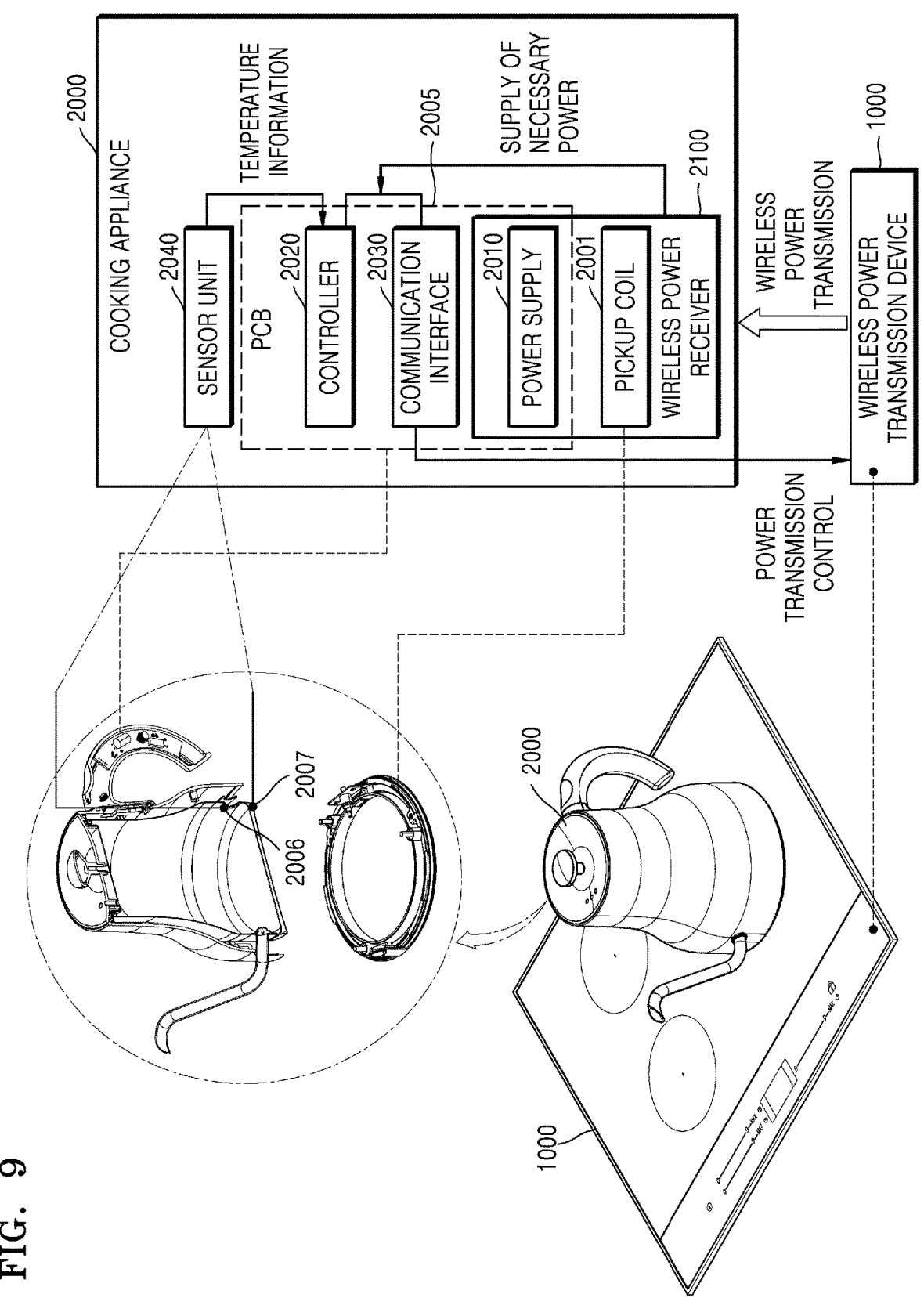
FIG. 9 is a view of a cooking appliance according to an embodiment of the disclosure.

FIG. 9 illustrates a structure of a cooking appliance according to an embodiment of the disclosure.

Referring to FIG. 9, the cooking appliance 2000 according to an embodiment of the disclosure may include a wireless power receiver 2100, a controller 2020, a communication interface 2030, and a sensor unit 2040. The wireless power receiver 2100 may include the pickup coil 2001 and a power supply 2010. According to an embodiment of the disclosure, the power supply 2010, the controller 2020, and the communication interface 2030 may be mounted on a printed circuit board (PCB) 2005. When the power supply 2010, the controller 2020, and the communication interface 2030 are mounted on the PCB 2005, the PCB 2005 may be defined as a printed circuit assembly (PCA). The aforementioned components will now be described in order.

The wireless power receiver 2100 may wirelessly receive power from the wireless power transmission device 1000. The wireless power receiver 2100 may supply the received power to the controller 2020 and the communication interface 2030. The wireless power receiver 2100 may include the pickup coil 2001 and the power supply 2010.

The pickup coil 2001 may be a low-power coil that generates power for operating the PCB 2005. When power is supplied to the PCB 2005 through the pickup coil 2001, component parts mounted on the PCB 2005 may be activated. For example, when power is supplied to the PCB 2005 through the pickup coil 2001, the power supply 2010, the controller 2020, and the communication interface 2030 may be activated.

The power supply 2010 may be a power control circuit that receives AC power from the pickup coil 2001 and supplies DC power to the controller 2020 and the communication interface 2030. For example, the power supply 2010 may convert 7 to 30V AC power received from the pickup coil 2001 to 3.3V DC power, and may supply 3.3V DC power to the controller 2020 and the communication interface 2030. When the controller 2020, the communication interface 2030, and other components in the cooking appliance 2000 need AC power and/or DC power in a form different from commercial AC power, the power supply 2010 may include an inverter and/or converter that supplies power.

The power supply 2010 may include an AC-DC converter and a DC-DC converter. The AC-DC converter may include a transformer, a rectifier (rectifier circuit), and a smoothing circuit. The rectifier circuit may convert an AC voltage whose a magnitude and a polarity (positive voltage or negative voltage) change over time into a DC voltage whose a magnitude and a polarity are constant, and may convert an AC current whose a magnitude and a polarity (positive current or negative current) change over time into a DC current having a constant magnitude. The rectifier may include a bridge diode. The bridge diode may convert an AC voltage whose polarity changes over time into a positive voltage whose polarity is constant, and may convert an AC current whose direction changes over time into a positive current whose direction is constant. The smoothing circuit may include a DC link capacitor. The DC link capacitor may convert a positive voltage whose magnitude changes with time to a DC voltage having a constant magnitude. The inverter connected to the DC link capacitor may generate AC power of various frequencies and magnitudes required by the cooking appliance 2000, and the DC-DC converter may generate DC power of various magnitudes required by the cooking appliance 2000.

The controller 2020 may include at least one processor. The at least one processor may control overall operations of the cooking appliance 2000. For example, the at least one processor included in the controller 2020 may control the power supply 2010 and the communication interface 3030. The controller 2020 may include one processor or may include a plurality of processors. For example, the controller 2020 may include only a main processor, or may include a main processor and at least one subprocessor.

According to an embodiment of the disclosure, the controller 1020 may identify a current location of the cooking appliance 2000 by detecting a power transmission pattern of power received from the wireless power transmission device 1000 through the power supply 2010. For example, the controller 2020 may determine in which cooking zone 1800 the detected power transmission pattern is, by comparing the detected power transmission pattern with pre-stored power transmission patterns for respective cooking zones 1800.

The controller 2020 may control the communication interface 2030 to transmit or receive data. For example, the controller 2020 may control the communication interface 2030 to transmit, to the wireless power transmission device 1000, at least one of unique identification information regarding the cooking appliance 2000, variable identification information regarding the cooking appliance 2000, or communication connection information regarding the cooking appliance 2000. The controller 2020 may change the variable identification information according to the state of the cooking appliance 2000. For example, the controller 2020 may generate or change the variable identification information according to the registration status of the cooking appliance 2000, the cooking zone 1800 in which the cooking appliance 2000 is located, and the product type of the cooking appliance 2000.

According to an embodiment of the disclosure, the controller 2020 may measure the temperature of the contents by using a first temperature sensor 2006. For example, the controller 2020 may measure the temperature of the contents according to a change in a sensor value (e.g., a change in resistance) of the first temperature sensor 2006. For example, the controller 2020 may monitor the temperature of the contents at regular intervals (e.g., one second) by using the first temperature sensor 2006. For example, the controller 2020 may control the communication interface 2030 to transmit temperature information of the contents to the wireless power transmission device 1000 through short-distance wireless communication. For example, the controller 2020 may control the communication interface 2030 to transmit power control information for controlling a power level or power maintenance time of the wireless power transmission device 1000 to the wireless power transmission device 1000. For example, when the controller 2020 operates in a warming mode for maintaining the temperature of the contents at a constant temperature, the controller 2020 may determine a communication period with the wireless power transmission device 1000 or a pan detection cycle of the wireless power transmission device 1000. The controller 2020 may transmit power control information including a wake-up time, a power level value, or a pan detection cycle each corresponding to the determined communication cycle to the wireless power transmission device 1000. The wireless power transmission device 1000 may transmit power for driving the communication interface 2030 of the cooking appliance 2000 at regular intervals according to the power control information. The wireless power transmission device 1000 may perform a pan detection operation according to the pan detection cycle.

The communication interface 2030 may include one or more components that enable communication between the cooking appliance 2000 and the wireless power transmission device 1000, between the cooking appliance 2000 and a server device (not shown), or between the cooking appliance 2000 and a mobile terminal (not shown). The communication interface 2030 of the cooking appliance 2000 may include a short-range wireless communication interface and a long-distance wireless communication interface.

Examples of the short-range wireless communication interface may include, but are not limited to, a Bluetooth communication interface, a Bluetooth low energy (BLE) communication interface, a near field communication (NFC) interface, a wireless local area network (WLAN) (e.g., Wi-Fi) communication interface, a ZigBee communication interface, an infrared data association (IrDA) communication interface, a wi-fi direct (WFD) communication interface, an ultra wideband (UWB) communication interface, and an Ant+ communication interface. When the cooking appliance 2000 is remotely controlled by a server device (not shown) in an Internet of things (IoT) environment, the long-distance wireless communication interface may be used to communicate with the server device. The long-distance wireless communication interface may include the Internet, a computer network (e.g., a LAN or a WAN), and a mobile communication interface. The mobile communication interface may include, but is not limited to, a 3G module, a 4G module, a 5G module, an LTE module, an NB-IoT module, and an LTE-M module.

According to an embodiment of the disclosure, the cooking appliance 2000 may transmit information to the server device through the wireless power transmission device 1000. For example, the cooking appliance 2000 may transmit information (e.g., temperature information regarding contents) obtained from the cooking appliance 2000 to the wireless power transmission device 1000 through short-range wireless communication (e.g., Bluetooth or BLE). In this case, the wireless power transmission device 1000 may access the server device by using the WLAN (wi-fi) communication interface or the long-distance wireless communication interface (Internet) to transmit the information obtained from the cooking appliance 2000 (e.g., temperature information regarding contents) to the server device. The server device may provide the information obtained from the cooking appliance 2000, received from the wireless power transmission device 1000, to a user through a mobile terminal connected to the server device. According to an embodiment of the disclosure, the wireless power transmission device 1000 may also directly transmit the information obtained from the cooking appliance 2000 to the user's mobile terminal through device-to-device (D2D) communication (e.g., WFD communication or BLE communication).

The sensor unit 2040 may include at least one temperature sensor. For example, the sensor unit 2040 may include, but is not limited to, the first temperature sensor 2006 (hereinafter, also referred to as a water temperature sensor) for measuring the temperature of the contents in the cooking appliance 2000 and a second temperature sensor 2007

(hereinafter, also referred to as an external cylinder temperature sensor or a pot temperature sensor) for measuring the temperature of the external cylinder of the cooking appliance 2000. The sensor unit 2040 may include a third temperature sensor for detecting abnormal overheating.

At least one temperature sensor included in the temperature sensor 2420 may be a contact temperature sensor, and may include a thermistor of which electrical resistance value changes according to temperature. For example, the first temperature sensor 2006 and the second temperature sensor 2007 may be negative temperature coefficient (NTC) temperature sensors, or may be positive temperature coefficient (PTC) temperature sensors.

The first temperature sensor 2006 may be provided at a location where it may directly contact the contents, but embodiments of the disclosure are not limited thereto. The first temperature sensor 2006 may be provided to measure the temperature of a container inserted into the cooking appliance 2000. In this case, the controller 2020 may predict the temperature of the contents, based on the temperature of the container. For convenience of explanation, a main example will be a case where the first temperature sensor 2006 is a sensor that measures the temperature of the contents by directly contacting the contents.

However, not all of the components illustrated in FIG. 9 are essential. The cooking appliance 2000 may be implemented by more or less components than those illustrated in FIG. 9. For example, the cooking appliance 2000 may be implemented with the wireless power receiver 2100, the communication interface 2030, the first temperature sensor 2006, and at least one processor. The cooking appliance 2000 may further include a user interface, a memory, a battery, etc. in addition to the wireless power receiver 2100, the controller 2020, and the communication interface 2030. The user interface may include an input interface for receiving a user's input and an output interface for outputting information. The output interface is provided to output an audio signal or a video signal. The output interface may include a display, a sound output interface, a vibration motor, and the like. When the display forms a layer structure together with a touch pad to construct a touch screen, the display may be used as an input device as well as an output device. The audio output interface may output an audio signal that is received through the communication interface 2030 or stored in the memory.

According to an embodiment of the disclosure, when the cooking appliance 2000 includes a battery, the power received through the pickup coil 2001 may not only be used to operate the controller 2020, the communication interface 2030, and the first temperature sensor 2006 but also may be used to charge the battery. When the battery is charged, the cooking appliance 2000 may use the power of the battery as auxiliary power. Accordingly, the cooking appliance 2000 may drive the controller 2020 and the communication interface 2030 by using the power of the battery even when the cooking appliance 2000 does not receive power from the wireless power transmission device 1000. For example, when the cooking appliance 2000 provides a warming function, the cooking appliance 2000 may monitor the temperature of the contents by using the power of the battery even when power transmission from the wireless power transmission device 1000 is interrupted. The cooking appliance 2000 may maintain a communication connection with the wireless power transmission device 1000 by using the power of the battery, and may continuously transmit information about the temperature of the contents to the wireless power transmission device 1000 at regular intervals. At this time, when the temperature of the contents has dropped to a threshold warming temperature while being monitored, the wireless power transmission device 1000 may transmit power for driving the controller 2020 and the communication interface 2030 of the cooking appliance 2000. Accordingly, when the cooking appliance 2000 includes a battery, the cooking appliance 2000 may determine a longer communication period with the wireless power transmission device 1000 in a keep-warm mode.

According to an embodiment of the disclosure, before the cooking appliance 2000 receives power from the wireless power transmission device 1000, the cooking appliance 2000 may drive the communication interface 2030 by using the power of the battery and transmit a wireless communication signal to the wireless power transmission device 1000 so that the wireless power transmission device 1000 may recognize the cooking appliance 2000 in advance. The battery may include, but is not limited to, a secondary battery (e.g., a lithium ion battery, a nickel-cadmium battery, a polymer battery, and a nickel hydride battery) and a supercapacitor. The supercapacitor, which is a capacitor with significantly large capacitance, is referred to as an ultracapacitor or an ultra-high-capacity capacitor.

According to an embodiment of the disclosure, when the cooking appliance 2000 includes a memory, the memory may store a program for processing and controlling a processor, and may store input/output data (e.g., power transmission pattern information for each cooking zone 1800, unique identification information regarding the cooking appliance 2000, variable identification information regarding the cooking appliance 2000, recipe information, and operation mode information (e.g., a keep-warm mode, a standby mode, and a heating mode).

The structure of a smart kettle will now be described with reference to FIG. 10.

Figure 10:
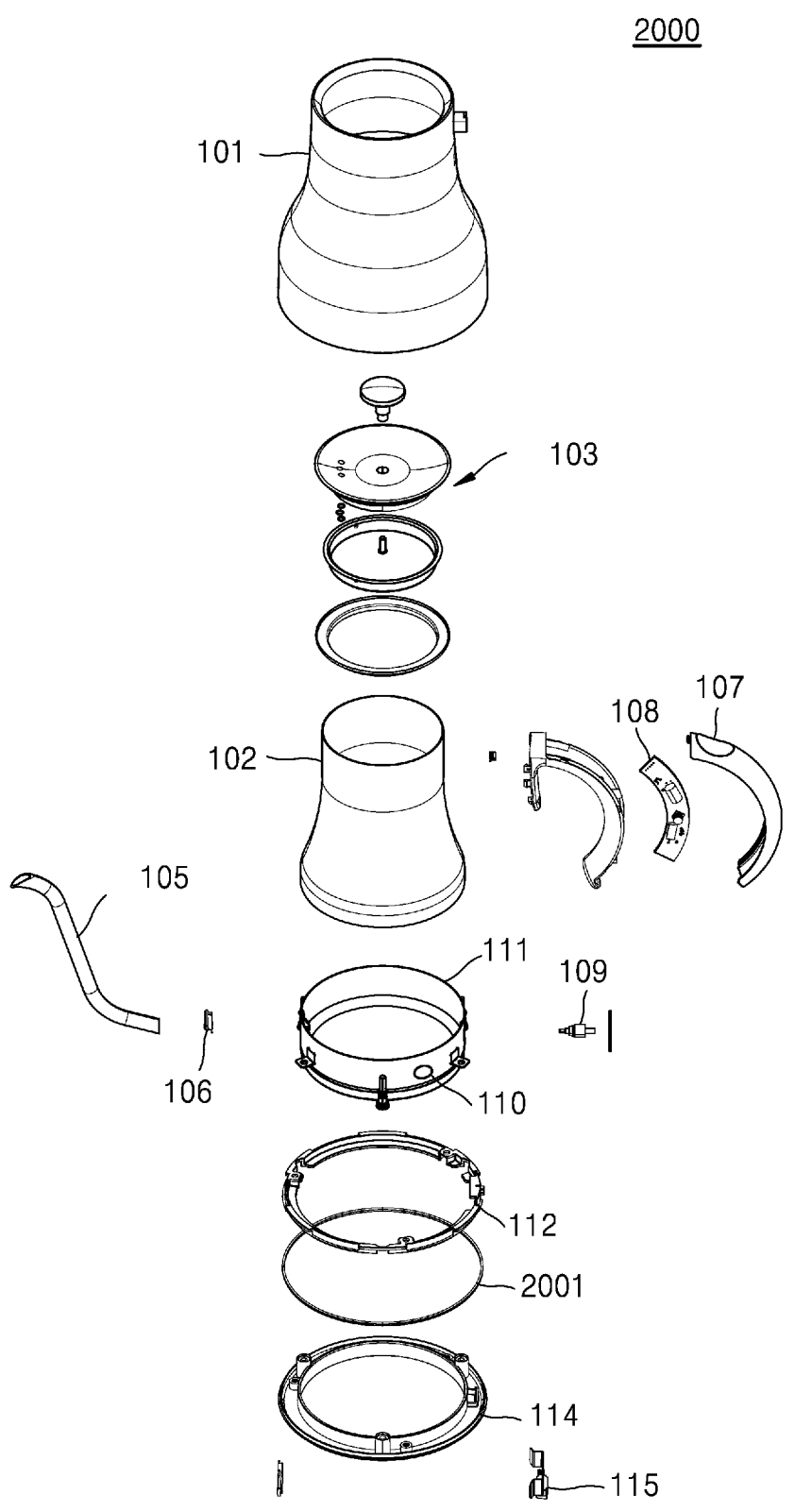
FIG. 10 is a view of a cooking appliance according to an embodiment of the disclosure.

FIG. 10 illustrates a structure of a cooking apparatus according to an embodiment of the disclosure.

Referring to FIG. 10, the cooking appliance 2000 according to an embodiment of the disclosure may include an outer cylinder 101, an inner cylinder 102, a lid 103, a water tank 104, a spout 105, a spout guide 106, a handle 107, a PCB 2005, a water temperature sensor 109, an outer cylinder temperature sensor 110, a case cover 111, a pickup coil cover 112, a pickup coil 2991, a bottom case 114, and a silicone leg 115. However, embodiments of the disclosure are not limited thereto, and the cooking appliance 2000 may further include components necessary to form a smart kettle.

The outer cylinder 101 may be disposed to surround a lateral surface portion of the inner cylinder 102. The inner cylinder 102 may include an upper portion and a lower portion, and the upper portion of the inner cylinder 102 may be formed of a different material than a material used to form the lower portion of the inner cylinder 102. For example, the upper portion of the inner cylinder 102 may be formed of a non-magnetic material, and the lower portion of the inner cylinder 102 may be formed of a magnetic material.

The lid 103 may be attached to and detached from the inner cylinder 102. While the smart kettle is operating in the keep-warm mode, when the lid 103 covers the inner cylinder 102, the temperature of the contents may decrease slowly, and, when the lid 103 does not cover the inner cylinder 102, the temperature of the contents may decrease quickly.

The water tank 104 may be a space for accommodating the contents.

The spout 105 may be a pipe for flowing the contents in the water tank 104 to the outside. The spout 105 may be connected to the water tank 104 through the spout guide 106, and may be exposed to the outside through the outer cylinder 101.

The handle 107 may be attached to the outer cylinder 101. The handle 107 may include a waterproof member to prevent water from penetrating into the handle 107. The PCB 108 may be disposed in the handle 107.

The PCB 2005 may correspond to the PCB 2005 of FIG. 9. The PCB 2005 may include a power supply, a controller, and a communication interface. For example, the PCB 2005 may include an output interface (e.g., a buzzer).

An electric line connected from the PCB 2005 may be connected to the water temperature sensor 109, the outer cylinder temperature sensor 110, and the pickup coil 2001 through a space between the outer cylinder 101 and the inner cylinder 102. Because the electric line may be in contact with the inner cylinder 102 of a high temperature, the electric line may be surrounded by a heat-resistant glass fiber. When the electric line connected from the PCB 2005 is connected through the space between the outer cylinder 101 and the inner cylinder 102, an instrument guide (e.g., a holder) protruding from the outer cylinder 101 may be closely fixed to the outer cylinder 101 in order to minimize a contact between the electric line and the inner cylinder 102.

The water temperature sensor 109 may be installed to pass through the inner cylinder 102. The water temperature sensor 109 may be disposed to pass through the inner cylinder 102 in parallel to a bottom surface of a smart kettle, or may be disposed to pass through the inner cylinder 102 at an angle toward a lower surface of a smart kettle. The water temperature sensor 109 may be in contact with the contents (e.g., water) inside the water tank 104. The water temperature sensor 109 is used to measure the temperature of the contents, and may correspond to the first temperature sensor 1006 of FIG. 9. The outer cylinder temperature sensor 110 is used to measure the temperature of the outer cylinder 101, and may be disposed on a lateral surface of the lower portion of the inner cylinder 102. The outer cylinder temperature sensor 110 may correspond to the second temperature sensor 1007 of FIG. 9. The outer cylinder temperature sensor 110 may be disposed to be lower than the water temperature sensor 109, but embodiments of the disclosure are not limited thereto. According to an embodiment of the disclosure, a plurality of outer cylinder temperature sensors 110 may be arranged in a circumferential direction of the inner cylinder 102.

The pickup coil cover 112 may be disposed to surround the pickup coil 2001. The pickup coil 2001 may be disposed between the inner cylinder 102 and the outer cylinder 101. The pickup coil 2001 may be disposed to surround the lower portion of the inner cylinder 102. The pickup coil 2001 may be disposed between the outer cylinder temperature sensor 110 and the outer cylinder 101. The pickup coil 2001 may correspond to the pickup coil 1001 of FIG. 9.

The bottom case 114 may be formed of a material that is prone to generate an eddy current that rotate about the electromagnetic field formed by the wireless power transmission device 1000.

The silicon leg 115 may be disposed in a lower portion of the bottom case 114. The silicon leg 115 may be a component for relieving impact when the cooking appliance 2000 is placed on a top plate of the wireless power transmission device 1000 and preventing the cooking appliance 2000 from slipping.

According to an embodiment of the disclosure, the cooking appliance 2000 may wirelessly receive power from the wireless power transmission device 1000 through the pickup coil 2001 to drive the communication interface included in the PCB 2005 inside the handle 107. The cooking appliance 2000 may perform short-range wireless communication with the wireless power transmission device 1000 through the communication interface. For example, the cooking appliance 2000 may transmit information about the amount of received power to the wireless power transmission device 1000. For example, the cooking appliance 2000 may transmit temperature information regarding the temperature of the contents to the wireless power transmission device 1000.

The structure of a smart pot will now be described with reference to FIG. 11.

Figure 11:
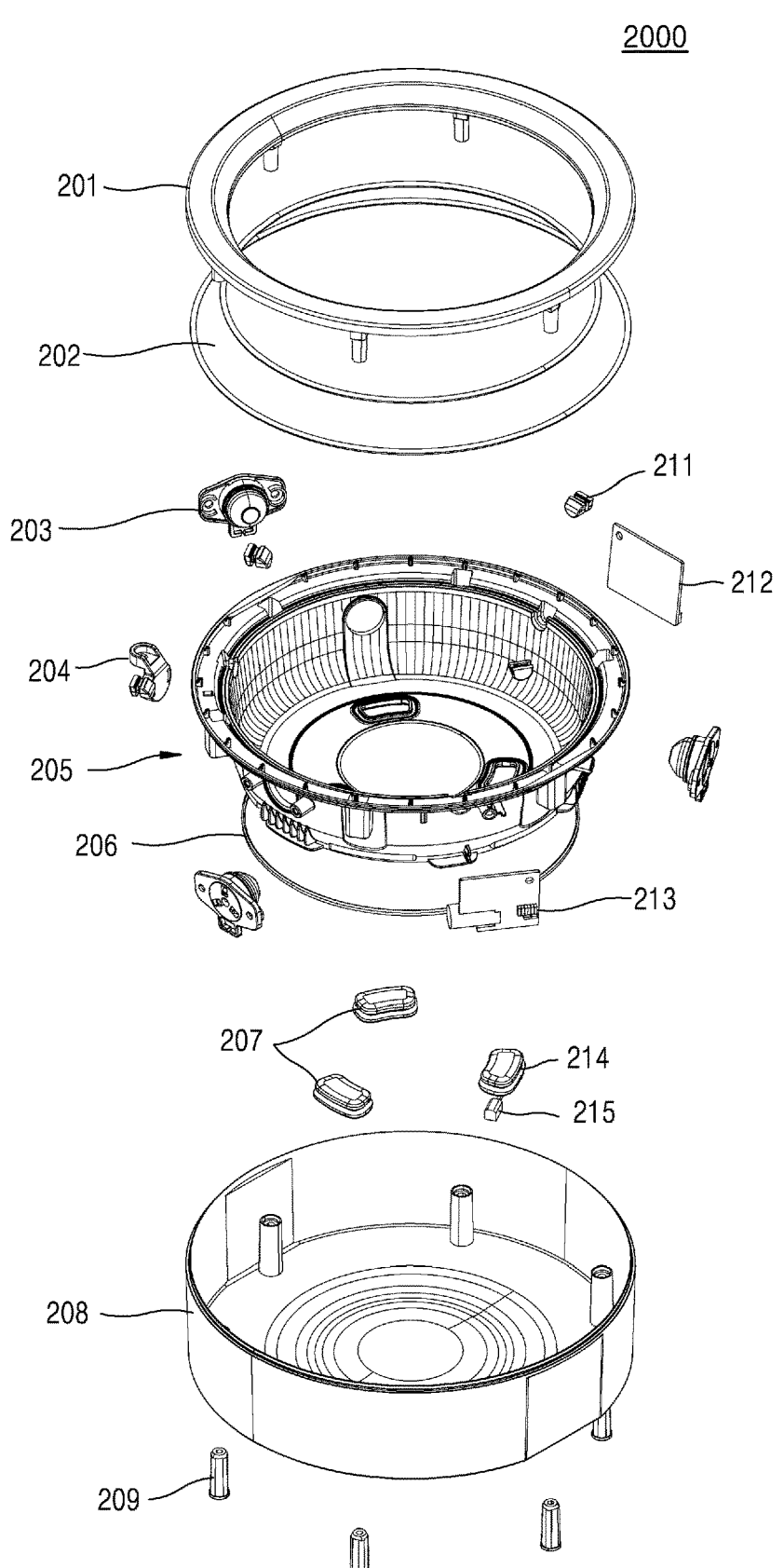
FIG. 11 is a view of a cooking appliance according to an embodiment of the disclosure.

FIG. 11 illustrates a structure of a cooking apparatus according to an embodiment of the disclosure.

Referring to FIG. 11, the cooking appliance 2000 according to an embodiment of the disclosure may include a top cover 201, inner/outer sealing 202, a side sensor assembly module 203, a buzzer assembly module 204, an inner case 205, a pickup coil 206, rubber legs 207, a body 208, a screw cover 209, a guide rubber 211, a BLE PBA module 212, a power PBA module 213, a sensor leg 214, and a bottom sensor 215. However, embodiments of the disclosure are not limited thereto, and the cooking appliance 2000 may further include components necessary to form a smart pot.

The top cover 201 may form an outer appearance of the cooking appliance 2000. The top cover 201 may seat a cooking container containing the contents.

The inner/outer sealing 202 may be compressed during assembly of the cooking appliance 2000 to block a moisture infiltration path. The inner/outer sealing 202 may enhance the water resistance of the cooking appliance 2000.

The side sensor assembly module 203 may include a side temperature sensor for measuring the temperature of the cooking container, a fixing member for fixing the side temperature sensor, and an elastic member (e.g., a spring) that is compressed and deformed when the cooking container is seated. However, embodiments of the disclosure are not limited thereto, and the side sensor assembly module 203 may include sensors that measure environmental factors that the cooking appliance 2000 wants to measure. The elastic member of the side sensor module 203 may be compressed and deformed as the cooking container is accommodated in the internal space of the cooking appliance 2000. For example, when the cooking container is not seated in the cooking appliance 2000, the side sensor assembly module 203 protrudes inward, and, as the cooking container is seated in the cooking appliance 2000, the side sensor assembly module 203 may be pressed. In this case, as the size of the cooking container increases, the compression rate of the side sensor assembly module 203 may increase. Therefore, the cooking appliance 2000 according to an embodiment of the disclosure may accommodate various sizes of cooking appliances.

According to an embodiment of the disclosure, the side sensor assembly module 203 including a side temperature sensor may be disposed at a predetermined height or more apart from the bottom surface of the cooking appliance 2000. Because the side temperature sensor is also an electrical component, it may be affected by induction heating of the wireless power transmission device 1000. Therefore, in order to minimize an influence of induction heating of the wireless power transmission device 1000 (e.g., heat generation of the side temperature sensor itself and noise generation due to induction heating), the side sensor assembly module 203 may be disposed a preset height or more from the bottom surface of the cooking appliance 2000. For example, to increase the accuracy of temperature data of the cooking container, the side sensor assembly module 203 including a side temperature sensor may be disposed at a height that meets a straight surface of the cooking container rather than an inclined surface of the cooking container.

According to an embodiment of the disclosure, the side sensor assembly module 203 including a side temperature sensor may be provided in plurality in the cooking appliance 2000 to prevent eccentricity (e.g., the cooking container is seated biased to one side) due to a difference between sizes of cooking containers. For example, three side sensor assembly modules 203 may be arranged at 120° angular intervals in an inner circumferential direction of the cooking appliance 2000.

The buzzer assembly module 204 may output a notification signal when the cooking container is abnormally overheated. The inner case 205 may support the cooking container. The inner case 205 may include the side sensor assembly module 203, the pickup coil 206, the BLE PBA module 212, and the power PBA module 213.

The pickup coil 206 may receive wireless power from the wireless power transmission device 1000. For example, the pickup coil 206 may be a low-power coil that generates power for operating the BLE PBA module 212. The pickup coil 206 may be a component corresponding to the pickup coil 2001 of FIG. 9.

The rubber legs 207 may alleviate an impact between the cooking container and the cooking appliance 2000 when the cooking container is seated on the cooking appliance 2000. The rubber legs 207 may prevent the cooking container from slipping.

The body 208 may serve to form the outer appearance of the cooking appliance 2000 and cover the internals thereof. The body 208 may prevent heat conduction to the outside during a cooking operation. According to one embodiment of the disclosure, the body 208 may include a part (handle part) that a user holds together with the cooking container mounted on the cooking appliance 2000 when the cooking appliance 2000 moves.

The screw cover 209 may cover a screw. The screw cover 209 may alleviate the impact of the cooking appliance 2000 when the cooking appliance 2000 is placed on the wireless power transmission device 1000. The screw cover 209 may prevent the cooking appliance 2000 from slipping.

The guide rubber 211 may prevent eccentricity when the cooking container is seated on the cooking appliance 2000. The guide rubber 211 may alleviate the impact of the cooking container. The guide rubber 211 may prevent the cooking container from slipping.

The BLE PBA module 212 may include a communication interface and a controller. The BLE PBA module 212 may perform wireless communication (e.g., BLE communication) with the wireless power transmission device 1000. The BLE PBA module 212 may control an output (e.g., a power level value) of the wireless power transmission device 1000. For example, the BLE PBA module 212 may include a microcontroller unit (MCU). The MCU may receive temperature data from the cooking container. The MCU may store an algorithm or recipe information for automatic cooking.

The power PBA module 213 may change the power received from the pickup coil 206 into a use voltage of the BLE PBA module 212. For example, the power PBA module 213 may receive AC power from the pickup coil 206 and supply DC power to the MCU included in the BLE PBA module 212 or a BLE module. The power PBA module 213 may correspond to the power supply 2010 of FIG. 9.

The sensor leg 214 may be a part to which the bottom sensor 215 is assembled, among the rubber legs 207. Because the sensor leg 214 is a type of rubber leg 207, the sensor leg 214 may alleviate the impact between the cooking container and the cooking appliance 2000 and prevent the cooking container from slipping, when the cooking container is seated on the cooking appliance 2000.

The bottom sensor 215 may be a temperature sensor for detecting abnormal overheating of the cooking container. The bottom sensor 215 may be disposed at a different position from the side sensor assembly module 203 including a side temperature sensor for measuring the temperature of the cooking container. For example, the bottom sensor 215 may be disposed on the bottom surface of the cooking appliance 2000, and three side sensor assembly modules 203 may be arranged on the lateral side of the cooking appliance 2000. According to an embodiment of the disclosure, when abnormal overheating occurs in the cooking container, the temperature of the bottom surface of the cooking container rises most rapidly, and thus the bottom sensor 215 may be assembled to the sensor leg 214, which is one of the rubber legs 207, so that abnormal overheating of the cooking container may be quickly detected.

According to an embodiment of the disclosure, the cooking appliance 2000 may wirelessly receive power from the wireless power transmission device 1000 through the pickup coil 113 to drive the communication interface included in the BLE PBA module 212. The cooking appliance 2000 may perform short-range wireless communication with the wireless power transmission device 1000 through the communication interface. For example, the cooking appliance 2000 may transmit information about the amount of received power to the wireless power transmission device 1000. For example, the cooking appliance 2000 may transmit temperature information regarding the temperature of the contents to the wireless power transmission device 1000.

A power transmission/reception process between the wireless power transmission device 1000 and a cooking appliance will now be described with reference to FIG. 12.

FIG. 12 is a diagram illustrating a power transmission// reception structure between a wireless power transmission device and each of a cooking appliance according to an embodiment of the disclosure.

Referring to FIG. 12, according to an embodiment of the disclosure, the wireless power transmission device 1000 may include the working coil 1120 and a communication coil 1001. For example, the communication coil 1001 may be an NFC antenna coil for NFC communication. In FIG. 12, the number of windings of the communication coil 1001 is expressed as one, but embodiments of the disclosure are not limited thereto. The communication coil 1001 may be provided with a plurality of windings. For example, the communication coil 1001 may be wound in 5 to 6 turns.

According to an embodiment of the disclosure, the communication coil 1001 included in the wireless power transmission device 1000 and the communication coil 2002 included in each of the cooking appliances 2000-3 and 2000-4 may be arranged at locations corresponding to each other. For example, when the communication coil 1001 included in the wireless power transmission device 1000 is disposed at the center portion of the cooking zone 1800 of the wireless power transmission device 1000, the communication coils 2002 included in the cooking appliances 2000-3 and 2003-4 may be arranged in respective bottom center portions of the cooking appliances 2000-3 and 2003-4.

Referring to 610 of FIG. 12, when the IH cooking appliance 2000-3 is placed on the wireless power transmission device 1000, the wireless power transmission device 1000 may supply power to the pickup coil 2001 through the working coil 1120. When the wireless power transmission device 1000 wirelessly transmits first power through the working coil 1120, an eddy current is generated in the IH cooking appliance 2000-3, and accordingly, the contents inside the IH cooking appliance 2000-3 may be heated.

Referring to 620 of FIG. 12, when the load cooking appliance 2000-4 is placed on the wireless power transmission device 1000, the wireless power transmission device 1000 may supply power to the pickup coil 2001 through the working coil 1120. When the wireless power transmission device 1000 wirelessly transmits first power through the working coil 1120, an induced current flows in the reception coil 2003 of the load cooking appliance 2000-4, such that energy may be supplied to the load 2004. The load 2004 may include a motor or a heater. The load 2004 may be arranged at a location spaced apart from the reception coil 2003. For example, power generated by the induced current may drive a motor of a blender or may be supplied to a heater of a coffee dripper.

In FIG. 12, a case in which the wireless power transmission device 1000 includes the communication coil 1001 has been described as an example. However, when each of the cooking appliances 2000-3 and 2003-4 does not include the communication coil 2002 (see FIG. 7), the wireless power transmission device 1000 may also not include the communication coil 1001.

Operations according to a control method of the wireless power transmission device 1000 will now be described with reference to FIG. 13.

Figure 13:
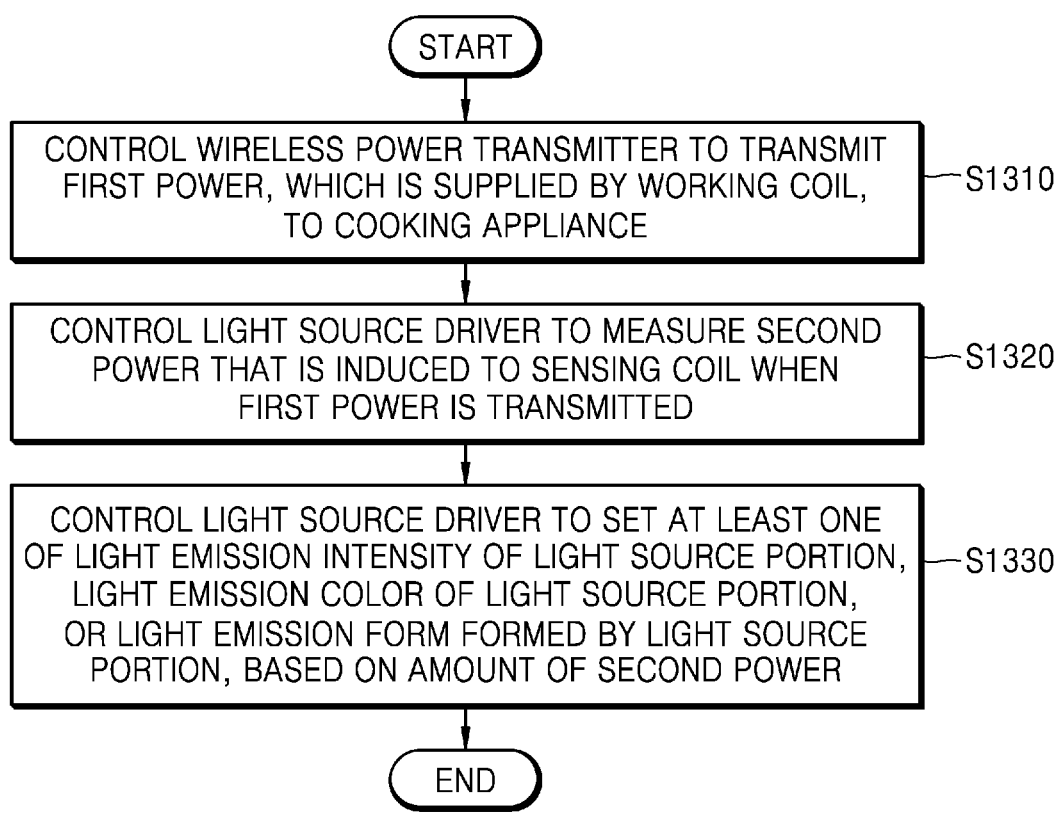
FIG. 13 is a flowchart of a method of controlling a wireless power transmission device according to an embodiment of the disclosure.

FIG. 13 is a flowchart of a control method of a wireless power transmission device according to an embodiment of the disclosure.

Referring to FIG. 13, the processor 1400 of the wireless power transmission device 1000 according to an embodiment of the disclosure may control a wireless power transmitter to transmit first power, which is supplied by a working coil, to the cooking appliance 2000, in operation S1310. The wireless power transmitter of the wireless power transmission device 1000 may transmit the first power by using the working coil. The first power may heat the contents of the cooking appliance 2000 or operate the cooking appliance 2000. For example, the processor 1400 may control the wireless power transmitter to transmit the first power in response to a user input for starting a heating operation. For example, the processor 1400 may control the wireless power transmitter to transmit the first power in response to a request, from the cooking appliance 2000, indicating that heating is needed to warm the contents of the cooking appliance 2000. For example, the processor 1400 may control the wireless power transmitter to transmit the first power in response to a request, from the cooking appliance 2000, indicating that power is needed to operate the cooking appliance 2000.

The processor 1400 of the wireless power transmission device 1000 according to an embodiment of the disclosure may control a light source driver to measure second power that is induced to a sensing coil when the first power is transmitted, in operation 51320. When the first power is transmitted, the second power according to an electromagnetic field generated in the working coil may be induced in the sensing coil. The processor 1400 may control the light source driver to measure the amount of the second power.

The amount of the second power may vary depending on the transmission amount of the first power and the characteristics of the cooking appliance 2000. When the first power is transmitted to the cooking appliance 2000, as the transmission amount of the first power increases, the amount of the second power may increase. Even when the first power having the same transmission amount is transmitted, the amount of the second power induced in the sensing coil may change according to the characteristics of the cooking appliance 2000. The characteristics of the cooking appliance 2000 may include at least one of the material of the cooking appliance 2000, the size of the cooking appliance 2000, the placement position of the reception coil of the cooking appliance 2000, the size of the reception coil, or the inductance of the reception coil. For example, as the electrical conductivity of the material of the cooking appliance 2000 increases, the amount of the second power may increase. For example, as the amount of the cooking appliance 2000 increases, the amount of the second power may increase. For example, as the reception coil of the cooking appliance 2000 approaches a position corresponding to the working coil of the wireless power transmission device 1000, the amount of the second power may increase. For example, as the amount of the reception coil of the cooking appliance 2000 increases, the amount of the second power may increase. For example, as the inductance of the reception coil of the cooking appliance 2000 increases, the amount of the second power may increase.

The processor 1400 of the wireless power transmission device 1000 according to an embodiment of the disclosure may control the light source driver to set at least one of the light emission intensity of a light source, the light emission color of the light source, or a light emission form of the light source, based on the amount of the second power, in operation S1330. The light source driver may receive the second power from the sensing coil. The light source driver may drive the light source, based on the received second power. The processor 1400 may obtain the amount of the second power received by the light source driver. The processor 1400 may transmit, to the light source driver, a light source control signal for setting at least one of the light emission intensity, the light emission color, or the light emission form of the light source driven by the light source driver, based on the amount of the second power.

According to an embodiment of the disclosure, as the amount of the second power increases, the light emission intensity of the light source may increase. For example, the processor 1400 may control the light source driver so that, as the magnitude of the second power increases, the intensity of a driving current supplied by the light source driver to each of the plurality of light source units constituting the light source increases. For example, the processor 1400 may control the light source driver so that, as the amount of the second power increases, the number of light source units driven by the light source driver increases.

According to an embodiment of the disclosure, when the amount of the second power is in a first range, the light emission color of the light source may be set as a first color, when the amount of the second power is in a second range greater than the first range, the light emission color of the light source may be set as a second color different from the first color, and, when the amount of the second power is in a third range greater than the second range, the light emission color of the light source may be set as a third color different from the first color and the second color. For example, when the amount of the second power is 50 W or more to less than 100 W, the light emission color of the light source may be set as red, when the amount of the second power is 100 W or more to less than 150 W, the light emission color of the light source may be set as green, and, when the amount of the second power is 150 W or more, the light emission color of the light source may be set as blue. For example, when the power of the second power is 50 W or more to less than 100 W, the processor 1400 may control the light source driver to supply power to a red subunit among the plurality of light source units constituting the light source. For example, when the power of the second power is 100 W or more to less than 150 W, the processor 1400 may control the light source driver to supply power to a green subunit among the plurality of light source units constituting the light source. For example, when the power of the second power is 150 W or more, the processor 1400 may control the light source driver to supply power to a blue subunit among the plurality of light source units constituting the light source.

According to an embodiment of the disclosure, as the amount of the second power increases, the light emission form of the light source may change. For example, the processor 1400 may control the light source driver to select and supply the driving current to each of the plurality of light source units so that, as the amount of the second power increases, the light emission form of the light source changes into a circular shape with a thin rim, a circular shape with a thick rim, and a curved wave shape. For example, the processor 1400 may control the light source driver to select and supply the driving current to each of the plurality of light source units so that, as the amount of the second power increases, the light emission form of the light source is a shape that represents large power transmission.

In the wireless power transmission device 1000 and its control method, according to an embodiment of the disclosure, the light emission of the light source may be controlled based on the intensity of the second power induced to the sensing coil by the transmitted first power, so that a user may be easily informed of a degree to which an object to be heated, such as the cooking appliance 2000, is actually heated.

A change in the light emission intensity according to the amount of the second power will now be described with reference to FIG. 14.

Figure 14:
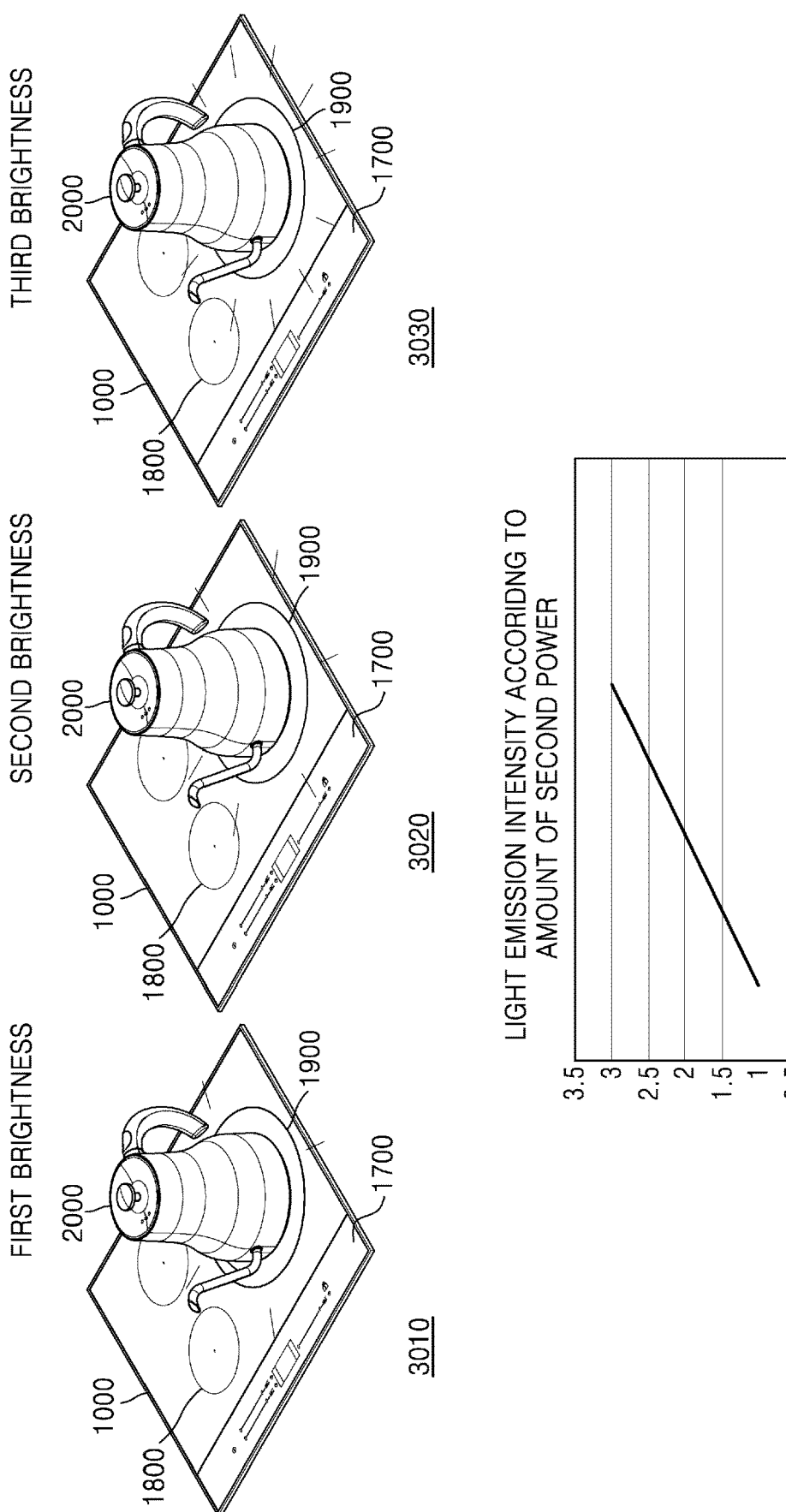
FIG. 14 is a diagram illustrating a change in a light emission intensity of a light source of a wireless power transmission device according to an embodiment of the disclosure.

FIG. 14 is a diagram illustrating a change in a light emission intensity of a light source of a wireless power transmission device according to an embodiment of the disclosure.

Referring to FIG. 14, the wireless power transmitter of the wireless power transmission device 1000 may transmit the first power to the cooking appliance 2000 placed on the cooking zone 1800 in response to a heating command input to the user manipulator 1700. The processor 1400 of the wireless power transmission device 1000 may control the light source driver to set the light emission intensity of the light source, based on the intensity of the second power that is induced to the sensing coil when the first power is transmitted. The light source driver may adjust the light emission intensity of the light emitter 1900 shown to the user by setting the light emission intensity of the light source. For example, the light source driver may adjust the light emission intensity of the light emitter 1900 shown to the user by setting the number of operating light source units among the light source units constituting the light source. For example, the light source driver may adjust the light emission intensity of the light emitter 1900 shown to the user by setting a light emission strength of each of the light source units constituting the light source.

Referring to 3010 of FIG. 14, when the second power has a first amount, the light source driver may set the light emission intensity of the light source so that the light emitter 1900 emits light at a first brightness. For example, the first amount may be the amount of a smallest unit of power that the wireless power transmitter is able to transmit. For example, the first brightness may be a minimum brightness that the light emitter 1900 is able to express. For example, the first brightness may be about 50 lux.

Referring to 3020 of FIG. 14, when the second power has a second amount, the light source driver may set the light emission intensity of the light source so that the light emitter 1900 emits light at a second brightness. For example, the second amount may be about twice the first amount. For example, the second brightness may be about twice the first brightness. For example, the second brightness may be about 100 lux.

Referring to 3030 of FIG. 14, when the second power has a third amount, the light source driver may set the light emission intensity of the light source so that the light emitter 1900 emits light at a third brightness. For example, the third amount may be about triple the first amount. For example, the third brightness may be about triple the first brightness. For example, the third brightness may be about 150 lux.

A change in the light emission color according to the amount of the second power will now be described with reference to FIG. 15.

Figure 15:
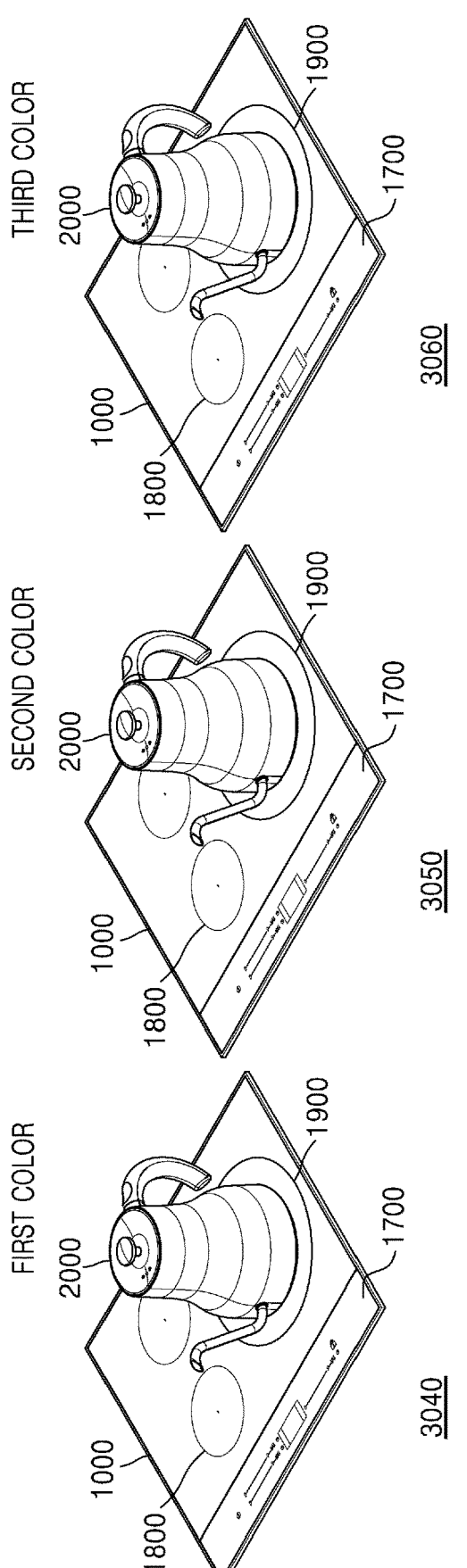
FIG. 15 is a diagram illustrating a change in a light emission color of a light source of a wireless power transmission device according to an embodiment of the disclosure.

FIG. 15 is a diagram illustrating a change in a light emission color of a light source of a wireless power transmission device according to an embodiment of the disclosure.

Referring to FIG. 15, the wireless power transmitter of the wireless power transmission device 1000 may transmit the first power to the cooking appliance 2000 placed on the cooking zone 1800 in response to a heating command input to the user manipulator 1700. The processor 1400 of the wireless power transmission device 1000 may control the light source driver to set the light emission color of the light source, based on the intensity of the second power that is induced to the sensing coil when the first power is transmitted. The light source driver may set the light emission color of the light emitter 1900 shown to the user by setting the light emission color of the light source. For example, the light source driver may set the light source color of the light emitter 1900 shown to the user, by setting an operating subunit among a red subunit, a green subunit, and a blue subunit included in the light source units constituting the light source. For example, the light source driver may set the light emission color of the light emitter 1900 visible to the user to be red, by controlling a switching circuit to transmit a driving voltage to the red subunit. For example, the light source driver may set the light emission color of the light emitter 1900 visible to the user to be green, by controlling the switching circuit to transmit a driving voltage to the green subunit. For example, the light source driver may set the light emission color of the light emitter 1900 visible to the user to be blue, by controlling the switching circuit to transmit a driving voltage to the blue subunit.

Referring to 3040 of FIG. 15, when the second power has a first amount, the light source driver may set the light emission color of the light source so that the light emitter 1900 emits light in a first color. For example, the first amount may be the amount of a smallest unit of power that the wireless power transmitter is able to transmit. For example, the first color may be red.

Referring to 3050 of FIG. 15, when the second power has a second amount, the light source driver may set the light emission color of the light source so that the light emitter 1900 emits light in a second color different from the first color. For example, the second amount may be about twice the first amount. For example, the second color may be green.

Referring to 3060 of FIG. 15, when the second power has a third amount, the light source driver may set the light emission color of the light source so that the light emitter 1900 emits light in a third color different from the second color. For example, the third amount may be about triple the first amount. For example, the third color may be blue.

A change in the light emission form according to the amount of the second power will now be described with reference to FIG. 16.

Figure 16:
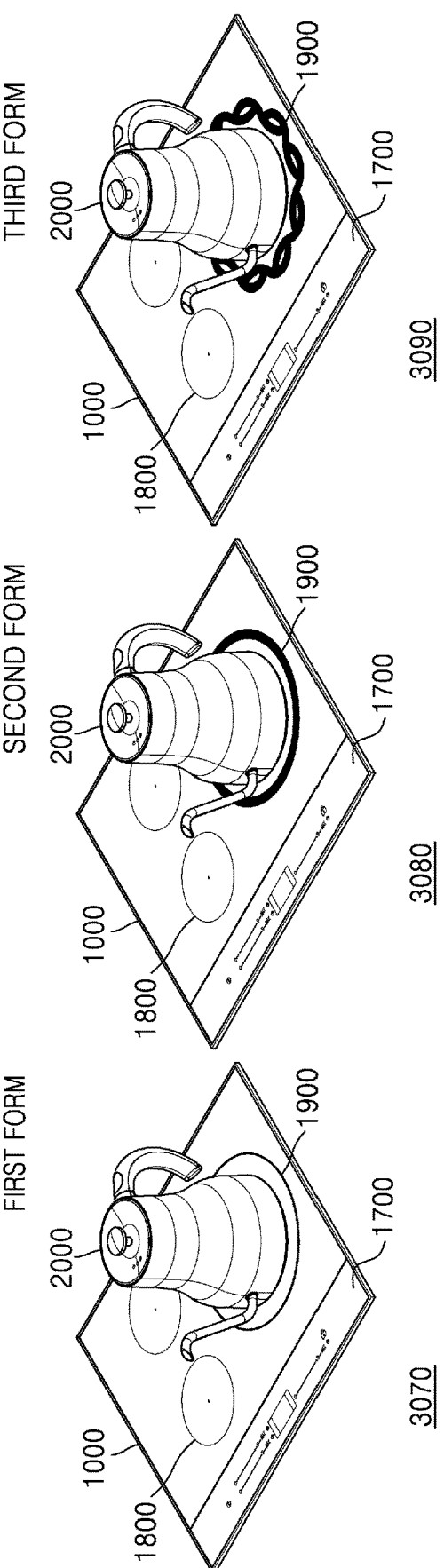
FIG. 16 is a diagram illustrating a change in a light emission form of a light source of a wireless power transmission device according to an embodiment of the disclosure.

FIG. 16 is a diagram illustrating a change in a light emission form of a light source of a wireless power transmission device according to an embodiment of the disclosure.

Referring to FIG. 16, the wireless power transmitter of the wireless power transmission device 1000 may transmit the first power to the cooking appliance 2000 placed on the cooking zone 1800 in response to a heating command input to the user manipulator 1700. The processor 1400 of the wireless power transmission device 1000 may control the light source driver to set the light emission form of the light source, based on the intensity of the second power that is induced to the sensing coil when the first power is transmitted. The light source driver may set the light emission form of the light emitter 1900 shown to the user by setting the light emission form of the light source. For example, the light source driver may set the light emission form of the light emitter 1900 shown to the user, by selecting, for each arrangement location, a light source unit that is operating from among the light source units constituting the light source.

Referring to 3070 of FIG. 16, when the second power has a first amount, the light source driver may set the light emission form of the light source so that the light emitter 1900 emits light in a first form. For example, the first amount may be the amount of a smallest unit of power that the wireless power transmitter is able to transmit. For example, the first form may be a thin circle.

Referring to 3080 of FIG. 16, when the second power has a second amount, the light source driver may set the light emission form of the light source so that the light emitter 1900 emits light in a second form different from the first form. For example, the second amount may be about twice the first amount. For example, the second form may be a thick circle.

Referring to 3090 of FIG. 16, when the second power has a third amount, the light source driver may set the light emission form of the light source so that the light emitter 1900 emits light in a third form different from the first form and the second form. For example, the third amount may be about triple the first amount. For example, the third form may be a curved wave form.

A path of light emitted by a light emitter will now be described with reference to FIG. 17.

Figure 17:
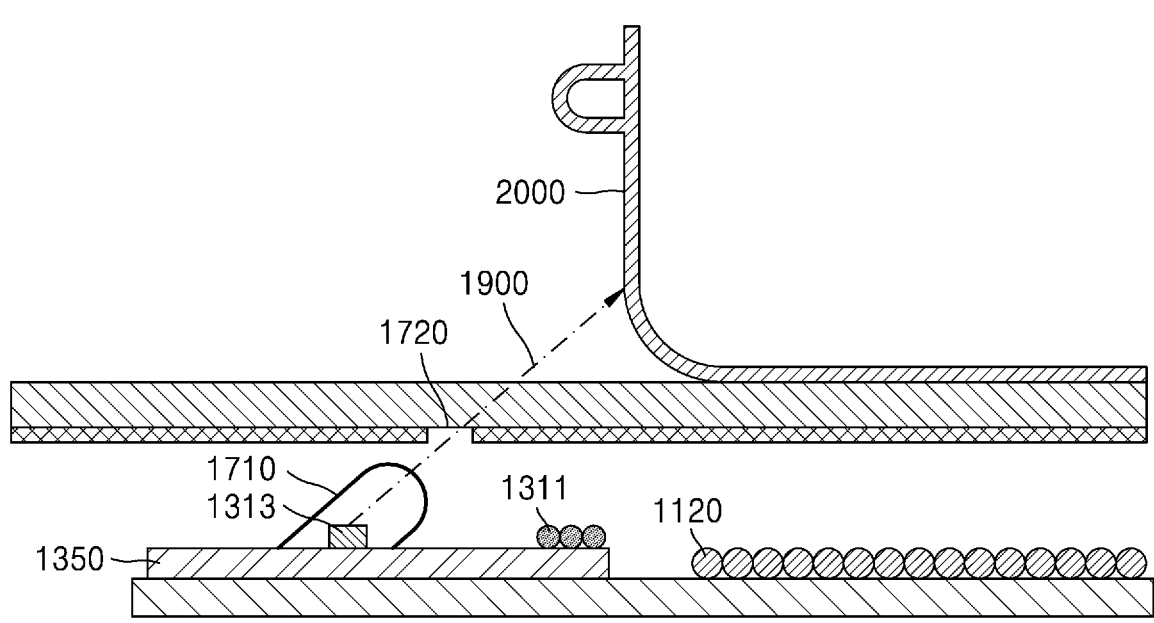
FIG. 17 is a diagram illustrating a path of light output by a light source of a wireless power transmission device according to an embodiment of the disclosure.

FIG. 17 is a diagram illustrating a path of light output by a light source of a wireless power transmission device according to an embodiment of the disclosure.

Referring to FIG. 17, the working coil 1120 of the wireless power transmission device 1000 may transmit the first power to the cooking appliance 2000. The second power may be induced in the sensing coil 1311 when the first power is transmitted. The processor 1400 of the wireless power transmission device 1000 may control the light source driver to set at least one of the light emission intensity of the light source 1313, the light emission color of the light source 1313, or the light emission form of the light source 1313, based on the amount of the second power. The wireless power transmission device 1000 according to an embodiment of the disclosure may include a light collection member 1710 and a filter member 1720 for setting the path of the light output by the light source 1313 when the light source 1313 emits light.

The light collection member 1710 may be disposed to cover the light source 1313. The light collection member 1710 may be a lens. The light collection member 1710 may be disposed on the heat-resistant substrate 1350 of the wireless power transmission device 1000. The light collection member 1710 may collect the light output by the light source 1313 and may direct the collected light in a specific direction. The light collection member 1710 may be disposed to be inclined by a certain angle. For example, the light collection member 1710 may be tilted by a designated angle to allow the light to travel in the specific direction. For example, the light collection member 1710 may be tilted by a designated angle to be directed toward the filter member 1720.

The filter member 1720 may be disposed to be adjacent to the light collection member 1710. The filter member 1720 may be a slit. The filter member 1720 may be disposed to be higher than the light collection member 1710. The filter member 1720 may emit light traveling from the light collection member 1710, through an upper plate of the wireless power transmission device 1000. The light emitted by the filter member 1720 may allow the light emitter 1900 of the wireless power transmission device 1000 to emit light.

The light emitted by the light source 1313 may pass through the light collection member 1710 and the filter member 1720. The light emitted by the light source 1313 may be collected on the light collection member 1710. The light collected on the light collection member 1710 may be directed toward the filter member 1720. The light directed toward the filter member 1720 may be output through the upper plate of the wireless power transmission device 1000.

The light emitted by the light source 1313 may be output through the top plate of the wireless power transmission device 1000 and may be incident upon the cooking appliance 2000. The light emitted by the light source 1313 may be output obliquely through the upper plate of the wireless power transmission device 1000 while being directed toward the filter member 1720. The light output obliquely through the upper plate of the wireless power transmission device 1000 may be reflected on a side surface of the cooking appliance 2000. In order to reflect light on the lateral surface of the cooking appliance 2000, the light collecting member 1710 may be disposed to be tilted by the designated angle. For example, the light source 1313 may be tilted to increase the amount of light reflected on the lateral surface of the cooking appliance 2000. The user may easily check the intensity of power transmitted by the wireless power transmission device 1000 to the cooking appliance 2000 by checking the light reflected on the lateral surface of the cooking appliance 2000.

A path of light emitted by a light emitter will now be described with reference to FIG. 18.

Figure 18:
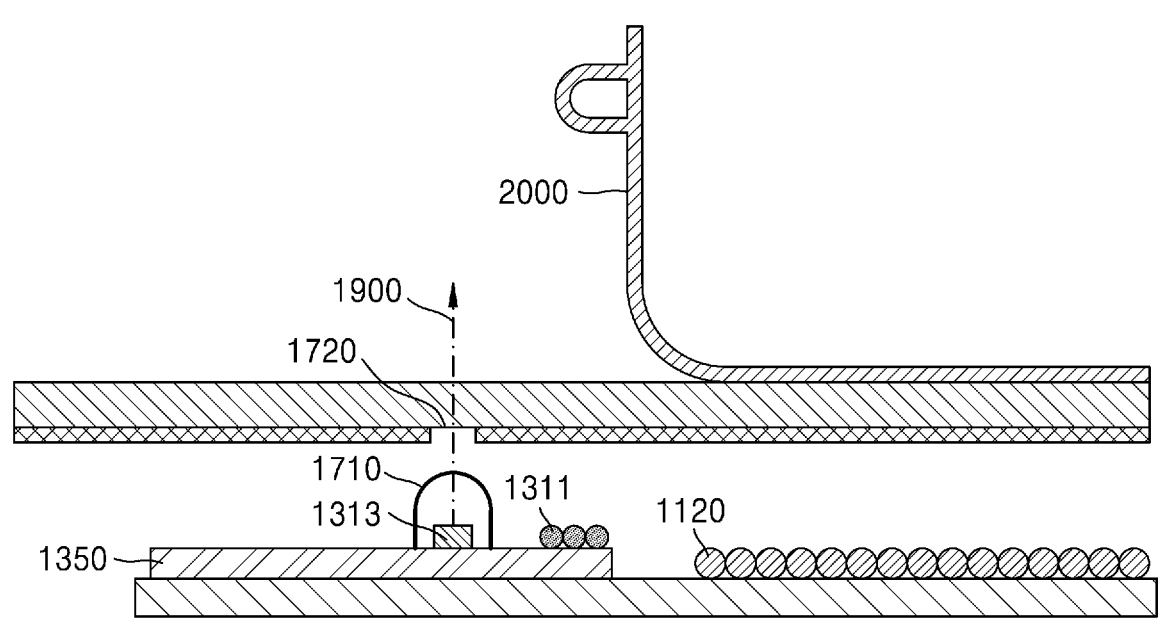
FIG. 18 is a diagram illustrating a path of light output by a light source of a wireless power transmission device according to an embodiment of the disclosure.

FIG. 18 is a diagram illustrating a path of light output by a light source of a wireless power transmission device according to an embodiment of the disclosure.

Referring to FIG. 18, the working coil 1120 of the wireless power transmission device 1000 may transmit the first power to the cooking appliance 2000. The second power may be induced in the sensing coil 1311 when the first power is transmitted. The processor 1400 of the wireless power transmission device 1000 may control the light source driver to set at least one of the light emission intensity of the light source 1313, the light emission color of the light source 1313, or the light emission form of the light source 1313, based on the amount of the second power. The wireless power transmission device 1000 according to an embodiment of the disclosure may include a light collection member 1710 and a filter member 1720 for setting the path of the light output by the light source 1313 when the light source 1313 emits light.

The light collection member 1710 may be disposed to cover the light source 1313. The light collection member 1710 may be a lens. The light collection member 1710 may be disposed on the heat-resistant substrate 1350 of the wireless power transmission device 1000. The light collection member 1710 may collect the light output by the light source 1313 and may direct the collected light in a specific direction. The light collection member 1710 may be disposed vertically to face the top plate of the wireless power transmission device 1000.

The filter member 1720 may be disposed to be adjacent to the light collection member 1710. The filter member 1720 may be a slit. The filter member 1720 may be disposed to be higher than the light collection member 1710. The filter member 1720 may emit light traveling from the light collection member 1710, through an upper plate of the wireless power transmission device 1000. The light emitted by the filter member 1720 may allow the light emitter 1900 of the wireless power transmission device 1000 to emit light.

The light emitted by the light source 1313 may pass through the light collection member 1710 and the filter member 1720. The light emitted by the light source 1313 may be collected on the light collection member 1710. The light collected on the light collection member 1710 may be directed toward the filter member 1720. The light directed toward the filter member 1720 may be output through the upper plate of the wireless power transmission device 1000.

The light emitted by the light source 131 may be output through the top plate of the wireless power transmission device 1000 and thus may be output to a peripheral zone that surrounds an external side edge of the cooking zone 1800. The light emitted through the top plate of the wireless power transmission device 1000 may be output vertically from the upper plate of the wireless power transmission device 1000 while being directed toward the filter member 1720. The light output vertically from the upper plate of the wireless power transmission device 1000 may be output to the peripheral zone. Accordingly, the light emitter 1900 may emit light from the top plate of the wireless power transmission device 1000, and the light may be prevented from being reflected on the cooking appliance 2000.

An operation, performed by the wireless power transmission device 1000, of recognizing the type of cooking appliance will now be described with reference to FIG. 19.

Figure 19:
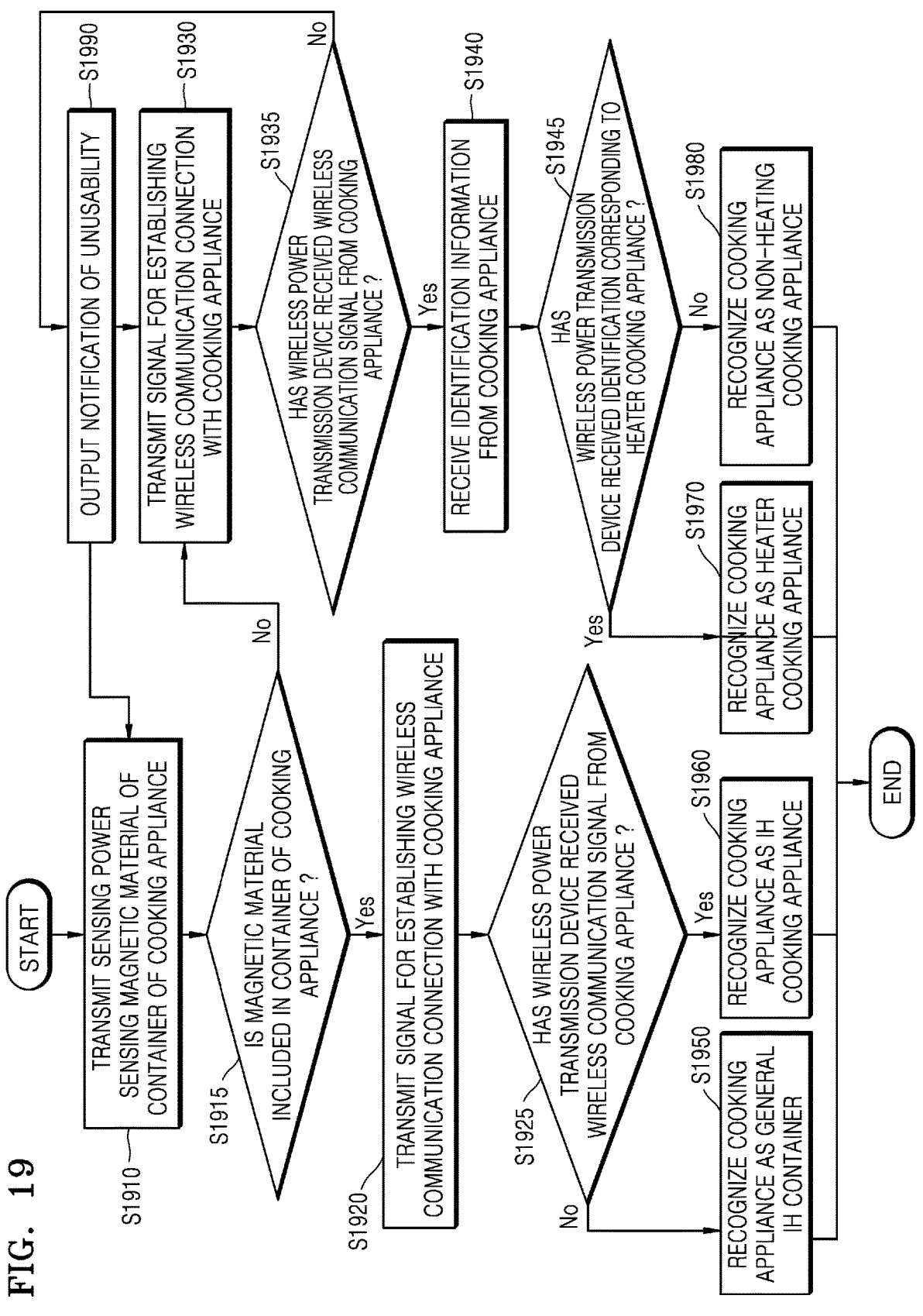
FIG. 19 is a flowchart of an operation, performed by a wireless power transmission device, of recognizing a cooking appliance, according to an embodiment of the disclosure.

FIG. 19 is a flowchart of an operation, performed by a wireless power transmission device of recognizing a cooking appliance, according to an embodiment of the disclosure.

Referring to FIG. 19, the wireless power transmission device 1000 according to an embodiment of the disclosure may transmit sensing power for sensing a magnetic material of the container of the cooking appliance 2000, in operation S1910. The processor 1400 of the wireless power transmission device 1000 may control the sensor unit to detect whether the cooking appliance 2000 is disposed in the cooking zone 1800 of the wireless power transmission device 1000. When the cooking appliance 2000 is placed in the cooking zone 1800 of the wireless power transmission device 1000, the processor 1400 may transmit a magnetic material detection signal to a wireless power transmitter to check whether the container of the cooking appliance 2000 contains the magnetic material. The wireless power transmitter may transmit detection power to check whether a magnetic material is included in the container of the cooking appliance 2000. The wireless power transmission device 1000 according to an embodiment of the disclosure may check whether a magnetic material is included in the container of the cooking appliance 2000, in operation S1915. When the container of the cooking device 2000 contains a magnetic material (operation S1915—Yes), the wireless power transmission device 1000 may proceed to operation S1920. When the container of the cooking device 2000 does not contain a magnetic material (operation S1915—No), the wireless power transmission device 1000 may proceed to operation S1930.

The wireless power transmission device 1000 according to an embodiment of the disclosure may transmit a signal for establishing a wireless communication connection with the cooking appliance 2000, in operation S1920. The processor 1400 of the wireless power transmission device 1000 may control a communication interface to transmit the signal for establishing a wireless communication connection with the cooking appliance 2000. The cooking appliance 2000 may transmit a wireless communication signal to the wireless power transmission device 1000 in response to the signal for establishing a wireless communication connection. In operation S1925, it may be determined whether the wireless power transmission device 1000 according to an embodiment of the disclosure has received the wireless communication signal from the cooking appliance 2000. When the wireless power transmission device 1000 has received the wireless communication signal from the cooking appliance 2000 (operation S1925—Yes), the method may proceed to operation S1960. When the wireless power transmission device 1000 has not received the wireless communication signal from the cooking appliance 2000 (operation S1925—No), the method may proceed to operation S1950.

The wireless power transmission device 1000 according to an embodiment of the disclosure may transmit a signal for establishing a wireless communication connection with the cooking appliance 2000, in operation S1930. The processor 1400 of the wireless power transmission device 1000 may control the communication interface to transmit the signal for establishing a wireless communication connection with the cooking appliance 2000. The cooking appliance 2000 may transmit the wireless communication signal to the wireless power transmission device 1000 in response to the signal for establishing a wireless communication connection. In operation S1935, it may be determined whether the wireless power transmission device 1000 according to an embodiment of the disclosure has received the wireless communication signal from the cooking appliance 2000. When the wireless power transmission device 1000 has received the wireless communication signal from the cooking appliance 2000 (operation S1935—Yes), the method may proceed to operation S1940. When the wireless power transmission device 1000 has not received the wireless communication signal from the cooking appliance 2000 (operation S1935—No), the method may proceed to operation S1990.

In operation S1940, the wireless power transmission device 1000 according to an embodiment of the disclosure may receive identification information from the cooking appliance 2000. The processor 1400 of the wireless power transmission device 1000 may control the communication interface to receive the identification information from the cooking appliance 2000. The processor 1400 may analyze the identification information to check the product type of the cooking appliance 2000, the type of the cooking appliance 2000, and the model of the cooking appliance 2000. In operation S1945, it may be determined whether the wireless power transmission device 1000 according to an embodiment of the disclosure has received identification information corresponding to the heater cooking appliance 2000. When the wireless power transmission device 1000 has received the identification information corresponding to the heater cooking appliance 2000 (operation S1945—Yes), the method may proceed to operation S1970. When the wireless power transmission device 1000 has not received the identification information corresponding to the heater cooking appliance 2000 (operation S1945—No), the method may proceed to operation S1980.

In operation S1950, the wireless power transmission device 1000 according to an embodiment of the disclosure may recognize the cooking appliance 2000 as a general IH container. In the case of operation S1950, a magnetic material may be included in the container of the cooking appliance 2000. In the case of operation S1950, the wireless power transmission device 1000 may not receive the wireless communication signal from the cooking appliance 2000. The processor 1400 of the wireless power transmission device 1000 may determine the cooking appliance 2000 to be a general IH container, when the container of the cooking appliance 2000 contains a magnetic material and the wireless power transmission device 1000 does not receive the wireless communication signal from the cooking appliance 2000.

In operation S1960, the wireless power transmission device 1000 according to an embodiment of the disclosure may recognize the cooking appliance 2000 as an IH cooking appliance 2000. In the case of operation S1960, a magnetic material may be included in the container of the cooking appliance 2000. In the case of operation S1960, the wireless power transmission device 1000 may receive the wireless communication signal from the cooking appliance 2000. The processor 1400 of the wireless power transmission device 1000 may determine the cooking appliance 2000 to be an IH cooking appliance 2000, when the container of the cooking appliance 2000 contains a magnetic material and the wireless power transmission device 1000 has received the wireless communication signal from the cooking appliance 2000.

In operation S1970, the wireless power transmission device 1000 according to an embodiment of the disclosure may recognize the cooking appliance 2000 as the heater cooking appliance 2000. In the case of operation S1970, a magnetic material may not be included in the container of the cooking appliance 2000. In the case of operation S1970, the wireless power transmission device 1000 may receive the wireless communication signal from the cooking appliance 2000. In the case of operation S1970, the wireless power transmission device 1000 may receive the identification information corresponding to the heater cooking appliance 2000. The processor 1400 of the wireless power transmission device 1000 may determine the cooking appliance 2000 to be a heater cooking appliance 2000, when the container of the cooking appliance 2000 does not contain a magnetic material and the wireless power transmission device 1000 has received the wireless communication signal from the cooking appliance 2000 and has received the identification information corresponding to the heater cooking appliance 2000.

In operation S1980, the wireless power transmission device 1000 according to an embodiment of the disclosure may recognize the cooking appliance 2000 as a non-heating cooking appliance 2000. In the case of operation S1980, a magnetic material may not be included in the container of the cooking appliance 2000. In the case of operation S1980, the wireless power transmission device 1000 may receive the wireless communication signal from the cooking appliance 2000. In the case of operation S1980, the wireless power transmission device 1000 may not receive the identification information corresponding to the cooking appliance 2000. The processor 1400 of the wireless power transmission device 1000 may determine the cooking appliance 2000 to be a non-heating cooking appliance 2000, when the container of the cooking appliance 2000 does not contain a magnetic material and the wireless power transmission device 1000 has received the wireless communication signal from the cooking appliance 2000 and has not received the identification information corresponding to the heater cooking appliance 2000.

In operation S1990, the wireless power transmission device 1000 according to an embodiment of the disclosure may output a notification of unusability. In the case of operation S1990, a magnetic material may not be included in the container of the cooking appliance 2000. In the case of operation S1990, the wireless power transmission device 1000 may not receive the wireless communication signal from the cooking appliance 2000. When the container of the cooking appliance 2000 does not contain a magnetic material and the wireless power transmission device 1000 does not receive the wireless communication signal from the cooking appliance 2000, the processor 1400 of the wireless power transmission device 1000 may determine that an unusable cooking appliance 2000 is placed on the cooking zone 1800. The processor 1400 may control the output interface to output a notification indicating that the cooking appliance 2000 is unusable.

Among the cooking appliances 2000, the IH cooking appliance 2000 and the heater cooking appliance 2000 may include a temperature sensor, a communication interface, and a controller. The controller of the IH cooking appliance 2000 and the heater cooking appliance 2000 may control a temperature sensor to measure temperature information of the contents or a surface. The controller of the IH cooking appliance 2000 and the heater cooking appliance 2000 may control the communication interface to transmit the temperature information measured by the temperature sensor to the wireless power transmission device 1000 by using the communication interface. Accordingly, the wireless power transmission device 1000 may receive the temperature information from the IH cooking appliance 2000 and the heater cooking appliance 2000. An operation, performed by the wireless power transmission device 1000, of controlling a light source by using the temperature information received from the IH cooking appliance 2000 and the heater cooking appliance 2000 will now be described with reference to FIG. 20.

FIG. 20 is a flowchart of a control method by a wireless power transmission device according to temperature information according to an embodiment of the disclosure.

Referring to FIG. 20, in operation S2010, the wireless power transmission device 1000 according to an embodiment of the disclosure may control the communication interface to receive identification information from the cooking appliance 2000. The processor 1400 of the wireless power transmission device 1000 may control the communication interface to establish a wireless communication connection with the cooking appliance 2000. The processor 1400 may control the communication interface to receive the identification information from the cooking appliance 2000 with which a wireless communication connection has been established. The processor 1400 may determine whether the cooking appliance 2000 with which a wireless communication connection has been established corresponds to the IH cooking appliance 2000 or the heater cooking appliance 2000, based on the identification information.

The wireless power transmission device 1000 according to an embodiment of the disclosure may control the wireless power transmitter to transmit first power to the IH cooking appliance 2000 or the heater cooking appliance 2000 each including a first temperature sensor, in operation S2020. The IH cooking appliance 2000 or the heater cooking appliance 2000 may include a first temperature sensor. The first temperature sensor may measure temperature information of the contents or surface of the cooking appliance 2000. The first temperature sensor may be a temperature sensor separate from the temperature sensor of the wireless power transmission device 1000. The processor 1400 of the wireless power transmission device 1000 may control the wireless power transmitter to transmit first power to the IH cooking appliance 2000 or the heater cooking appliance 2000.

In operation S2030, the wireless power transmission device 1000 according to an embodiment of the disclosure may control the communication interface to receive temperature information from the cooking appliance 2000. The cooking appliance 2000 that has received the first power may be heated. The cooking appliance 2000 may generate temperature information by using the first temperature sensor. The processor 1400 of the wireless power transmission device 1000 may control the communication interface to receive the temperature information generated by using the first temperature sensor.

The wireless power transmission device 1000 according to an embodiment of the disclosure may control the light source driver to set at least one of the light emission intensity of the light source, the light emission color of the light source, or the light emission form of the light source, based on the amount of the second power and the temperature information, in operation S2040. The processor 1400 of the wireless power transmission device 1000 may control the light source driver to set at least one of the light emission intensity of the light source, the light emission color of the light source, or the light emission form of the light source, based on the amount of the second power induced to the sensing coil when the first power is transmitted. When the amount of the induced second power is constant, the processor 1400 of the wireless power transmission device 1000 may control the light source driver to set at least one of the light emission intensity of the light source, the light emission color of the light source, or the light emission form of the light source by additionally considering the received temperature information. For example, the processor 1400 may increase the light emission intensity of the light source as the temperature of the cooking appliance 2000 according to the temperature information increases. For example, the processor 1400 may change the light emission color of the light source as the temperature of the cooking appliance 2000 according to the temperature information increases. For example, the processor 1400 may gradually change the light emission form of the light source as the temperature of the cooking appliance 2000 according to the temperature information increases.

In operation S2050, the wireless power transmission device 1000 according to an embodiment of the disclosure may control the light source driver so that the light source flickers when the temperature of the cooking appliance 2000 is equal to or greater than a threshold temperature. The processor 1400 of the wireless power transmission device 1000 may determine whether the temperature of the cooking appliance 2000 is equal to or greater than the threshold temperature. The processor 1400 may control the light source driver so that the light source flickers when the temperature of the cooking appliance 2000 is equal to or greater than the threshold temperature. Accordingly, when the temperature of the cooking appliance 2000 is equal to or greater than the threshold temperature, the wireless power transmission device 1000 may visually warn the user that the temperature of the cooking appliance 2000 is equal to or greater than the threshold temperature.

A general IH container among the cooking appliances 2000 may not include a temperature sensor, a communication interface, and a controller. A non-heating cooking appliance among the cooking appliances 2000 may include only a communication interface and a controller and may not include a temperature sensor. The general IH container and the non-heating cooking appliance are unable to measure temperature information of their contents or surfaces by themselves. The wireless power transmission device 1000 may include a temperature sensor for measuring the temperature of the cooking zone 1800. Accordingly, the wireless power transmission device 1000 may use a temperature sensor to measure temperature information of the cooking zone 1800 where a general IH container and a non-heating cooking appliance are placed. An operation, performed by the wireless power transmission device 1000, of measuring the temperature information of the cooking zone 1800 where a general IH container and a non-heating cooking appliance are placed and controlling a light source by using the measured temperature information will now be described with reference to FIG. 21.

FIG. 21 is a flowchart of a control method by a wireless power transmission device according to temperature information according to an embodiment of the disclosure.

Referring to FIG. 21, the wireless power transmission device 1000 according to an embodiment of the disclosure may control the wireless power transmitter to transmit first power to a general IH container or a non-heating cooking appliance each including no first temperature sensors, in operation S2110. The processor 1400 of the wireless power transmission device 1000 may sense that the cooking appliance 2000 is placed on the cooking zone 1800, by using a sensor unit. When receiving the wireless communication signal from the cooking appliance 2000, the processor 1400 of the wireless power transmission device 1000 may determine the cooking appliance 2000 to be a general IH container. The processor 1400 may determine the cooking appliance 2000 to be a non-heating cooking appliance, based on the identification information received from the cooking appliance 2000. The processor 1400 of the wireless power transmission device 1000 may control the wireless power transmitter to transmit first power to an IH cooking appliance or a heater cooking appliance. The general IH container and the non-heating cooking appliance may receive the first power. The general IH container and the non-heating cooking appliance may not measure the temperature information.

In operation S2120, the wireless power transmission device 1000 according to an embodiment of the disclosure may control the temperature sensor to measure the temperature information. The processor 1400 of the wireless power transmission device 1000 may control the temperature sensor to measure the temperature of the cooking zone 1800 on which the cooking appliance 2000 is placed.

In operation S2130, the wireless power transmission device 1000 according to an embodiment of the disclosure may control the light source driver to set at least one of the light emission intensity of the light source, the light emission color of the light source, or the light emission form of the light source, based on the amount of the second power and the temperature information. The processor 1400 of the wireless power transmission device 1000 may control the light source driver to set at least one of the light emission intensity of the light source, the light emission color of the light source, or the light emission form of the light source, based on the amount of the second power induced to the sensing coil when the first power is transmitted. When the amount of the induced second power is constant, the processor 1400 of the wireless power transmission device 1000 may control the light source driver to set at least one of the light emission intensity of the light source, the light emission color of the light source, or the light emission form of the light source by additionally considering the temperature information measured by the temperature sensor. For example, the processor 1400 may increase the light emission intensity of the light source as the temperature of the cooking zone 1800 according to the temperature information increases. For example, the processor 1400 may change the light emission color of the light source as the temperature of the cooking zone 1800 according to the temperature information increases. For example, the processor 1400 may gradually change the light emission form of the light source as the temperature of the cooking zone 1800 according to the temperature information increases.

In operation S2140, the wireless power transmission device 1000 according to an embodiment of the disclosure may control the light source driver so that the light source flickers when the temperature of the cooking zone 1800 is equal to or greater than a threshold temperature. The processor 1400 of the wireless power transmission device 1000 may determine whether the temperature of the cooking zone 1800 is equal to or greater than the threshold temperature. The processor 1400 may control the light source driver so that the light source flickers when the temperature of the cooking zone 1800 is equal to or greater than the threshold temperature. Accordingly, when the temperature of the cooking zone 1800 is equal to or greater than the threshold temperature, the wireless power transmission device 1000 may visually warn the user that the temperature of the cooking zone 1800 or the cooking appliance 2000 is equal to or greater than the threshold temperature.

Even when the wireless power transmission device 1000 does not transmit power to a cooking appliance, there may be a need to check temperature information of the cooking appliance or the cooking zone 1800. For example, even when the user inputs a command to stop heating of the wireless power transmission device 1000 and thus the wireless power transmission device 1000 stops transmitting power to the cooking appliance, the cooking appliance or the cooking zone 1800 may remain at a high temperature. Accordingly, the wireless power transmission device 1000 may need to notify the user of the temperature information of the cooking device or the cooking zone 1800 even while the wireless power transmission device 1000 stops transmitting power to the cooking appliance. An operation, performed by the wireless power transmission device 1000, of measuring the temperature information of the cooking zone 1800 and controlling a light source by using the measured temperature information while the wireless power transmission device 1000 is not transmitting power to the cooking appliance will now be described with reference to FIG. 22.

FIG. 22 is a flowchart of a control method by a wireless power transmission device according to temperature information according to an embodiment of the disclosure.

Referring to FIG. 22, in operation S2210, the wireless power transmission device 1000 according to an embodiment of the disclosure may control the wireless power transmitter to stop transmitting first power. The processor 1400 of the wireless power transmission device 1000 may receive a power transmission stop command from a user through an input interface. The processor 1400 may control the wireless power transmitter to stop transmission of the first power through the working coil. When the transmission of the first power is stopped, induction of the second power into the sensing coil may be stopped.

In operation S2220, the wireless power transmission device 1000 according to an embodiment of the disclosure may control the temperature sensor to measure the temperature information after the stoppage of the transmission of the first power. The processor 1400 of the wireless power transmission device 1000 may control the temperature sensor to measure the temperature information during a time period designated right after the stoppage of the transmission of the first power. The processor 1400 may control the temperature sensor to measure the temperature information at a designated interval after the stoppage of the transmission of the first power.

In operation S2230, the wireless power transmission device 1000 according to an embodiment of the disclosure may control the light source driver to set at least one of the light emission intensity of the light source, the light emission color of the light source, or the light emission form of the light source, based on the temperature information. When induction of the second power is stopped, the processor 1400 of the wireless power transmission device 1000 may control the light source driver to set at least one of the light emission intensity of the light source, the light emission color of the light source, or the light emission form of the light source, based on the temperature information measured by the temperature sensor. For example, the processor 1400 may increase the light emission intensity of the light source as the temperature of the cooking zone 1800 according to the temperature information increases. For example, the processor 1400 may change the light emission color of the light source as the temperature of the cooking zone 1800 according to the temperature information increases. For example, the processor 1400 may gradually change the light emission form of the light source as the temperature of the cooking zone 1800 according to the temperature information increases. For example, the processor 1400 may control the light source driver so that the light source flickers when the temperature of the cooking zone 1800 is equal to or greater than the threshold temperature, based on the temperature information. Accordingly, the wireless power transmission device 1000 may easily visualize the temperature of the cooking zone 1800 or the cooking appliance to the user through the light source according to the temperature of the cooking zone 1800 even when the transmission of the first power is interrupted.

In the wireless power transmission device 1000 and its control method according to an embodiment of the disclosure, the light source may be controlled according to the temperature information, so that, even when the wireless power transmission device 1000 does not perform a heating operation, the user may be easily informed of whether an object to be heated is maintained at a high temperature.

A change in the light emission intensity according to temperature will now be described with reference to FIG. 23.

Figure 23:
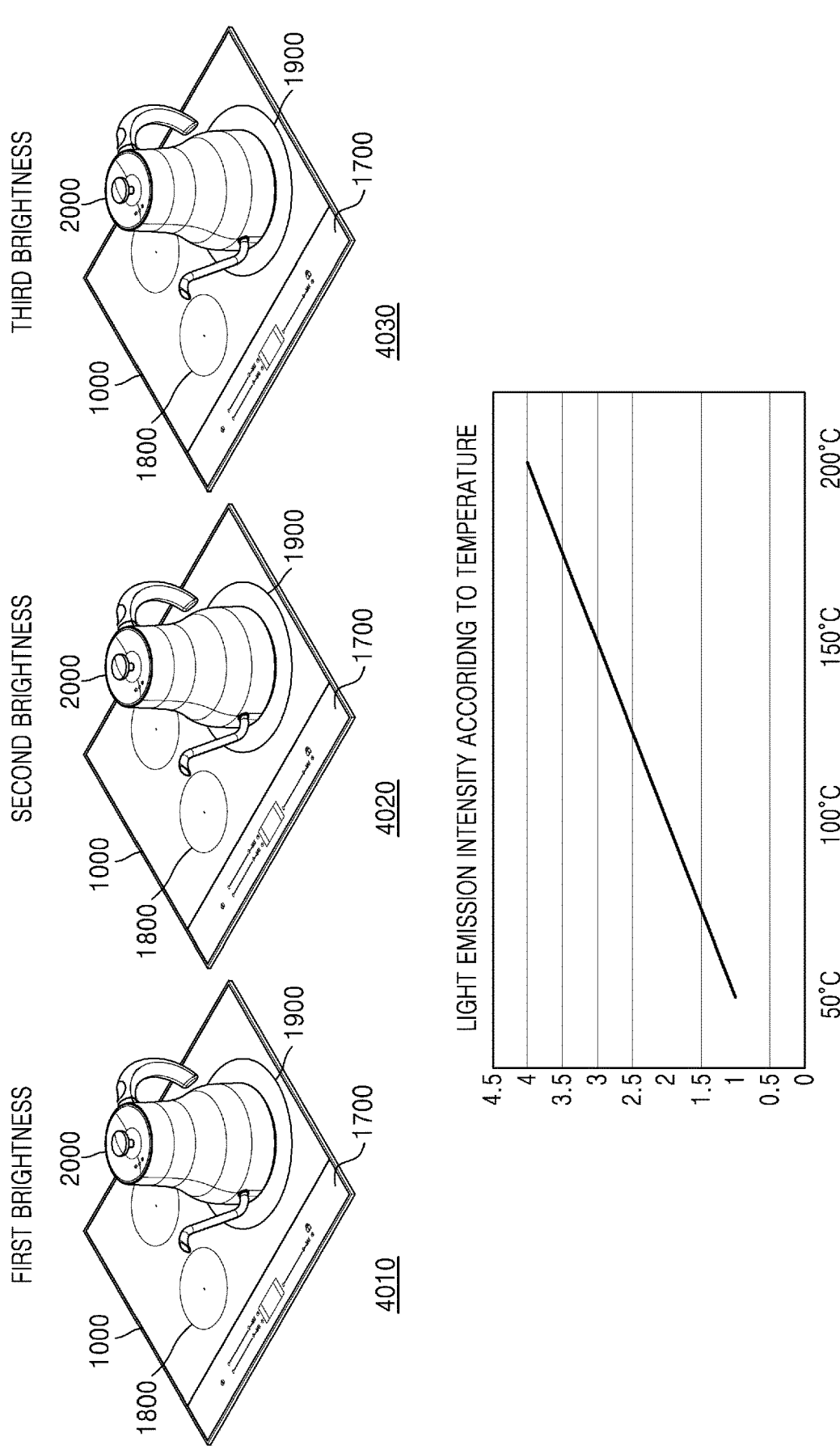
FIG. 23 is a diagram illustrating a change in a light emission intensity of a light source of a wireless power transmission device according to an embodiment of the disclosure.

FIG. 23 is a diagram illustrating a change in a light emission intensity of a light source of a wireless power transmission device according to an embodiment of the disclosure.

Referring to FIG. 23, the wireless power transmitter of the wireless power transmission device 1000 may transmit the first power to the cooking appliance 2000 placed on the cooking zone 1800 in response to a heating command input to the user manipulator 1700. The wireless power transmitter may stop transmitting power in response to a heating stop command input to the user manipulator 1700. The processor 1400 of the wireless power transmission device 1000 may control the light source driver to set the light emission intensity of the light source, based on the temperature information of the cooking zone 1800 or the cooking appliance 2000. The light source driver may adjust the light emission intensity of the light emitter 1900 shown to the user by setting the light emission intensity of the light source. For example, the light source driver may adjust the light emission intensity of the light emitter 1900 shown to the user by setting the number of operating light source units among the light source units constituting the light source. For example, the light source driver may adjust the light emission intensity of the light emitter 1900 shown to the user by setting a light emission strength of each of the light source units constituting the light source.

Referring to 4010 of FIG. 23, when the temperature information has a first temperature value, the light source driver may set the light emission intensity of the light source so that the light emitter 1900 emits light at a first brightness. For example, the first temperature value may be about 50° C. For example, the first brightness may be a minimum brightness that the light emitter 1900 is able to express. For example, the first brightness may be about 50 lux.

Referring to 4020 of FIG. 23, when the temperature information has a second temperature value greater than the first temperature value, the light source driver may set the light emission intensity of the light source so that the light emitter 1900 emits light at a second brightness. For example, the second temperature value may be about 100° C. For example, the second brightness may be about twice the first brightness. For example, the second brightness may be about 100 lux.

Referring to 4030 of FIG. 23, when the temperature information has a third temperature value greater than the second temperature value, the light source driver may set the light emission intensity of the light source so that the light emitter 1900 emits light at a third brightness. For example, the third temperature value may be about 150° C. For example, the third brightness may be about triple the first brightness. For example, the third brightness may be about 150 lux.

A change in the light emission color according to temperature will now be described with reference to FIG. 24.

Figure 24:
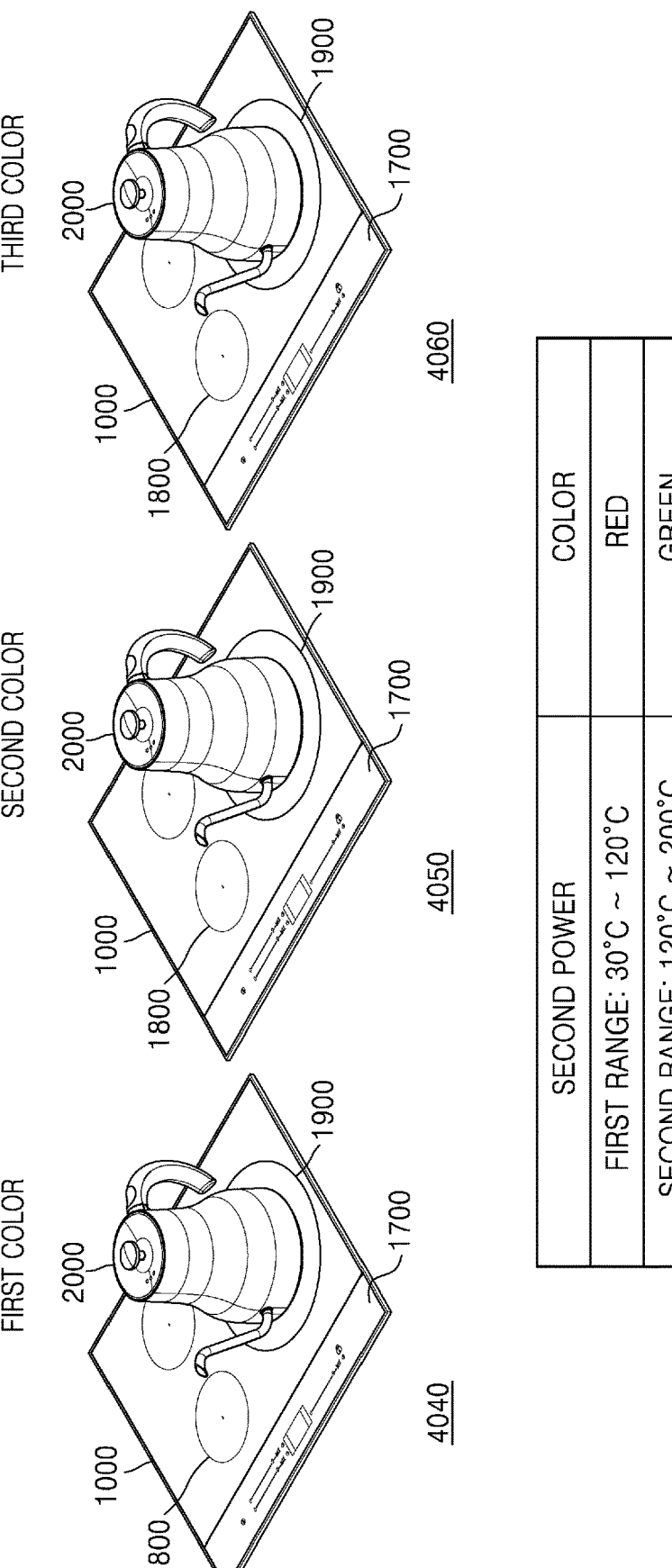
FIG. 24 is a diagram illustrating a change in a light emission color of a light source of a wireless power transmission device according to an embodiment of the disclosure.

FIG. 24 is a diagram illustrating a change in a light emission color of the light source of a wireless power transmission device according to an embodiment of the disclosure.

Referring to FIG. 24, the wireless power transmitter of the wireless power transmission device 1000 may transmit the first power to the cooking appliance 2000 placed on the cooking zone 1800 in response to a heating command input to the user manipulator 1700. The wireless power transmitter may stop transmitting power in response to a heating stop command input to the user manipulator 1700. The processor 1400 of the wireless power transmission device 1000 may control the light source driver to set the light emission intensity of the light source, based on the temperature information of the cooking zone 1800 or the cooking appliance 2000. The light source driver may set the light emission color of the light emitter 1900 shown to the user by setting the light emission color of the light source. For example, the light source driver may set the light source color of the light emitter 1900 shown to the user, by setting an operating subunit among a red subunit, a green subunit, and a blue subunit included in the light source units constituting the light source. For example, the light source driver may set the light emission color of the light emitter 1900 visible to the user to be red, by controlling a switching circuit to transmit a driving voltage to the red subunit. For example, the light source driver may set the light emission color of the light emitter 1900 visible to the user to be green, by controlling the switching circuit to transmit a driving voltage to the green subunit. For example, the light source driver may set the light emission color of the light emitter 1900 visible to the user to be blue, by controlling the switching circuit to transmit a driving voltage to the blue subunit.

Referring to 4040 of FIG. 24, when the temperature information has a first range, the light source driver may set the light emission intensity of the light source so that the light emitter 1900 emits light in a first color. For example, the first range may be equal to or greater than about 30° C. and less than about 120° C. For example, the first color may be red.

Referring to 4050 of FIG. 24, when the temperature information has a second range greater than the first range, the light source driver may set the light emission intensity of the light source so that the light emitter 1900 emits light in a second color different from the first color. For example, the second range may be equal to or greater than about 120° C. and less than about 200° C. For example, the second color may be green.

Referring to 4060 of FIG. 24, when the amount of the second power has a third range greater than the second range, the light source driver may set the light emission color of the light source so that the light emitter 1900 emits light in a third color different from the first color and the second color. For example, the third range may be equal to or greater than about 200° C. For example, the third color may be blue.

A change in the light emission form according to temperature will now be described with reference to FIG. 25.

Figure 25:
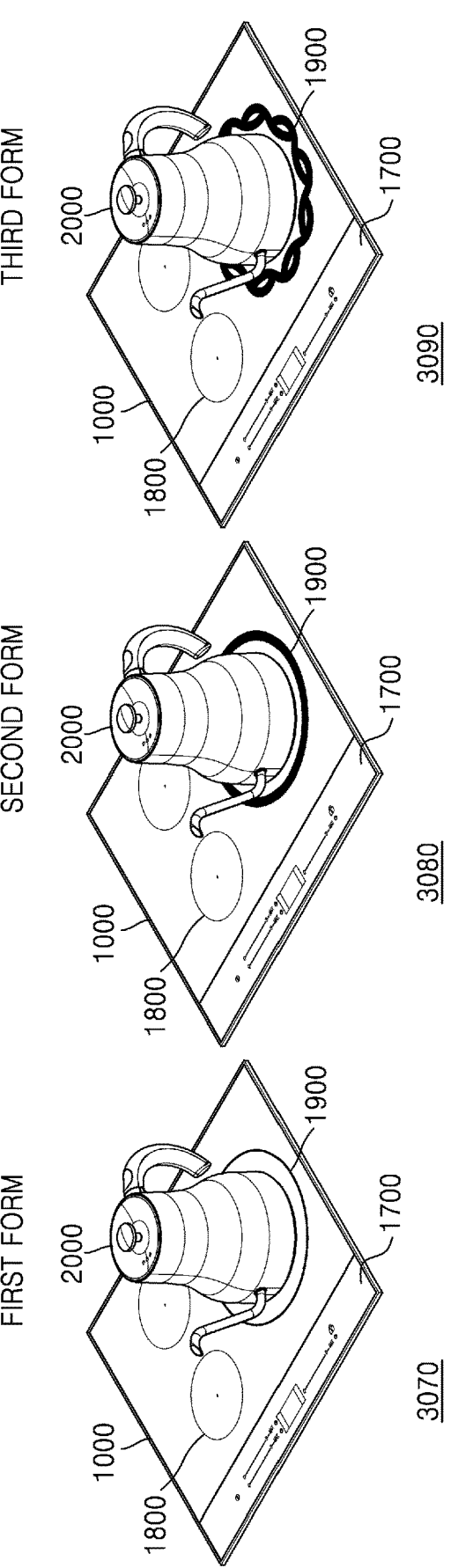
FIG. 25 is a diagram illustrating a change in a light emission form of a light source of a wireless power transmission device according to an embodiment of the disclosure.

FIG. 25 is a diagram illustrating a change in a light emission form of a light source of a wireless power transmission device according to an embodiment of the disclosure.

Referring to FIG. 25, the wireless power transmitter of the wireless power transmission device 1000 may transmit the first power to the cooking appliance 2000 placed on the cooking zone 1800 in response to a heating command input to the user manipulator 1700. The wireless power transmitter may stop transmitting power in response to a heating stop command input to the user manipulator 1700. The processor 1400 of the wireless power transmission device 1000 may control the light source driver to set the light emission intensity of the light source, based on the temperature information of the cooking zone 1800 or the cooking appliance 2000. The light source driver may set the light emission form of the light emitter 1900 shown to the user by setting the light emission form of the light source. For example, the light source driver may set the light emission form of the light emitter 1900 shown to the user, by selecting, for each arrangement location, a light source unit that is operating from among the light source units constituting the light source.

Referring to 4070 of FIG. 25, when the temperature information has a first range, the light source driver may set the light emission form of the light source so that the light emitter 1900 emits light in a first form. For example, the first range may be equal to or greater than about 30° C. and less than about 120° C. For example, the first form may be a thin circle.

Referring to 4080 of FIG. 25, when the temperature information has a second range greater than the first range, the light source driver may set the light emission form of the light source so that the light emitter 1900 emits light in a second form. For example, the second range may be equal to or greater than about 120° C. and less than about 200° C. For example, the second form may be a thick circle.

Referring to 4090 of FIG. 25, when the temperature information has a third range greater than the second range, the light source driver may set the light emission form of the light source so that the light emitter 1900 emits light in a third form. For example, the second range may be equal to or greater than about 200° C. For example, the third form may be a curved wave form.

The wireless power transmission device 1000 including a light source and the processor 1400 of the wireless power transmission device 1000 controlling the light source driver to set at least one of the light emission intensity of the light source, the light emission color of the light source, or the light emission form of the light source has been focused on and described with reference to FIGS. 1 through 25. However, embodiments of the disclosure are not limited thereto, and a cooking appliance may include a light source and a controller of the cooking appliance may control the light source to set at least one of the light emission intensity, the light emission color, or the light emission form of the light source. A case where a cooking appliance includes a light source will now be described with reference to FIG. 26.

Figure 26:
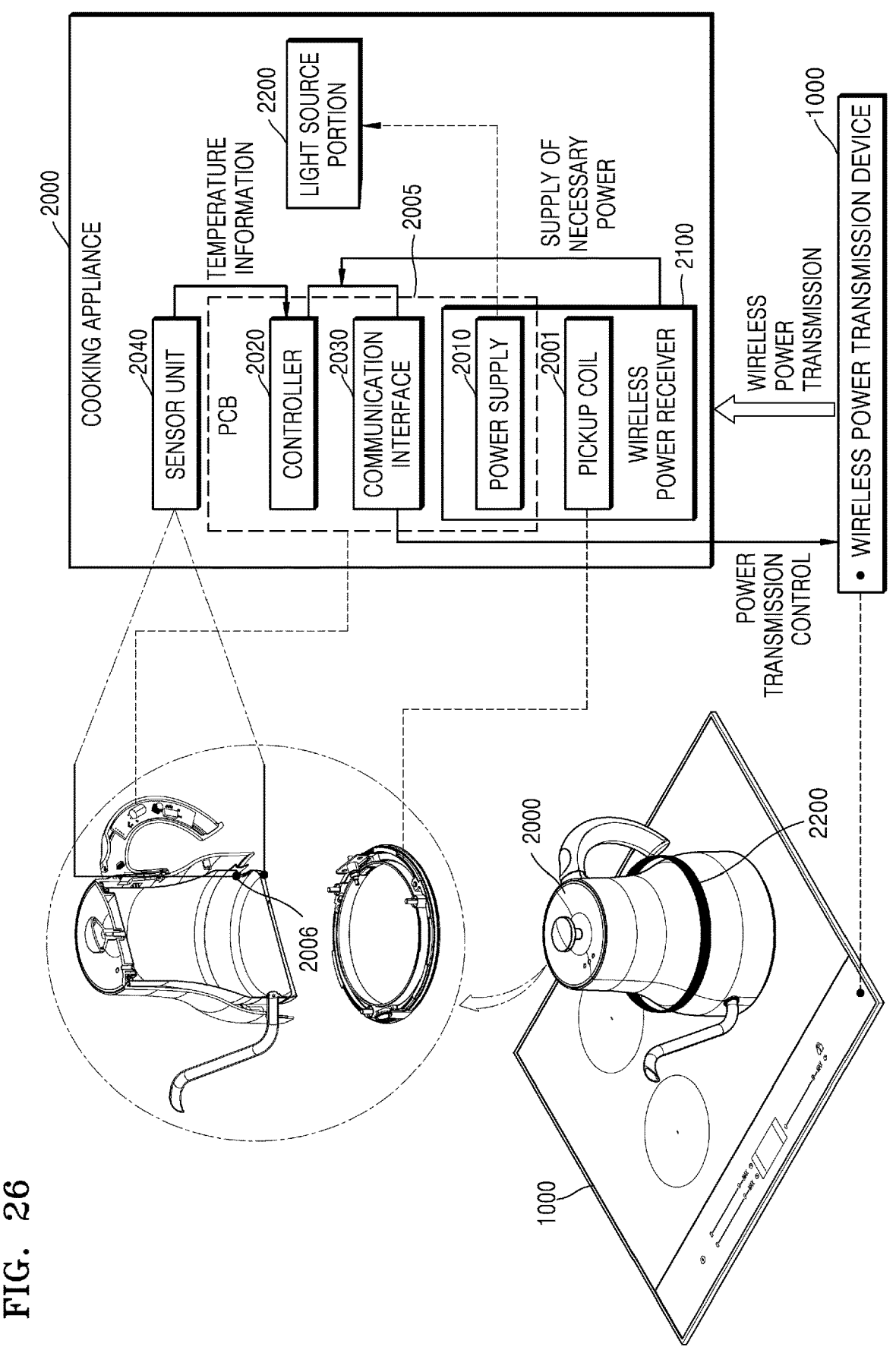
FIG. 26 is a view of a cooking appliance according to an embodiment of the disclosure.

FIG. 26 illustrates a structure of a cooking appliance according to an embodiment of the disclosure.

Referring to FIG. 26, the cooking appliance 2000 according to an embodiment of the disclosure may include a wireless power receiver 2100, a controller 2020, a communication interface 2030, the sensor unit 2040, and a light source 2200. The wireless power receiver 2100 may include the pickup coil 2001 and a power supply 2010. According to an embodiment of the disclosure, the power supply 2010, the controller 2020, and the communication interface 2030 may be mounted on a PCB 2005.

The wireless power receiver 2100 may wirelessly receive first power from the wireless power transmission device 1000. The wireless power receiver 2100 may supply the received first power to the controller 2020 and the communication interface 2030. The wireless power receiver 2100 may include the pickup coil 2001 and a power supply 2010.

The pickup coil 2001 may generate power for operating the PCB 2005. When power is supplied to the PCB 2005 through the pickup coil 2001, component parts mounted on the PCB 2005 may be activated. For example, when power is supplied to the PCB 2005 through the pickup coil 2001, the power supply 2010, the controller 2020, and the communication interface 2030 may be activated.

The power supply 2010 may receive AC power from the pickup coil 2001 and supply DC power to the controller 2020 and the communication interface 2030. The power supply 2010 may drive the light source 220 by using the first power transmitted by the wireless power transmission device 1000.

The controller 2020 may include at least one processor. The at least one processor may control overall operations of the cooking appliance 2000. For example, the at least one processor included in the controller 2020 may control the power supply 2010 and the communication interface 2030.

According to an embodiment of the disclosure, the controller 2020 may transmit the first power for heating the contents of the cooking appliance 2000 or operating the cooking appliance 2000, from the wireless power transmission device 1000 through the power supply 2010.

The controller 2020 may control the communication interface 2030 to transmit or receive data.

The communication interface 2030 may include one or more components that enable communication between the cooking appliance 2000 and the wireless power transmission device 1000, between the cooking appliance 2000 and a server device (not shown), or between the cooking appliance 2000 and a mobile terminal (not shown).

The sensor unit 2040 may include at least one temperature sensor. The sensing unit 2040 may transmit temperature information to the controller 2020.

The light source 2200 may be arranged on the surface of the cooking appliance 2000. For example, the light source 2200 may be arranged to surround an external lateral surface of the cooking appliance 2000. The light source 2200 may include a plurality of light source units. For example, the light source 2200 may include a plurality of LEDs. The light source 2200 may be driven by the power received from the power supply 2010.

The components of a cooking appliance including a light source will now be described with reference to FIG. 27.

Figure 27:
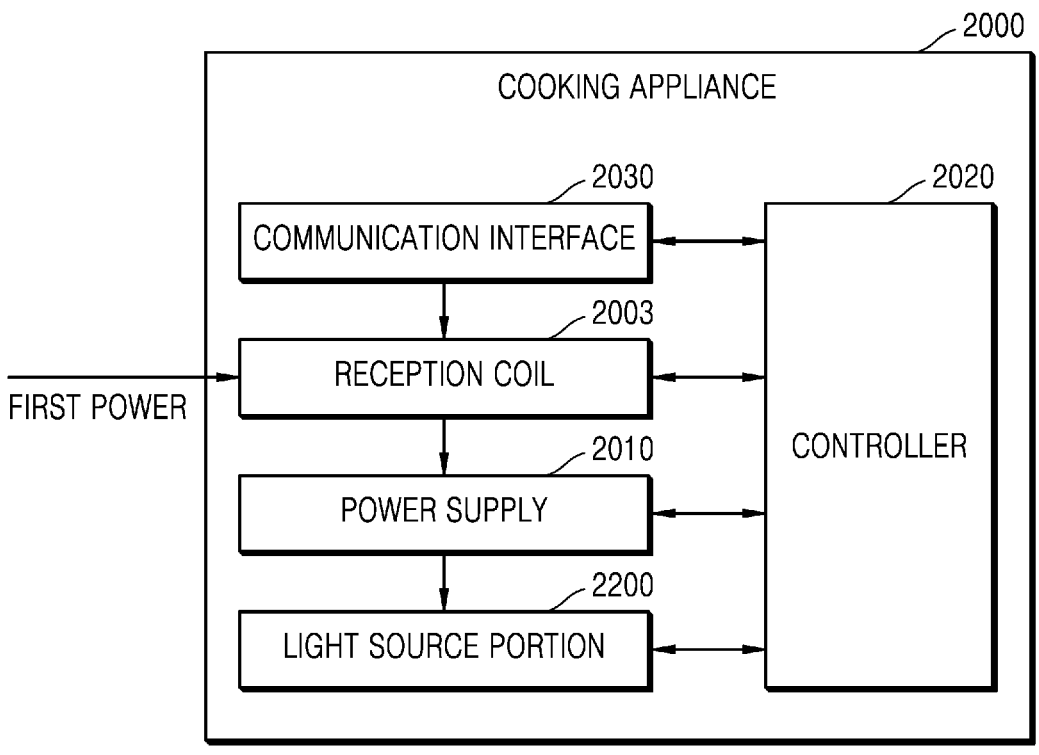
FIG. 27 is a block diagram of a cooking appliance according to an embodiment of the disclosure.

FIG. 27 is a block diagram of a cooking appliance according to an embodiment of the disclosure.

Referring to FIG. 27, the cooking appliance 2000 according to an embodiment of the disclosure may include a communication interface 2030, a reception coil 2003, a power supply 2010, a light source 2200, and a controller 2020.

The communication interface 2030 may establish a wireless communication connection with the wireless power transmission device 1000. The communication interface 2030 may receive a signal for establishing a wireless communication connection from the wireless power transmission device 1000. The communication interface 2030 may transmit wireless communication identification information including identification information to the wireless power transmission device 1000. The communication interface 2030 may transmit the type of cooking appliance 2000 and the location of the cooking appliance 2000 to the wireless power transmission device 1000. When the cooking appliance 2000 includes a temperature sensor, the communication interface 2030 may transmit temperature information of the cooking appliance 2000 to the wireless power transmission device 1000.

The reception coil 2003 may wirelessly receive power from the wireless power transmission device 1000. The reception coil 2003 may receive first power from the wireless power transmission device 1000. The first power may be power for heating the contents of the cooking appliance 2000 or operating the cooking appliance 2000. The reception coil 2003 may transmit the received first power to the power supply 2010.

The power supply 2010 may be electrically connected to the reception coil 2003. The power supply 2010 may receive the first power from the reception coil 2003. The power supply 2010 may drive the light source 2200.

The light source 2200 may receive power from the power supply 2010. The light source 2200 may emit light according to the driving of the power supply 2010.

The controller 2020 may control overall operations of the communication interface 2030. The controller 2020 may control the communication interface 2030 to establish a wireless communication connection with the wireless power transmission device 1000. The controller 2020 may measure the first power received from the reception coil 2030.

The controller 2020 may control overall operations of the power supply 2010. The controller 2020 may control the power supply 2010 to drive the light source 2200. The controller 2020 may control the power supply 2010 to set at least one of the light emission intensity of the light source 2200, the light emission color of the light source 2200, or the light emission form of the light source 2200, based on the amount of the measured first power. For example, the controller 2020 may control the power supply 2010 to change the light emission intensity of the light source 2200 according to a change in the amount of the first power. For example, the controller 2020 may change the number of light-emitting units that are operating from among the light-emitting units constituting the light source 2200 according to a change in the amount of the first power. For example, the controller 2020 may control the power supply 2010 to change the light emission color of the light source 2200 according to a change in the amount of the first power. For example, the controller 2020 may control the power supply 2010 to change the light emission form of the light source 2200 according to a change in the amount of the first power.

Operations of controlling a cooking appliance including a light source will now be described with reference to FIG. 28.

Figure 28:
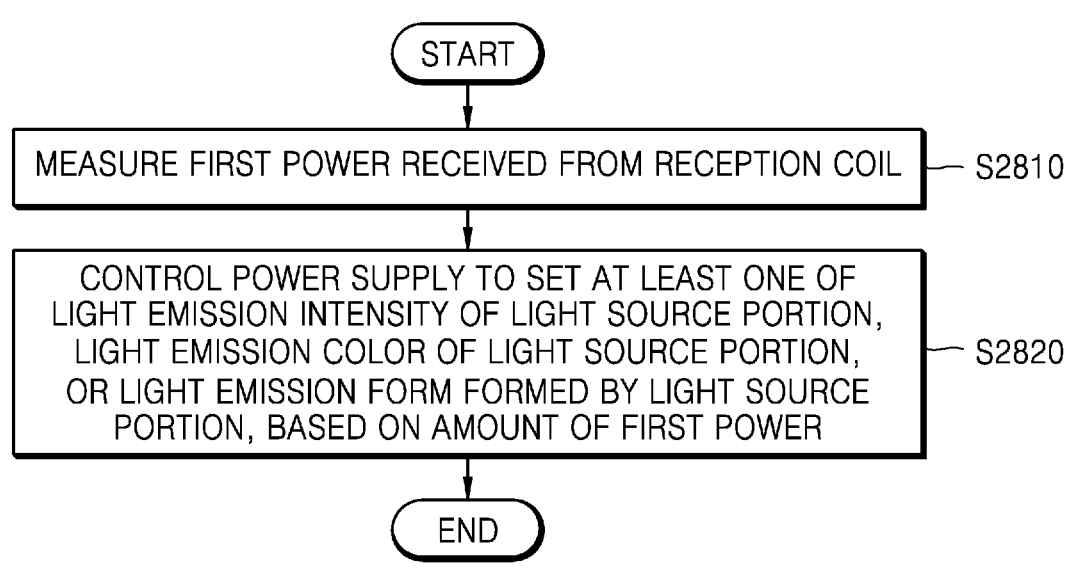
FIG. 28 is a flowchart of a method of controlling a cooking appliance according to an embodiment of the disclosure.

FIG. 28 is a flowchart of a method of controlling a cooking appliance according to an embodiment of the disclosure.

Referring to FIG. 28, in operation S2810, the cooking appliance according to an embodiment of the disclosure may measure first power received from a reception coil. The reception coil may receive the first power for heating the contents of the cooking appliance 2000 or operating the cooking appliance 2000. The controller 2200 of the cooking appliance 2000 may measure the amount of the first power.

In operation S2820, the cooking appliance 2000 according to an embodiment of the disclosure may control the power supply to set at least one of the light emission intensity of a light source, the light emission color of the light source, or the light emission form of the light source, based on the amount of the first power. For example, the controller 2200 may control the power supply to increase the light emission intensity of the light source as the amount of the first power increases. For example, as the amount of the first power increases, the controller 2200 may increase the number of light-emitting units that are operating from among the light-emitting units constituting the light source.

For example, the controller 2200 may control the power supply to change the light emission color of the light source to a red color, a green color, and a blue color as the amount of the first power increases. For example, the controller 2200 may control the power supply to change the light emission form of the light source to a thin circle, a thick circle, and a curved wave form as the amount of the first power increases.

Operations of controlling a cooking appliance including a light source according to temperature information will now be described with reference to FIG. 29.

Figure 29:
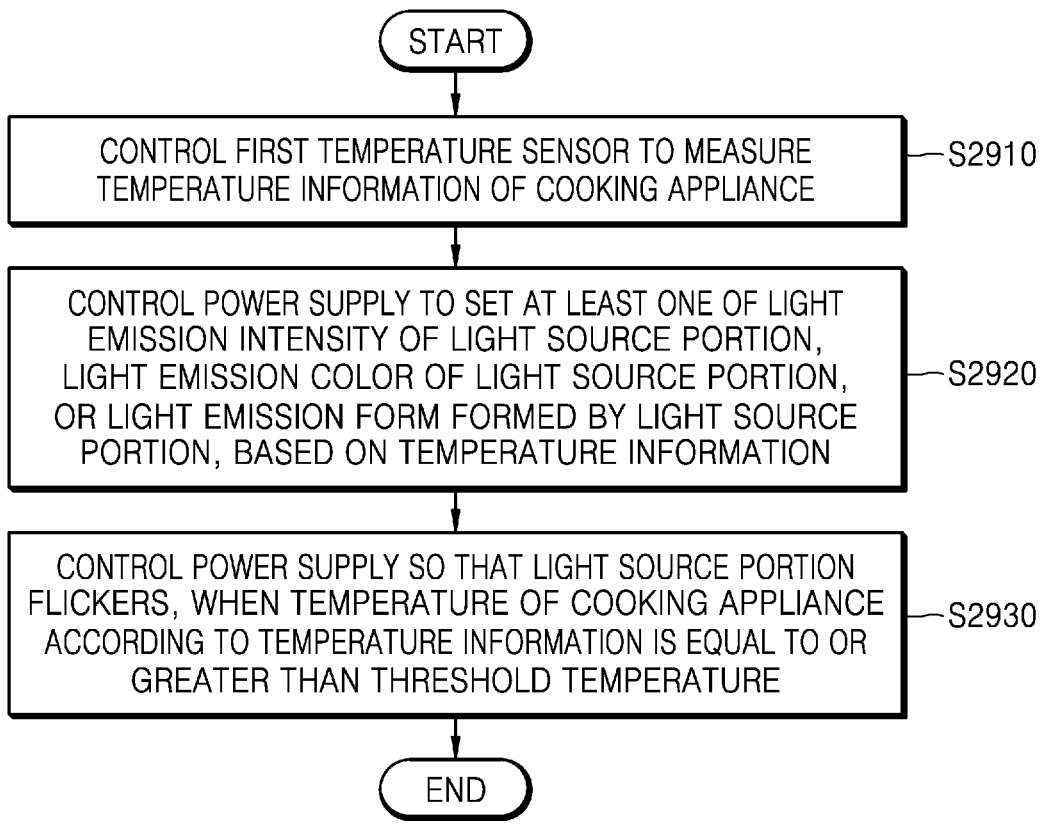
FIG. 29 is a flowchart of a method of controlling a cooking appliance according to an embodiment of the disclosure.

FIG. 29 is a flowchart of a method of controlling a cooking appliance according to an embodiment of the disclosure.

Referring to FIG. 29, in operation S2910, the cooking appliance 2000 according to an embodiment of the disclosure may control a first temperature sensor to measure the temperature information of the cooking appliance 2000. The cooking appliance 2000 may include the first temperature sensor. The first temperature sensor may measure temperature information of the contents or surface of the cooking appliance 2000. The controller 2200 of the cooking appliance 2000 may control the first temperature sensor to measure the temperature information.

In operation S2920, the cooking appliance 2000 according to an embodiment of the disclosure may control the power supply to set at least one of the light emission intensity of a light source, the light emission color of the light source, or the light emission form of the light source, based on the temperature information. For example, the controller 2200 may control the power supply to increase the light emission intensity of the light source as a temperature value according to the temperature information increases. For example, as the temperature value according to the temperature information increases, the controller 2200 may increase the number of light-emitting units that are operating among the light-emitting units constituting the light source. For example, the controller 2200 may control the power supply to change the light emission color of the light source to a red color, a green color, and a blue color as the temperature value according to the temperature information increases. For example, the controller 2200 may control the power supply to change the light emission form of the light source to a thin circle, a thick circle, and a curved wave form as the temperature value according to the temperature information increases.

In operation S2930, the cooking appliance 2000 according to an embodiment of the disclosure may control the power supply so that the light source flickers, when the temperature of the cooking appliance 2000 according to the temperature information is equal to or greater than a threshold temperature. The controller 2200 of the cooking appliance 2000 may determine whether the temperature of the cooking appliance 2000 is equal to or greater than the threshold temperature. The controller 2200 may control the power supply so that the light source flickers when the temperature of the cooking appliance 2000 is equal to or greater than the threshold temperature. Accordingly, when the temperature of the cooking appliance 2000 is equal to or greater than the threshold temperature, the cooking appliance 2000 may visually warn the user that the temperature of the cooking appliance 2000 is equal to or greater than the threshold temperature.

According to an embodiment of the disclosure, a wireless power transmission device and its control method in which light emission of a light source is controlled based on the intensity of second power induced to a sensing coil by transmitted first power, so that a user may be easily informed of a degree to which an object to be heated, such as a cooking appliance, is actually heated may be provided.

According to an embodiment of the disclosure, there are provided a wireless power transmission device that controls a light source according to temperature information to easily inform a user of whether an object to be heated is at a high temperature state even when the wireless power transmission device does not perform a heating operation, and a control method thereof.

The wireless power transmission device according to an embodiment of the disclosure includes a wireless power transmitter including a working coil and configured to wirelessly transmit power to a cooking appliance located in a cooking zone, a communication interface configured to establish a wireless communication connection with the cooking appliance, a sensing coil surrounding an outer side edge of the working coil, a light source driver electrically connected to the sensing coil, a light source configured to emit light according to driving of the light source driver, and at least one processor. The at least one processor is configured to control the wireless power transmitter to transmit first power supplied by the working coil to the cooking appliance, control the light source driver to measure second power induced in the sensing coil when the first power is transmitted, and control the light source driver to set at least one of a light emission intensity of the light source, a light emission color of the light source, or a light emission form of the light source, based on the amount of the second power.

According to an embodiment of the disclosure, the amount of the second power may vary depending on the transmission amount of the first power and the characteristics of the cooking appliance, and the characteristics of the cooking appliance may include at least one of a material of the cooking appliance, a size of the cooking appliance, a placement position of the reception coil of the cooking appliance, a size of the reception coil, or an inductance of the reception coil.

According to an embodiment of the disclosure, the wireless power transmission device may further include a heat-resistant substrate disposed to surround the working coil, and the sensing coil may be disposed on the heat-resistant substrate by using a printed electronics method.

According to an embodiment of the disclosure, the light source may be arranged to surround at least a portion of an outer side edge of the sensing coil.

According to an embodiment of the disclosure, the light source may be arranged in a gap region between the working coil and the sensing coil.

According to an embodiment of the disclosure, as the amount of the second power increases, the light emission intensity of the light source may increase.

According to an embodiment of the disclosure, when the amount of the second power is in a first range, the light source driver may set the light emission color of the light source to be a first color, when the amount of the second power is in a second range greater than the first range, the light source driver may set the light emission color of the light source to be a second color different from the first color, and, when the amount of the second power is in a third range greater than the second range, the light source driver may set the light emission color of the light source to be a third color different from the first color and the second color.

According to an embodiment of the disclosure, the wireless power transmission device may further include a light collection member covering the light source, and a filter member disposed adjacent to the light collecting member, and light emitted by the light source may be incident upon the cooking appliance via the light collection member and the filter member.

According to an embodiment of the disclosure, the wireless power transmission device may further include a light collection member covering the light source, and a filter member disposed adjacent to the light collecting member, and the light emitted by the light source may be output to a peripheral region surrounding an outer side edge of the cooking zone, via the light collection member and the filter member.

According to an embodiment of the disclosure, the at least one processor may be further configured to control the communication interface to receive temperature information from the cooking appliance, and control the light source driver to set at least one of the light emission intensity, the light emission color, or the light emission form, based on the amount of the second power and the temperature information.

According to an embodiment of the disclosure, the at least one processor may be further configured to control the communication interface to receive identification information from the cooking appliance, determine whether the cooking appliance includes a first temperature sensor, based on the identification information, and control the communication interface to receive the temperature information obtained by a temperature which is measured by the first temperature sensor.

According to an embodiment of the disclosure, when a temperature of the cooking appliance according to the temperature information is equal to or greater than a threshold temperature, the at least one processor may be further configured to control the light source driver so that the light source flickers.

According to an embodiment of the disclosure, the wireless power transmission device may further include a temperature sensor configured to obtain temperature information by measuring a temperature of the cooking zone, and the at least one processor may be further configured to, when the temperature information is not received from the cooking appliance, control the temperature sensor to measure the temperature information, and control the light source driver to set at least one of the light emission intensity, the light emission color, or the light emission form, based on the amount of the second power and the temperature information.

According to an embodiment of the disclosure, the wireless power transmission device may further include a temperature sensor configured to obtain temperature information by measuring a temperature of the cooking zone, and the at least one processor may be further configured to control the wireless power transmitter to stop transmitting the first power, control the temperature sensor to measure the temperature information after stopping transmitting the first power, and control the light source driver to set at least one of the light emission intensity, the light emission color, or the light emission form, based on the temperature information.

A control method of a wireless power transmission device according to an embodiment of the disclosure may include controlling a wireless power transmitter of the wireless power transmission device to transmit first power supplied by a working coil included in the wireless power transmitter to the cooking appliance, controlling a light source driver of the wireless power transmission device to measure second power induced in a sensing coil disposed to surround the working coil, when the first power is transmitted, and controlling the light source driver to set at least one of a light emission intensity of a light source of the wireless power transmission device, a light emission color of the light source, or a light emission form of the light source, based on the amount of the second power.

According to an embodiment of the disclosure, the amount of the second power may vary depending on the transmission amount of the first power and the characteristics of the cooking appliance, and the characteristics of the cooking appliance may include at least one of a material of the cooking appliance, a size of the cooking appliance, a placement position of a reception coil of the cooking appliance, a size of the reception coil, or an inductance of the reception coil.

According to an embodiment of the disclosure, as the amount of the second power increases, the light emission intensity of the light source may increase.

According to an embodiment of the disclosure, the control method may further include, when the amount of the second power is in a first range, setting the light emission color of the light source to be a first color, when the amount of the second power is in a second range greater than the first range, setting the light emission color of the light source to be a second color different from the first color, and when the amount of the second power is in a third range greater than the second range, setting the light emission color of the light source to be a third color different from the first color and the second color.

According to an embodiment of the disclosure, the control method may further include controlling a communication interface of the wireless power transmission device to receive temperature information from the cooking appliance, and controlling the light source driver to set at least one of the light emission intensity, the light emission color, or the light emission form, based on the amount of the second power and the temperature information.

A cooking appliance according to an embodiment of the disclosure may include a communication interface configured to establish a wireless communication connection with the wireless power transmission device, a reception coil configured to wirelessly receive power from a wireless power transmission device, a power supply electrically connected to the reception coil, a light source configured to emit light according to driving of the light source driver, and at least one processor. The at least one processor may be configured to measure first power received by the reception coil, and control the power supply to set at least one of a light emission intensity of the light source, a light emission color of the light source, or a light emission form of the light source, based on the amount of the first power.

A method according to an embodiment of the disclosure may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments or may be well-known to and be usable by one of ordinary skill in the art of computer software. Examples of a computer-readable recording medium include a magnetic medium, such as a hard disk, a floppy disk, or a magnetic tape, an optical medium, such as a compact disk-read-only memory (CD-ROM) or a digital versatile disk (DVD), a magneto-optical medium, such as a floptical disk, and a hardware device specially configured to store and execute program commands, such as a ROM, a random-access memory (RAM), or a flash memory.

Examples of the program commands are high-level language codes that can be executed by a computer by using an interpreter or the like as well as machine language codes made by a compiler.

An embodiment of the disclosure may also be implemented in the form of a recording medium including instructions executable by a computer, such as a program module executed by a computer. Computer-readable media may be any available media accessible by a computer and includes both volatile and nonvolatile media and removable and non-removable media. Further, the computer readable medium may include all computer storage and communication media. The computer storage medium includes all volatile/non-volatile and removable/non-removable media embodied by a certain method or technology for storing information, such as computer readable instruction code, a data structure, a program module or other data. The communication medium typically includes the computer readable instruction code, the data structure, the program module, or other data of a modulated data signal, or other transmission mechanism, and includes any information transmission medium. An embodiment of the disclosure may be implemented as a computer program or a computer program product including instructions executable by a computer.

The machine-readable storage medium may be provided as a non-transitory storage medium. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory recording medium may include a buffer in which data is temporarily stored.

According to an embodiment of the disclosure, a method according to various disclosed embodiments may be provided by being included in a computer program product. The computer program product, which is a commodity, may be traded between sellers and buyers. Computer program products are distributed in the form of device-readable storage media (e.g., a compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wireless power transmission device comprising:
   a wireless power transmitter comprising a working coil and configured to wirelessly transmit power to a cooking appliance located in a cooking zone;
   a communication interface configured to establish a wireless communication connection with the cooking appliance;
   a sensing coil surrounding an outer side edge of the working coil such that the sensing coil encompasses the outer side edge of the working coil;

a light source driver electrically connected to the sensing coil;

a light source configured to emit light according to driving of the light source driver; and at least one processor, wherein the at least one processor is configured to:

control the wireless power transmitter to transmit first power supplied by the working coil to the cooking appliance, control the light source driver to measure second power induced in the sensing coil surrounding the working coil when the first power is transmitted through the working coil, and control the light source driver to set at least one of a light emission intensity of the light source, a light emission color of the light source, or a light emission form of the light source, based on an amount of the second power.

2. The wireless power transmission device of claim 1, wherein the amount of the second power varies depending on a transmission amount of the first power and characteristics of the cooking appliance, and wherein the characteristics of the cooking appliance comprise at least one of a material of the cooking appliance, a size of the cooking appliance, a placement position of a reception coil of the cooking appliance, a size of the reception coil, or an inductance of the reception coil.

3. The wireless power transmission device of claim 1, further comprising:

a heat-resistant substrate surrounding the working coil, wherein the sensing coil is arranged on the heat-resistant substrate by using a printed electronics method.

4. The wireless power transmission device of claim 1, wherein the light source is arranged to at least partially surround an outer side edge of the sensing coil.

5. The wireless power transmission device of claim 1, wherein the light source is arranged in a gap region between the working coil and the sensing coil.

6. The wireless power transmission device of claim 1, wherein, as the amount of the second power increases, the light emission intensity of the light source increases.

7. The wireless power transmission device of claim 1, wherein when the amount of the second power is in a first range, the light source driver sets the light emission color of the light source to be a first color, wherein when the amount of the second power is in a second range greater than the first range, the light source driver sets the light emission color of the light source to be a second color different from the first color, and wherein when the amount of the second power is in a third range greater than the second range, the light source driver sets the light emission color of the light source to be a third color different from the first color and the second color.

8. The wireless power transmission device of claim 1, further comprising:

a light collection member covering the light source; and a filter member adjacent to the light collecting member, wherein light emitted by the light source is incident upon the cooking appliance via the light collection member and the filter member.

9. The wireless power transmission device of claim 1, further comprising:

a light collection member covering the light source; and a filter member adjacent to the light collecting member, wherein light emitted by the light source is output to a peripheral region surrounding an outer side edge of the cooking zone, via the light collection member and the filter member.

10. The wireless power transmission device of claim 1, wherein the at least one processor is further configured to:

control the communication interface to receive temperature information from the cooking appliance, and control the light source driver to set at least one of the light emission intensity, the light emission color, or the light emission form, based on the amount of the second power and the temperature information.

11. The wireless power transmission device of claim 10, wherein the at least one processor is further configured to:

control the communication interface to receive identification information from the cooking appliance, determine whether the cooking appliance includes a first temperature sensor, based on the identification information, and control the communication interface to receive the temperature information about a temperature measured by the first temperature sensor.

12. The wireless power transmission device of claim 10, wherein the at least one processor is further configured to;

when a temperature of the cooking appliance according to the temperature information is equal to or greater than a threshold temperature, control the light source driver so that the light source flickers.

13. The wireless power transmission device of claim 1, further comprising:

a temperature sensor configured to obtain temperature information by measuring a temperature of the cooking zone, wherein the at least one processor is further configured to:

when the temperature information is not received from the cooking appliance, control the temperature sensor to obtain the temperature information by measuring the temperature, and control the light source driver to set at least one of the light emission intensity, the light emission color, or the light emission form, based on the amount of the second power and the temperature information.

14. The wireless power transmission device of claim 1, further comprising:

a temperature sensor configured to obtain temperature information by measuring temperature of the cooking zone, wherein the at least one processor is further configured to:

control the wireless power transmitter to stop transmitting the first power, control the temperature sensor to obtain the temperature information by measuring the temperature after stopping transmitting the first power, and control the light source driver to set at least one of the light emission intensity, the light emission color, or the light emission form, based on the temperature information.

15. The wireless power transmission device of claim 1, wherein the sensing coil is configured to transmit, to the light source driver, current induced by a magnetic field generated around the working coil, and wherein the sensing coil is arranged to surround the working coil in a circle in which the sensing coil forms the circle and the working coil is within the circle.

16. A method performed by a wireless power transmission device, the method comprising:

controlling a wireless power transmitter of the wireless power transmission device to transmit first power supplied by a working coil included in the wireless power transmitter to a cooking appliance;

controlling a light source driver of the wireless power transmission device to measure second power induced in a sensing coil surrounding the working coil in which the sensing coil encompasses an outer side edge of the working coil, when the first power is transmitted through the working coil; and controlling the light source driver to set at least one of a light emission intensity of a light source of the wireless power transmission device, a light emission color of the light source, or a light emission form of the light source, based on an amount of the second power.

17. The method of claim 16, wherein the amount of the second power varies depending on a transmission amount of the first power and characteristics of the cooking appliance, and wherein the characteristics of the cooking appliance comprise at least one of a material of the cooking appliance, a size of the cooking appliance, a placement position of a reception coil of the cooking appliance, a size of the reception coil, or an inductance of the reception coil.

18. The method of claim 16, wherein, as the amount of the second power increases, the light emission intensity of the light source increases.

19. The method of claim 16, further comprising:

when the amount of the second power is in a first range, setting the light emission color of the light source to be a first color;

when the amount of the second power is in a second range greater than the first range, setting the light emission color of the light source to be a second color different from the first color; and when the amount of the second power is in a third range greater than the second range, setting the light emission color of the light source to be a third color different from the first color and the second color.

20. The method of claim 16, further comprising:

controlling a communication interface of the wireless power transmission device to receive temperature information from the cooking appliance; and controlling the light source driver to set at least one of the light emission intensity, the light emission color, or the light emission form, based on the amount of the second power and the temperature information.

21. A cooking appliance comprising:

a communication interface configured to establish a wireless communication connection with a wireless power transmission device;

a reception coil configured to wirelessly receive power from a wireless power transmission device;

a pickup coil configured to generate power for operation of a printed circuit board (PCB);

a communication coil configured to perform wireless communication with the wireless power transmission device;

a power supply electrically connected to the reception coil;

a light source configured to emit light according to driving of the power supply; and at least one processor, wherein the at least one processor is configured to:

measure first power received by the reception coil, and control the power supply to set at least one of a light emission intensity of the light source, a light emission color of the light source, or a light emission form of the light source, based on an amount of the first power, wherein a magnetic field generated from current flowing in a working coil passes through the reception coil, wherein, as the magnetic field passes through the reception coil, an induced current flows in the reception coil, wherein power is supplied to a load due to the induced current flowing in the reception coil, wherein the reception coil, the pickup coil, and the communication coil are disposed on a same layer or in a stack structure.

* * * * *